US012332494B2

(12) United States Patent
Su et al.

(10) Patent No.: US 12,332,494 B2
(45) Date of Patent: Jun. 17, 2025

(54) IMAGING LENS DRIVING MODULE AND ELECTRONIC DEVICE

(71) Applicant: LARGAN DIGITAL CO., LTD., Taichung (TW)

(72) Inventors: Heng Yi Su, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 814 days.

(21) Appl. No.: 17/529,145

(22) Filed: Nov. 17, 2021

(65) Prior Publication Data

US 2023/0088610 A1    Mar. 23, 2023

(30) Foreign Application Priority Data

Sep. 17, 2021   (TW) .................................. 110134856

(51) Int. Cl.
*G02B 7/02*    (2021.01)
*G02B 7/00*    (2021.01)

(52) U.S. Cl.
CPC ............. *G02B 7/022* (2013.01); *G02B 7/005* (2013.01); *G02B 7/021* (2013.01)

(58) Field of Classification Search
CPC .. G02B 13/0065; G02B 13/007; G02B 7/022; G02B 7/005; G02B 7/021; G02B 7/02; G02B 7/023
See application file for complete search history.

(56) References Cited

U.S. PATENT DOCUMENTS

| 10,416,473 B2 | 9/2019 | Lee et al. |
| 10,816,756 B2 | 10/2020 | Lee et al. |
| 10,938,290 B2 | 3/2021 | Yeon et al. |

(Continued)

FOREIGN PATENT DOCUMENTS

| KR | 10-2018-0012150 A | 2/2018 |
| KR | 10-2019-0128279 A | 11/2019 |

(Continued)

OTHER PUBLICATIONS

European Search Report in Application No. 21218189.5 Dated Jun. 28, 2022.

*Primary Examiner* — Ephrem Z Mebrahtu
(74) *Attorney, Agent, or Firm* — Maschoff Brennan

(57) ABSTRACT

An imaging lens driving module includes a lens system, a lens holder accommodating optical lens elements of the lens system, a base, a rollable support assembly and a driving mechanism. The base includes first and second guiding grooves extending in a direction parallel to the optical axis, disposed opposite to each other and facing the lens holder. The rollable support assembly is in physical contact with and disposed between the lens holder and the base and includes principal and auxiliary rollable support elements. The principal rollable support element is disposed between the lens holder and the first guiding groove. The auxiliary rollable support element is disposed between the lens holder and the second guiding groove. The driving mechanism is configured to drive the lens holder to move. Diameters of the principal and auxiliary rollable support elements in physical contact with the lens holder are different from each other.

23 Claims, 65 Drawing Sheets

(56) References Cited

U.S. PATENT DOCUMENTS

| | | | |
|---|---|---|---|
| 2018/0173081 A1 | 6/2018 | Kim et al. | |
| 2020/0137274 A1* | 4/2020 | Lee | G03B 17/17 |
| 2021/0048649 A1* | 2/2021 | Goldenberg | G02B 13/0065 |
| 2021/0072495 A1* | 3/2021 | Shin | G02B 13/009 |
| 2021/0092264 A1 | 3/2021 | Kang | |
| 2022/0155571 A1* | 5/2022 | Xu | G02B 15/143503 |
| 2024/0126157 A1* | 4/2024 | Imaoka | G02B 17/086 |

FOREIGN PATENT DOCUMENTS

| | | |
|---|---|---|
| KR | 10-2020-0047275 A | 5/2020 |
| WO | 2020174325 A2 | 9/2020 |

* cited by examiner

IMAGING LENS DRIVING MODULE AND ELECTRONIC DEVICE

RELATED APPLICATIONS

This application claims priority to Taiwan Application 110134856, filed on Sep. 17, 2021, which is incorporated by reference herein in its entirety.

BACKGROUND

Technical Field

The present disclosure relates to an imaging lens driving module and an electronic device, more particularly to an imaging lens driving module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring light and thin, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. Generally, in a manufacturing process for optical systems, there are assembly errors between optical components, and there is usually a problem of assembly warpage, thereby increasing defective rate of the optical systems.

SUMMARY

According to one aspect of the present disclosure, an imaging lens driving module includes a lens system, a lens holder assembly, a base, a rollable support assembly and a driving mechanism. The lens system has a plurality of optical lens elements, and the lens system has an optical axis passing through the optical lens elements. The lens holder assembly includes a first lens holder and a second lens holder. The first lens holder is for at least one of the optical lens elements to be disposed therein, and the second lens holder is for at least another of the optical lens elements to be disposed therein. The base includes a guiding groove assembly, and the guiding groove assembly includes a first guiding groove and a second guiding groove. The first guiding groove extends in a direction parallel to the optical axis and faces the first lens holder and the second lens holder, the second guiding groove extends in the direction parallel to the optical axis and is disposed opposite to the first guiding groove, and the second guiding groove faces the first lens holder and the second lens holder. The rollable support assembly is disposed between the lens holder assembly and the base, such that the lens holder assembly has a degree of freedom of parallel movement with respect to the base. The rollable support assembly includes at least one principal rollable support element and at least one auxiliary rollable support element. The principal rollable support element is disposed between the lens holder assembly and the first guiding groove, and the auxiliary rollable support element is disposed between the lens holder assembly and the second guiding groove. The driving mechanism is configured to drive the lens holder assembly to move in the direction parallel to the optical axis. The rollable support assembly is in physical contact with the lens holder assembly, and the rollable support assembly is in physical contact with the base. The principal rollable support element of the rollable support assembly allows the lens holder assembly to move along the first guiding groove with respect to the base after the lens holder assembly is driven by the driving mechanism. When a diameter of the principal rollable support element in physical contact with the first lens holder is $\Phi D1$, and a diameter of the auxiliary rollable support element in physical contact with the first lens holder is $\Phi D2$, the following condition is satisfied: $\Phi D1 \neq \Phi D2$.

According to another aspect of the present disclosure, an imaging lens driving module includes a lens system, a lens holder assembly, a base, a rollable support assembly and a driving mechanism. The lens system has a plurality of optical lens elements, and the lens system has an optical axis passing through the optical lens elements. The lens holder assembly includes a first lens holder and a second lens holder. The first lens holder is for at least one of the optical lens elements to be disposed therein, and the second lens holder is for at least another of the optical lens elements to be disposed therein. The base includes a guiding groove assembly, and the guiding groove assembly includes a first guiding groove, a second guiding groove and a third guiding groove. The first guiding groove extends in a direction parallel to the optical axis and faces the first lens holder and the second lens holder. The second guiding groove and the third guiding groove extend in the direction parallel to the optical axis. The second guiding groove faces the first lens holder, and the second guiding groove does not face the second lens holder. The third guiding groove faces the second lens holder, and the third guiding groove does not face the first lens holder. The rollable support assembly is disposed between the lens holder assembly and the base, such that the lens holder assembly has a degree of freedom of parallel movement with respect to the base. The rollable support assembly includes at least one principal rollable support element and at least one auxiliary rollable support element. The principal rollable support element is disposed between the lens holder assembly and the first guiding groove, and the auxiliary rollable support element is disposed between the lens holder assembly and other guiding groove other than the first guiding groove. The driving mechanism is configured to drive the lens holder assembly to move in the direction parallel to the optical axis. The rollable support assembly is in physical contact with the lens holder assembly, and the rollable support assembly is in physical contact with the base. The principal rollable support element of the rollable support assembly allows the lens holder assembly to move along the first guiding groove with respect to the base after the lens holder assembly is driven by the driving mechanism. When a diameter of the principal rollable support element in physical contact with the first lens holder is $\Phi D1$, and a diameter of the auxiliary rollable support element in physical contact with the first lens holder is $\Phi D2$, the following condition is satisfied: $\Phi D1 \neq \Phi D2$.

According to another aspect of the present disclosure, an imaging lens driving module includes a lens system, a lens holder assembly, a base, at least two rollable support assemblies and a driving mechanism. The lens system has a plurality of optical lens elements, and the lens system has an optical axis passing through the optical lens elements. The lens holder assembly includes a first lens holder and a second lens holder. The first lens holder is for at least one of the optical lens elements to be disposed therein, and the second lens holder is for at least another of the optical lens elements to be disposed therein. The base includes at least two guiding groove assemblies, and the at least two guiding groove assemblies includes a first guiding groove assembly and a second guiding groove assembly. The first guiding groove assembly faces the first lens holder, and the first guiding groove assembly includes a first guiding groove and a second guiding groove. The first guiding groove and the second guiding groove extend in a direction parallel to the optical axis, and the second guiding groove and the first guiding groove are disposed opposite to each other. The second guiding groove assembly faces the second lens holder, and the second guiding groove assembly includes a third guiding groove and a fourth guiding groove. The third guiding groove and the fourth guiding groove extend in the direction parallel to the optical axis, and the fourth guiding groove and the third guiding groove are disposed opposite to each other. The rollable support assemblies are disposed between the lens holder assembly and the base, such that the lens holder assembly has a degree of freedom of parallel movement with respect to the base. The rollable support assemblies includes a first rollable support assembly and a second rollable support assembly. The first rollable support assembly includes at least one first principal rollable support element and at least one first auxiliary rollable support element. The first principal rollable support element is disposed between the first lens holder and the first guiding groove, and the first auxiliary rollable support element is disposed between the first lens holder and the second guiding groove. The second rollable support assembly includes at least one second principal rollable support element and at least one second auxiliary rollable support element. The second principal rollable support element is disposed between the second lens holder and the third guiding groove, and the second auxiliary rollable support element is disposed between the second lens holder and the fourth guiding groove. The driving mechanism is configured to drive the lens holder assembly to move in the direction parallel to the optical axis. The rollable support assemblies are in physical contact with the lens holder assembly, and the rollable support assemblies are in physical contact with the base. The first principal rollable support element allows the first lens holder to move along the first guiding groove with respect to the base after the first lens holder is driven by the driving mechanism, and the second principal rollable support element allows the second lens holder to move along the third guiding groove with respect to the base after the second lens holder is driven by the driving mechanism. When a diameter of the first principal rollable support element in physical contact with the first lens holder is ΦD1, and a diameter of the first auxiliary rollable support element in physical contact with the first lens holder is ΦD2, the following condition is satisfied: ΦD1≠ΦD2.

According to another aspect of the present disclosure, an imaging lens driving module includes a lens system, a lens holder, a light-folding element, a base, a rollable support assembly and a driving mechanism. The lens system has a plurality of optical lens elements, and the lens system has an optical axis passing through the optical lens elements. The lens holder is for at least one of the optical lens elements to be disposed therein. The light-folding element is configured to fold an incident optical trace towards at least one of the optical lens elements. The base includes a first guiding groove and a second guiding groove. The first guiding groove extends in a direction parallel to the optical axis and faces the lens holder. The second guiding groove extends in the direction parallel to the optical axis and is disposed opposite to the first guiding groove, and the second guiding groove faces the lens holder. The rollable support assembly is disposed between the lens holder and the base, such that the lens holder has a degree of freedom of parallel movement with respect to the base. The rollable support assembly includes at least one principal rollable support element and at least one auxiliary rollable support element. The principal rollable support element is disposed between the lens holder and the first guiding groove, and the auxiliary rollable support element is disposed between the lens holder and the second guiding groove. The driving mechanism is configured to drive the lens holder to move in the direction parallel to the optical axis. The rollable support assembly is in physical contact with the lens holder, and the rollable support assembly is in physical contact with the base. The principal rollable support element of the rollable support assembly allows the lens holder to move along the first guiding groove with respect to the base after the lens holder is driven by the driving mechanism. The optical lens elements include at least one object-side optical lens element, and the object-side optical lens element is located on an object side of the light-folding element. The light-folding element has no relative motion with respect to the base, and the object-side optical lens element has no relative motion with respect to the base. When a diameter of the principal rollable support element in physical contact with the lens holder is ΦD1, and a diameter of the auxiliary rollable support element in physical contact with the lens holder is ΦD2, the following condition is satisfied: ΦD1≠ΦD2.

According to another aspect of the present disclosure, an electronic device includes the aforementioned imaging lens driving module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
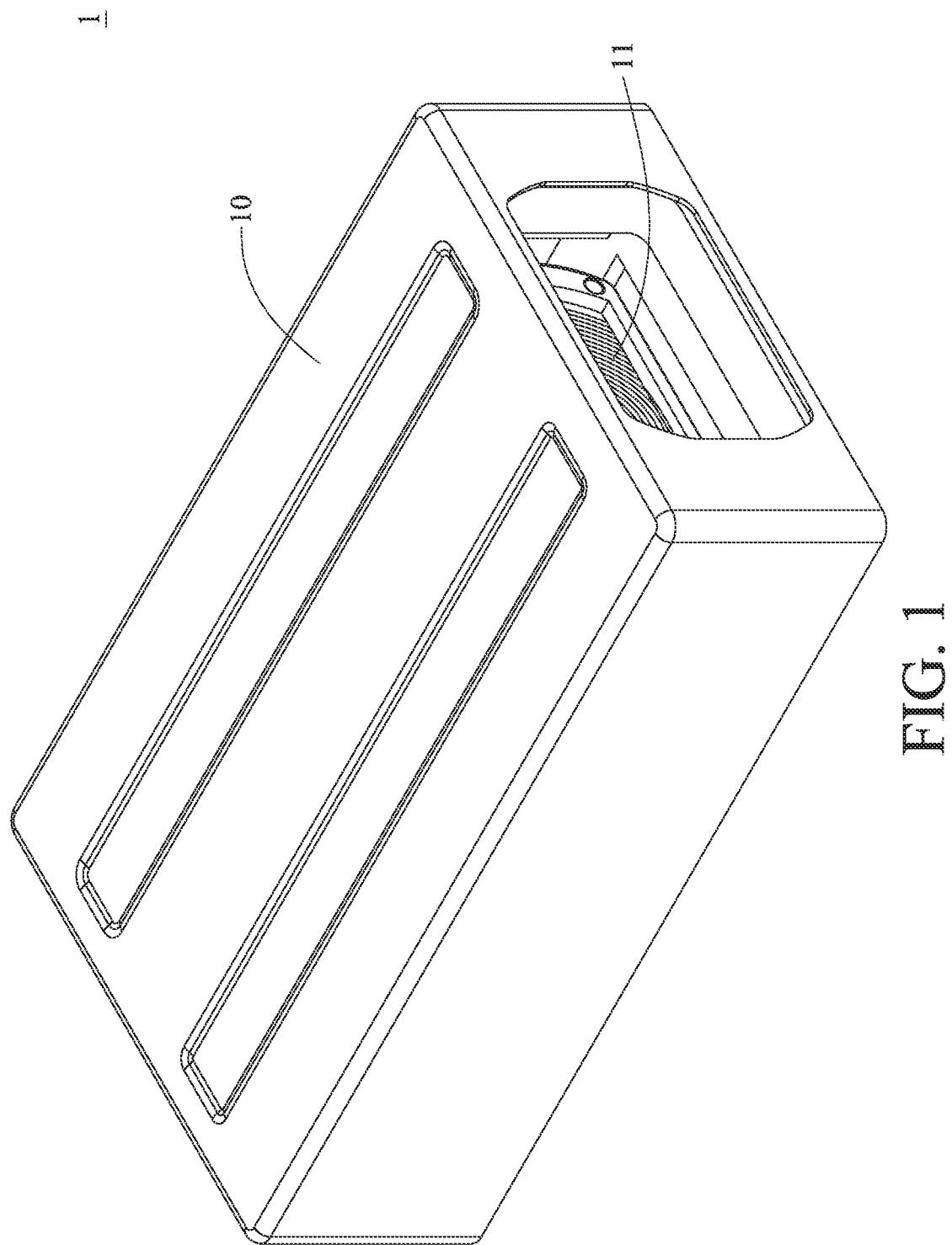
FIG. 1 is a perspective view of an imaging lens driving module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens driving module. The imaging lens driving module includes a lens system, a lens holder assembly, a base, a rollable support assembly and a driving mechanism.

The lens system has a plurality of optical lens elements, and the lens system has an optical axis passing through the optical lens elements.

The lens holder assembly includes a first lens holder and a second lens holder. The first lens holder is for at least one of the optical lens elements to be disposed therein, and the second lens holder is for at least another of the optical lens elements to be disposed therein.

The base includes a guiding groove assembly, and the guiding groove assembly includes a first guiding groove and a second guiding groove. The first guiding groove extends in a direction parallel to the optical axis and faces the first lens holder and the second lens holder. The second guiding groove extends in the direction parallel to the optical axis and is disposed opposite to the first guiding groove, and the second guiding groove faces the first lens holder and the second lens holder. Therefore, the first lens holder and the second lens holder of the lens holder assembly share the first guiding groove and the second guiding groove, such that the lens holder assembly has a shared rail design.

The rollable support assembly is disposed between the lens holder assembly and the base, such that the lens holder assembly has a degree of freedom of parallel movement with respect to the base. The rollable support assembly includes at least one principal rollable support element and at least one auxiliary rollable support element. The principal rollable support element is disposed between the lens holder assembly and the first guiding groove, and the auxiliary rollable support element is disposed between the lens holder assembly and the second guiding groove. The rollable support assembly is in physical contact with the lens holder assembly, and the rollable support assembly is in physical contact with the base. The first guiding groove has two contact points with the principal rollable support element so as to ensure straight movement of the principal rollable support element in the direction parallel to the optical axis, but the present disclosure is not limited thereto. Moreover, the second guiding groove has a single contact point with the auxiliary rollable support element so as to compensate for remaining assembly errors, but the present disclosure is not limited thereto. It is noted that the above describes various contact manners between different principal rollable support elements and the guiding grooves. In specific, the principal rollable support element is configured to have two contact points with the first guiding groove, such that the movement of the principal rollable support element is restricted in the direction parallel to the optical axis. The auxiliary rollable support element is configured to have a single contact point with the second guiding groove, such that the auxiliary rollable support element is allowed to move in a direction perpendicular to the optical axis in a small range, and thus, the auxiliary rollable support element not only supports the lens holder assembly but also absorbs extra assembly errors.

The driving mechanism is configured to drive the lens holder assembly to move in the direction parallel to the optical axis. Moreover, the principal rollable support element of the rollable support assembly allows the lens holder assembly to move along the first guiding groove with respect to the base after the lens holder assembly is driven by the driving mechanism.

When a diameter of the principal rollable support element in physical contact with the first lens holder is $\Phi D1$, and a diameter of the auxiliary rollable support element in physical contact with the first lens holder is $\Phi D2$, the following condition is satisfied: $\Phi D1 \neq \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. Moreover, $\Phi D1 \neq \Phi D2$ may be $\Phi D1 < \Phi D2$ or $\Phi D1 > \Phi D2$.

The number of the at least one principal rollable support element can be plural. There can be at least two of the principal rollable support elements facing the first lens holder, and a first buffering support element is disposed between the at least two principal rollable support elements. Therefore, the first buffering support element can reduce the rolling resistance between the principal rollable support elements so as to reduce the driving power consumption of the imaging lens driving module.

The number of the at least one auxiliary rollable support element can be plural. There can be at least two of the auxiliary rollable support elements facing the first lens holder, and a second buffering support element is disposed between the at least two auxiliary rollable support elements. Therefore, the second buffering support element can reduce the rolling resistance between the auxiliary rollable support elements so as to reduce the driving power consumption of the imaging lens driving module.

When the diameter of the principal rollable support element in physical contact with the first lens holder is $\Phi D1$, the diameter of the auxiliary rollable support element in physical contact with the first lens holder is $\Phi D2$, a diameter of the first buffering support element is $\Phi D3$, and a diameter of the second buffering support element is $\Phi D4$, the following conditions can be satisfied: $\Phi D3 < \Phi D1$; and $\Phi D4 < \Phi D2$. Therefore, it is favorable for reducing the driving power consumption of the imaging lens driving module. Moreover, the lens holder assembly is only in physical contact with the principal rollable support element having the maximum diameter among the principal rollable support elements facing theretoward and the auxiliary rollable support element having the maximum diameter among the auxiliary rollable support elements facing theretoward.

When the number of the principal rollable support element is N1, and the number of the auxiliary rollable support element is N2, the following condition can be satisfied: $N2 \leq N1$. Therefore, a proper number arrangement of the principal and auxiliary rollable support elements is favorable for optimizing the driving efficiency of the imaging lens driving module.

The imaging lens driving module can further include a light-folding element configured to fold an incident optical trace towards at least one of the optical lens elements. Therefore, the size of the imaging lens driving module provided with the light-folding element can be reduced. Moreover, the light-folding element can be, for example, a mirror or a prism, but the present disclosure is not limited thereto. Herein, incident light coming from the object side of the lens system and not yet folded by the light-folding element is referred as the incident optical trace.

The present disclosure provides another imaging lens driving module. The imaging lens driving module includes a lens system, a lens holder assembly, a base, a rollable support assembly and a driving mechanism.

The lens system has a plurality of optical lens elements, and the lens system has an optical axis passing through the optical lens elements.

The lens holder assembly includes a first lens holder and a second lens holder. The first lens holder is for at least one of the optical lens elements to be disposed therein, and the second lens holder is for at least another of the optical lens elements to be disposed therein.

The base includes a guiding groove assembly, and the guiding groove assembly includes a first guiding groove, a second guiding groove and a third guiding groove. The first guiding groove extends in a direction parallel to the optical axis and faces the first lens holder and the second lens holder, the second guiding groove extends in the direction parallel to the optical axis and only faces the first lens holder, and the third guiding groove extends in the direction parallel to the optical axis and only faces the second lens holder. Specifically, the second guiding groove "only facing" the first lens holder indicates that the second guiding groove does not face the second lens holder; similarly, the third guiding groove "only facing" the second lens holder indicates that the third guiding groove does not face the first lens holder. Therefore, the first lens holder and the second lens holder of the lens holder assembly share the first guiding groove, such that the lens holder assembly has a partially shared rail design.

The rollable support assembly is disposed between the lens holder assembly and the base, such that the lens holder assembly has a degree of freedom of parallel movement with respect to the base. The rollable support assembly includes at least one principal rollable support element and at least one auxiliary rollable support element. The principal rollable support element is disposed between the lens holder assembly and the first guiding groove, and the auxiliary rollable support element is disposed between the lens holder assembly and other guiding groove other than the first guiding groove. The rollable support assembly is in physical contact with the lens holder assembly, and the rollable support assembly is in physical contact with the base. The first guiding groove has two contact points with the principal rollable support element so as to ensure straight movement of the principal rollable support element in the direction parallel to the optical axis, but the present disclosure is not limited thereto. Moreover, each guiding groove other than the first guiding groove has a single contact point with the auxiliary rollable support element so as to compensate for remaining assembly errors, but the present disclosure is not limited thereto. It is noted that the above describes various contact manners between different principal rollable support elements and the guiding grooves. In specific, the principal rollable support element is configured to have two contact points with the first guiding groove, such that the movement of the principal rollable support element is restricted in the direction parallel to the optical axis. The auxiliary rollable support element is configured to have a single contact point with other guiding groove other than the first guiding groove, such that the auxiliary rollable support element is allowed to move in a direction perpendicular to the optical axis in a small range, and thus, the auxiliary rollable support element not only supports the lens holder assembly but also absorbs extra assembly errors.

The driving mechanism is configured to drive the lens holder assembly to move in the direction parallel to the optical axis. Moreover, the principal rollable support element of the rollable support assembly allows the lens holder assembly to move along the first guiding groove with respect to the base after the lens holder assembly is driven by the driving mechanism.

When a diameter of the principal rollable support element in physical contact with the first lens holder is $\Phi D1$, and a diameter of the auxiliary rollable support element in physical contact with the first lens holder is $\Phi D2$, the following condition is satisfied: $\Phi D1 \neq \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. Moreover, $\Phi D1 \neq \Phi D2$ may be $\Phi D1 < \Phi D2$ or $\Phi D1 > \Phi D2$.

The first guiding groove can have same cross-sectional areas in the direction parallel to the optical axis. Therefore, it is favorable for increasing the mold design flexibility so as to meet requirements of guiding grooves for various driving manners.

The first guiding groove can have different cross-sectional areas in the direction parallel to the optical axis. Therefore, it is favorable for providing feasibility of a blocking mechanism and the base to be one-piece formed, thereby improving manufacturing efficiency.

The first guiding groove can have a gradually expanding surface. Therefore, it is favorable for providing a configuration where the blocking mechanism provides better blocking effect. In addition, said gradually expanding surface may gradually expand from the object side towards the image side of the lens system in the direction parallel to the optical axis, or from the image side towards the object side of the lens system in the direction parallel to the optical axis, and the present disclosure is not limited thereto.

The number of the at least one principal rollable support element can be plural. When a minimum width of the gradually expanding surface is W, and a maximum diameter among the principal rollable support elements is $\Phi D5$, the following condition can be satisfied: $W < \Phi D5$. Therefore, it is favorable for the gradually expanding surface to have the blocking mechanism, and the blocking mechanism provides better blocking effect when the above condition range is satisfied, thereby restricting the movement range of the principal rollable support element in the direction parallel to the optical axis. Said maximum diameter among the principal rollable support elements indicates the diameter of the principal rollable support element having the maximum diameter among all the principal rollable support elements.

The present disclosure provides another imaging lens driving module. The imaging lens driving module includes a lens system, a lens holder assembly, a base, at least two rollable support assemblies and a driving mechanism.

The lens system has a plurality of optical lens elements, and the lens system has an optical axis passing through the optical lens elements.

The lens holder assembly includes a first lens holder and a second lens holder. The first lens holder is for at least one of the optical lens elements to be disposed therein, and the second lens holder is for at least another of the optical lens elements to be disposed therein.

The base includes at least two guiding groove assemblies, and the at least two guiding groove assemblies includes a first guiding groove assembly and a second guiding groove assembly. The first guiding groove assembly faces the first lens holder, and the first guiding groove assembly includes a first guiding groove and a second guiding groove. The first guiding groove and the second guiding groove extend in a direction parallel to the optical axis, and the second guiding groove and the first guiding groove are disposed opposite to each other. The second guiding groove assembly faces the second lens holder, and the second guiding groove assembly includes a third guiding groove and a fourth guiding groove. The third guiding groove and the fourth guiding groove extend in the direction parallel to the optical axis, and the fourth guiding groove and the third guiding groove are disposed opposite to each other.

The rollable support assemblies are disposed between the lens holder assembly and the base, such that the lens holder assembly has a degree of freedom of parallel movement with respect to the base. The rollable support assemblies include a first rollable support assembly and a second rollable support assembly. The first rollable support assembly includes at least one first principal rollable support element and at least one first auxiliary rollable support element. The first principal rollable support element is disposed between the first lens holder and the first guiding groove, and the first auxiliary rollable support element is disposed between the first lens holder and the second guiding groove. The second rollable support assembly includes at least one second principal rollable support element and at least one second auxiliary rollable support element. The second principal rollable support element is disposed between the second lens holder and the third guiding groove, and the second auxiliary rollable support element is disposed between the second lens holder and the fourth guiding groove. In addition, the rollable support assemblies are in physical contact with the lens holder assembly, and the rollable support assemblies are in physical contact with the base. Moreover, each of the first guiding groove and the third guiding groove has two contact points with the principal rollable support element so as to ensure straight movement of the principal rollable support element in the direction parallel to the optical axis, but the present disclosure is not limited thereto. Moreover, each guiding groove other than the first guiding groove and the third guiding groove has a single contact point with the auxiliary rollable support element so as to compensate for remaining assembly errors, but the present disclosure is not limited thereto. It is noted that the above describes various contact manners between different principal rollable support elements and the guiding grooves. In specific, the principal rollable support element is configured to have two contact points with the first guiding groove or the third guiding groove, such that the movement of the principal rollable support element is restricted in the direction parallel to the optical axis. The auxiliary rollable support element is configured to have a single contact point with other guiding groove other than the first guiding groove and the third guiding groove, such that the auxiliary rollable support element is allowed to move in a direction perpendicular to the optical axis in a small range, and thus, the auxiliary rollable support element not only supports the lens holder assembly but also absorbs extra assembly errors. Moreover, each of the second guiding groove and the fourth guiding groove has a single contact point with the auxiliary rollable support element so as to absorb assembly warpage generated during the assembly process, thereby improving yield rate.

The driving mechanism is configured to drive the lens holder assembly to move in the direction parallel to the optical axis. Moreover, the first principal rollable support element allows the first lens holder to move along the first guiding groove with respect to the base after the first lens holder is driven by the driving mechanism, and the second principal rollable support element allows the second lens holder to move along the third guiding groove with respect to the base after the second lens holder is driven by the driving mechanism.

When a diameter of the first principal rollable support element in physical contact with the first lens holder is $\Phi D1$, and a diameter of the first auxiliary rollable support element in physical contact with the first lens holder is $\Phi D2$, the following condition is satisfied: $\Phi D1 \neq \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. Moreover, $\Phi D1 \neq \Phi D2$ may be $\Phi D1 < \Phi D2$ or $\Phi D1 > \Phi D2$.

The first guiding groove assembly and the second guiding groove assembly can overlap each other in the direction perpendicular to the optical axis. Therefore, it is favorable for increasing the mold design flexibility so as to meet requirements of guiding grooves for various driving manners. Said two elements overlapping each other indicates that the two elements partially overlap each other or completely overlap each other.

The first guiding groove assembly and the second guiding groove assembly may not overlap each other in the direction parallel to the optical axis. Therefore, it is favorable for increasing the mold design flexibility so as to meet requirements of guiding grooves for various driving manners.

The first guiding groove assembly and the second guiding groove assembly may not overlap each other in the direction perpendicular to the optical axis. Therefore, it is favorable for increasing the mold design flexibility so as to meet requirements of guiding grooves for various driving manners.

The first guiding groove assembly and the second guiding groove assembly can overlap each other in the direction parallel to the optical axis. Therefore, it is favorable for increasing the mold design flexibility so as to meet requirements of guiding grooves for various driving manners. Said two elements overlapping each other indicates that the two elements partially overlap each other or completely overlap each other.

The present disclosure provides another imaging lens driving module. The imaging lens driving module includes a lens system, a lens holder, a light-folding element, a base, a rollable support assembly and a driving mechanism.

The lens system has a plurality of optical lens elements, and the lens system has an optical axis passing through the optical lens elements.

The lens holder is for at least one of the optical lens elements to be disposed therein. The light-folding element is configured to fold an incident optical trace towards at least one of the optical lens elements. Moreover, the optical lens elements include at least one object-side optical lens element located on the object side of the light-folding element. Herein, incident light coming from the object side of the lens system and not yet folded by the light-folding element is referred as the incident optical trace.

The base includes a first guiding groove and a second guiding groove. The first guiding groove extends in a direction parallel to the optical axis and faces the lens holder. The second guiding groove extends in the direction parallel to the optical axis and is disposed opposite to the first guiding groove, and the second guiding groove faces the lens holder. In addition, the light-folding element has no relative motion with respect to the base, and the object-side optical lens element has no relative motion with respect to the base.

The rollable support assembly is disposed between the lens holder and the base, such that the lens holder has a degree of freedom of parallel movement with respect to the base. The rollable support assembly includes at least one principal rollable support element and at least one auxiliary rollable support element. The principal rollable support element is disposed between the lens holder and the first guiding groove, and the auxiliary rollable support element is disposed between the lens holder and the second guiding groove. In addition, the rollable support assembly is in physical contact with the lens holder, and the rollable support assembly is in physical contact with the base. Moreover, the first guiding groove has two contact points with the principal rollable support element so as to ensure straight movement of the principal rollable support element in the direction parallel to the optical axis, but the present disclosure is not limited thereto. Moreover, the second guiding groove has a single contact point with the auxiliary rollable support element so as to compensate for remaining assembly errors and absorb assembly warpage generated during the assembly process, thereby improving yield rate, but the present disclosure is not limited thereto. It is noted that the above describes various contact manners between different principal rollable support elements and the guiding grooves. In specific, the principal rollable support element is configured to have two contact points with the first guiding groove, such that the movement of the principal rollable support element is restricted in the direction parallel to the optical axis. The auxiliary rollable support element is configured to have a single contact point with the second guiding groove, such that the auxiliary rollable support element is allowed to move in a direction perpendicular to the optical axis in a small range, and thus, the auxiliary rollable support element not only supports the lens holder assembly but also absorbs extra assembly errors.

The driving mechanism is configured to drive the lens holder to move in the direction parallel to the optical axis. Moreover, the principal rollable support element of the rollable support assembly allows the lens holder to move along the first guiding groove with respect to the base after the lens holder is driven by the driving mechanism.

When a diameter of the principal rollable support element in physical contact with the lens holder is $\Phi D1$, and a diameter of the auxiliary rollable support element in physical contact with lens holder is $\Phi D2$, the following condition is satisfied: $\Phi D1 \neq \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. Moreover, $\Phi D1 \neq \Phi D2$ may be $\Phi D1 < \Phi D2$ or $\Phi D1 > \Phi D2$.

The base can further include a lens holder structure for at least another of the optical lens elements to be disposed therein. Therefore, it is favorable for increasing the optical design flexibility so as to meet optical requirements of higher product specifications.

The optical lens elements disposed in the lens holder structure of the base can have no relative motion with respect to the base. Therefore, the optical lens elements can be installed in predetermined positions more easily so as to improve image quality. Furthermore, only the optical lens element(s) disposed in the lens holder among all optical lens elements can have a relative motion with respect to the base.

The light-folding element can include an optical effective region, and the incident optical trace passes through the optical effective region. Therefore, it is favorable for integrating functions of light folding and refractive power into one light-folding element so as to reduce manufacturing costs.

After the light-folding element converges the incident optical trace via the optical effective region, the light-folding element folds the incident optical trace towards at least one of the optical lens elements. Therefore, the total track length of the imaging lens driving module provided with the light-folding element along the direction parallel to the optical axis can be reduced, thereby achieving compactness.

The light-folding element can include a reduction portion, and the reduction portion is reduced from the periphery of the light-folding element towards the center of the light-folding element. Therefore, it is favorable for providing a configuration having better space utilization arrangement so as to reduce the size of the imaging lens driving module.

The object-side optical lens element has a central axis, and the object-side optical lens element can have an outer peripheral reduction structure reduced in a straight-line direction perpendicular to the central axis. Therefore, it is favorable for providing a configuration having better space utilization arrangement so as to reduce the size of the imaging lens driving module.

The present disclosure provides an electronic device, which includes one of the aforementioned imaging lens driving modules.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
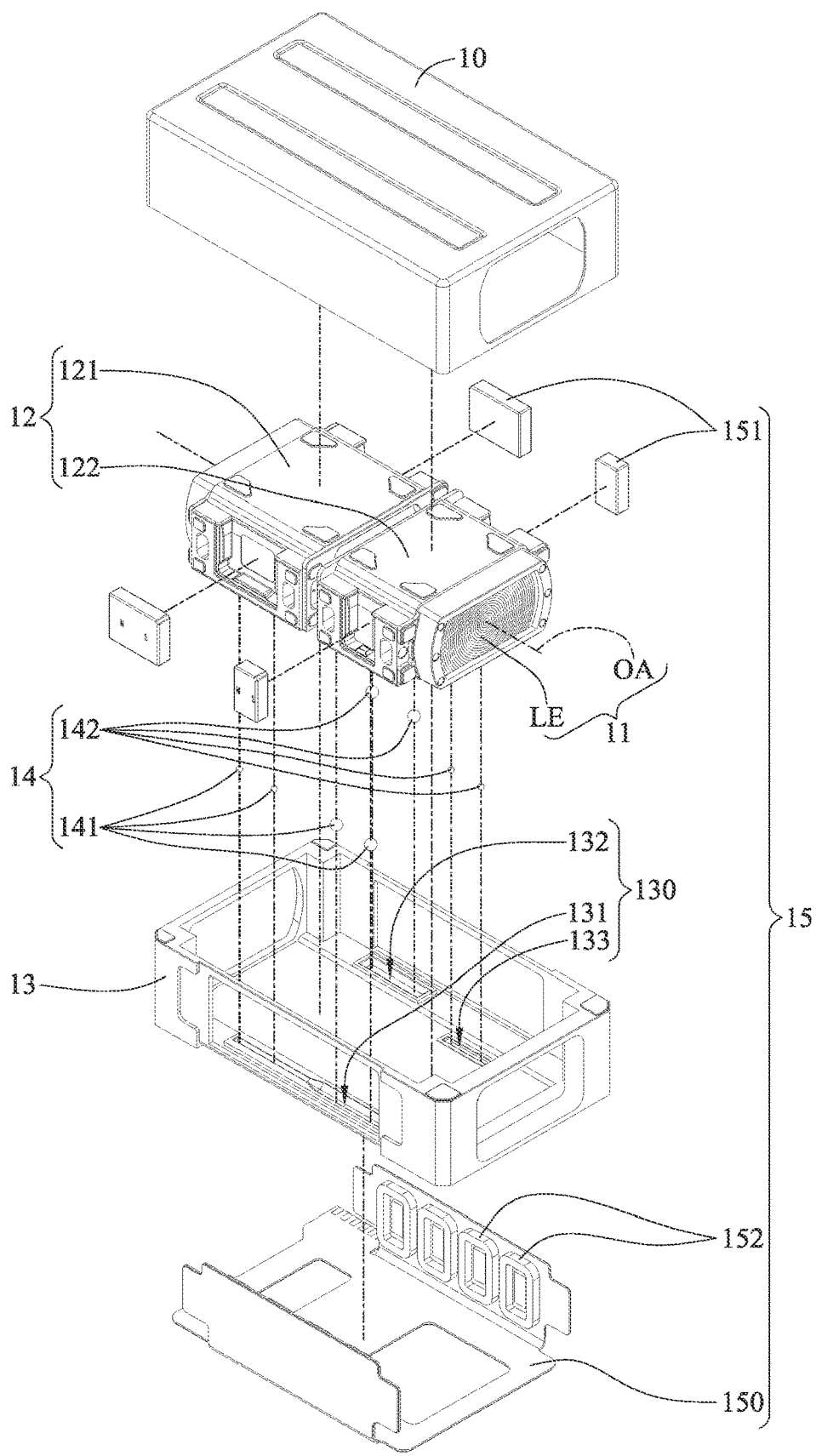
FIG. 2 is an exploded view of the imaging lens driving module in FIG. 1.
Figure 3:
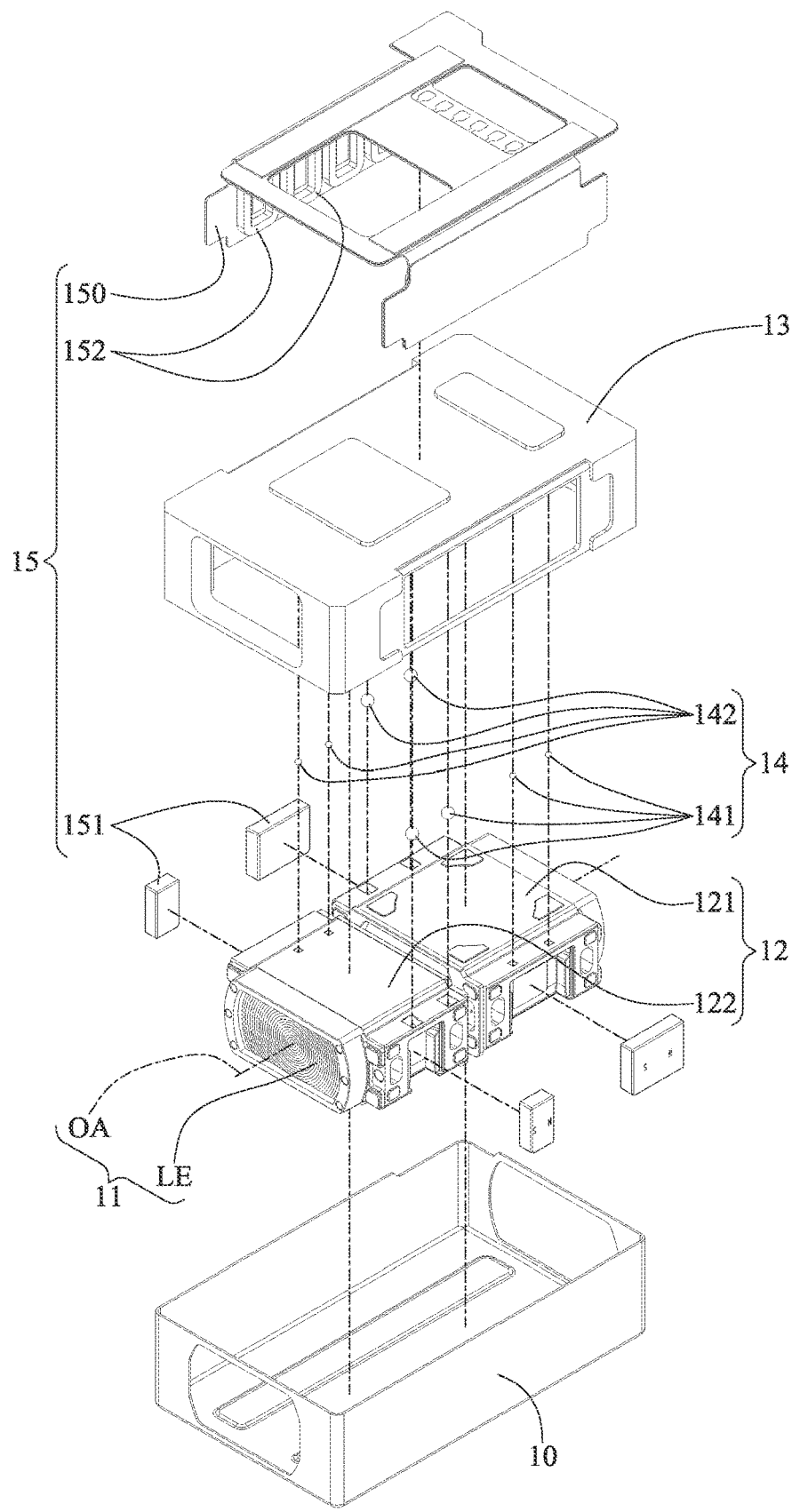
FIG. 3 is another exploded view of the imaging lens driving module in FIG. 1.
Figure 4:
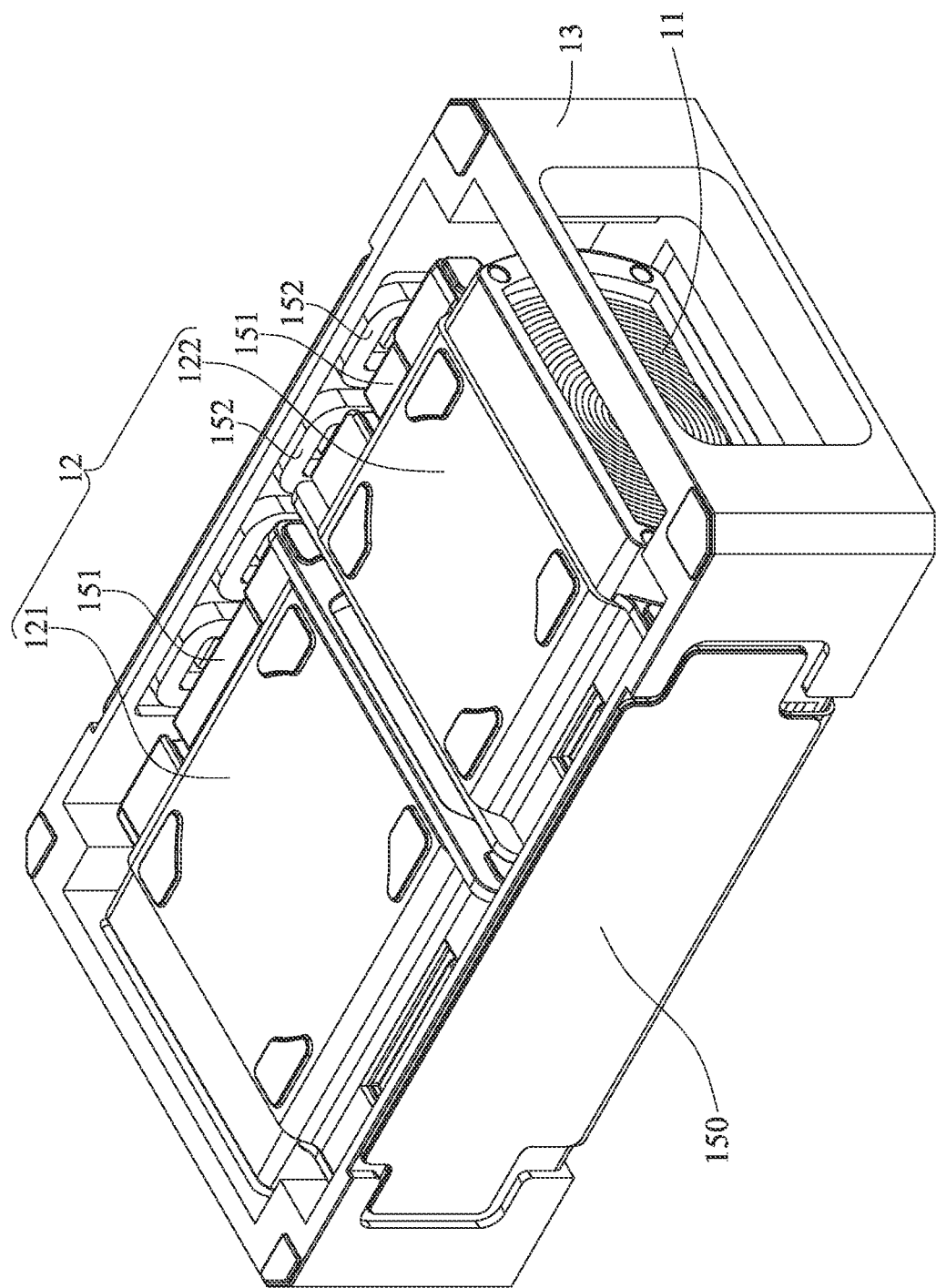
FIG. 4 is a perspective view of the imaging lens driving module in FIG. 1 without a casing.
Figure 5:
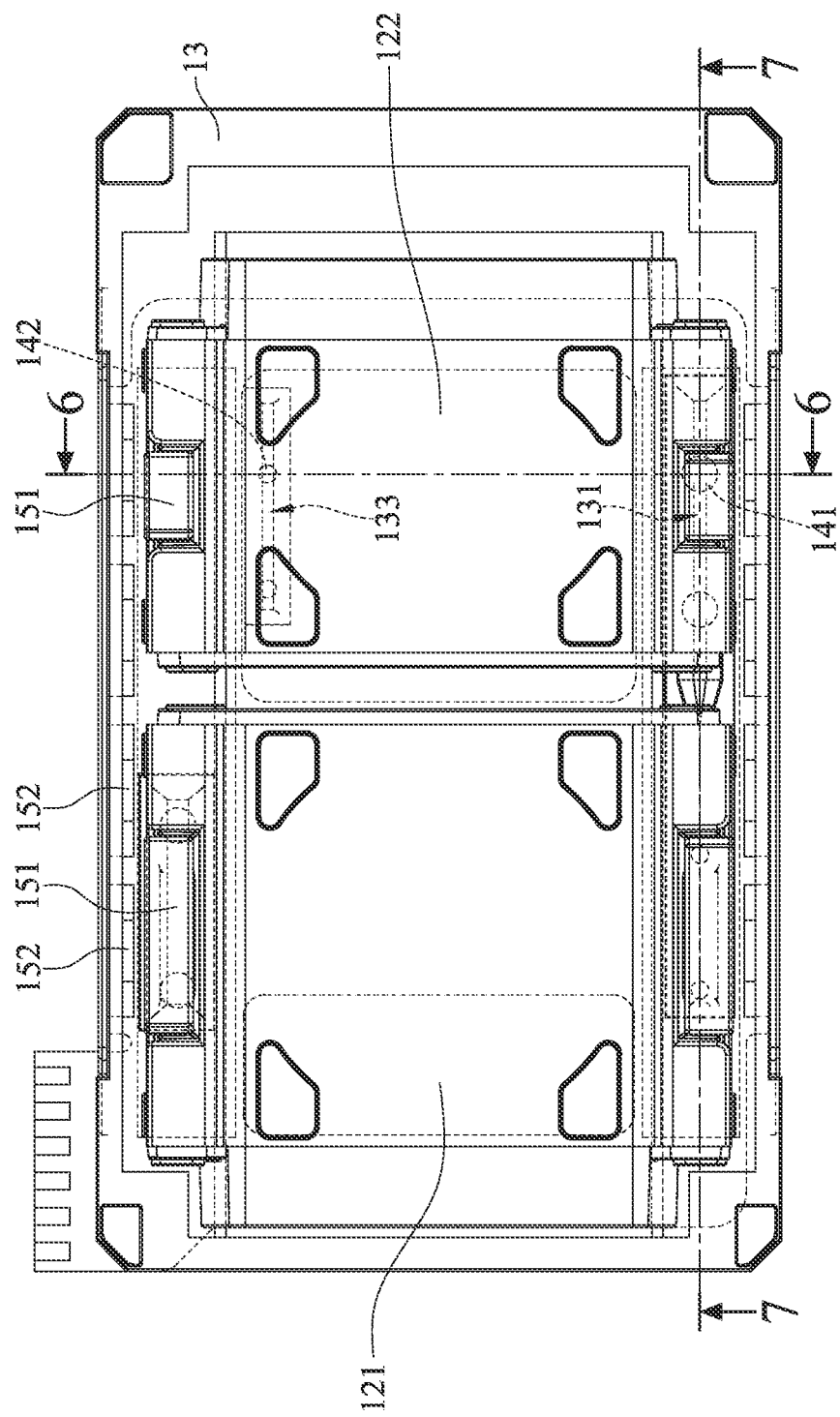
FIG. 5 is a top view of the imaging lens driving module in FIG. 4.
Figure 6:
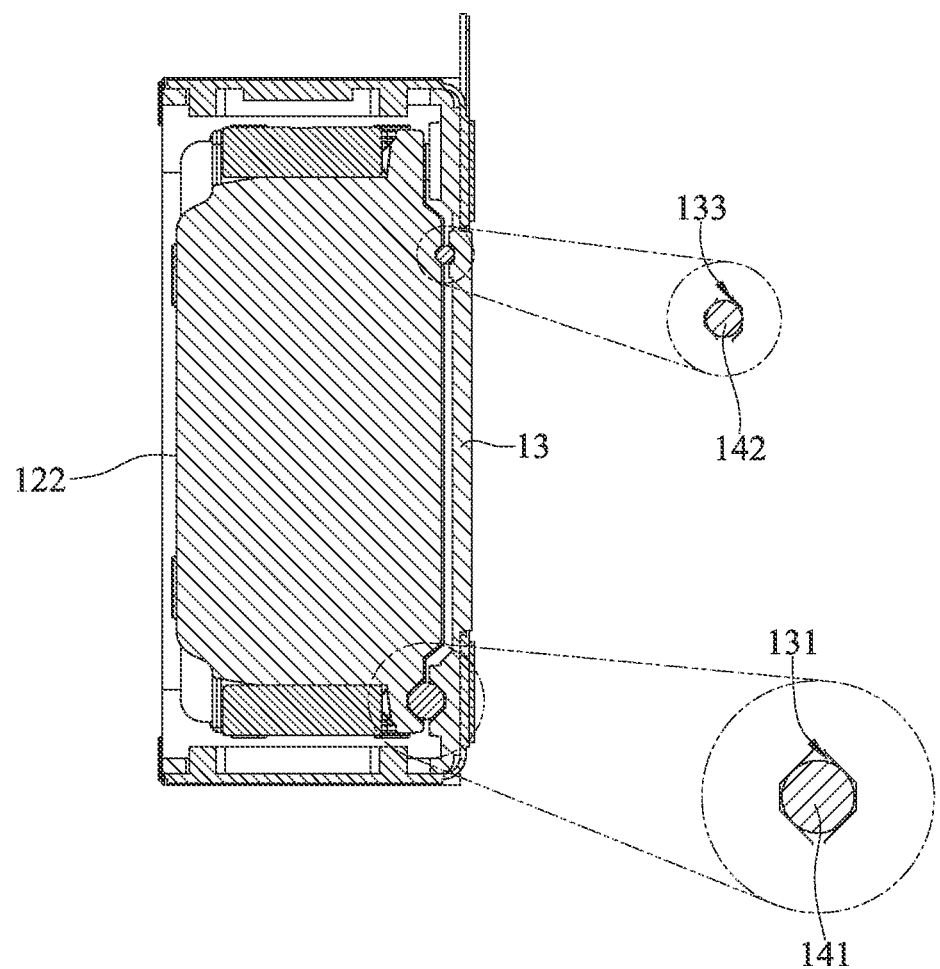
FIG. 6 is a cross-sectional view of the imaging lens driving module along line 6-6 in FIG. 5.
Figure 7:
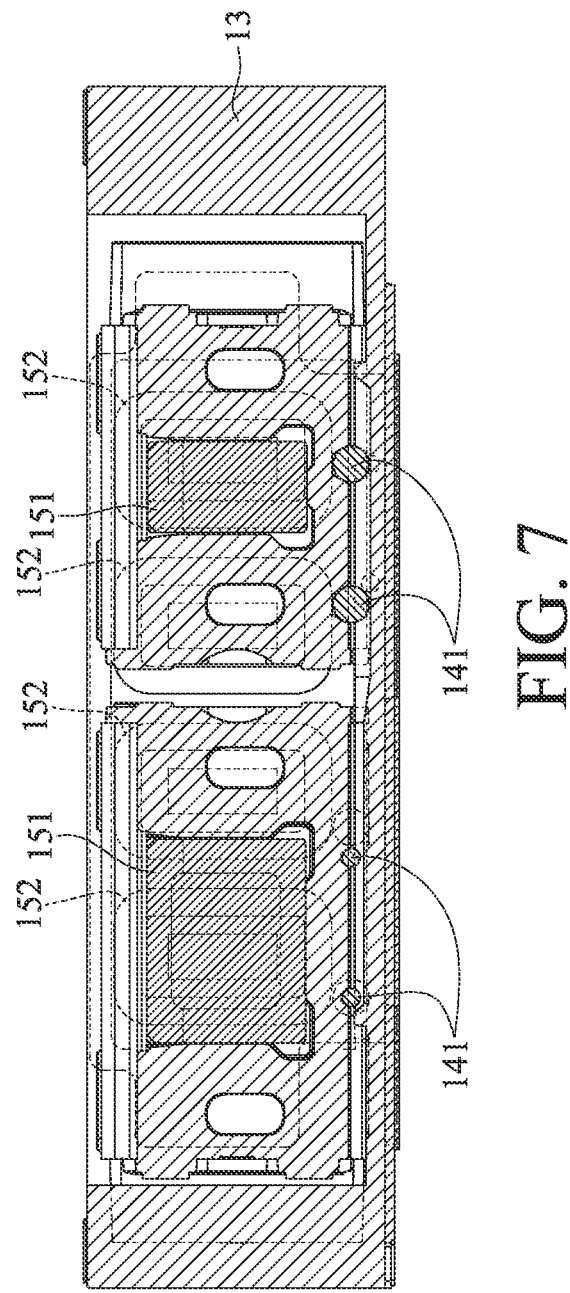
FIG. 7 is a cross-sectional view of the imaging lens driving module along line 7-7 in FIG. 5.
Figure 8:
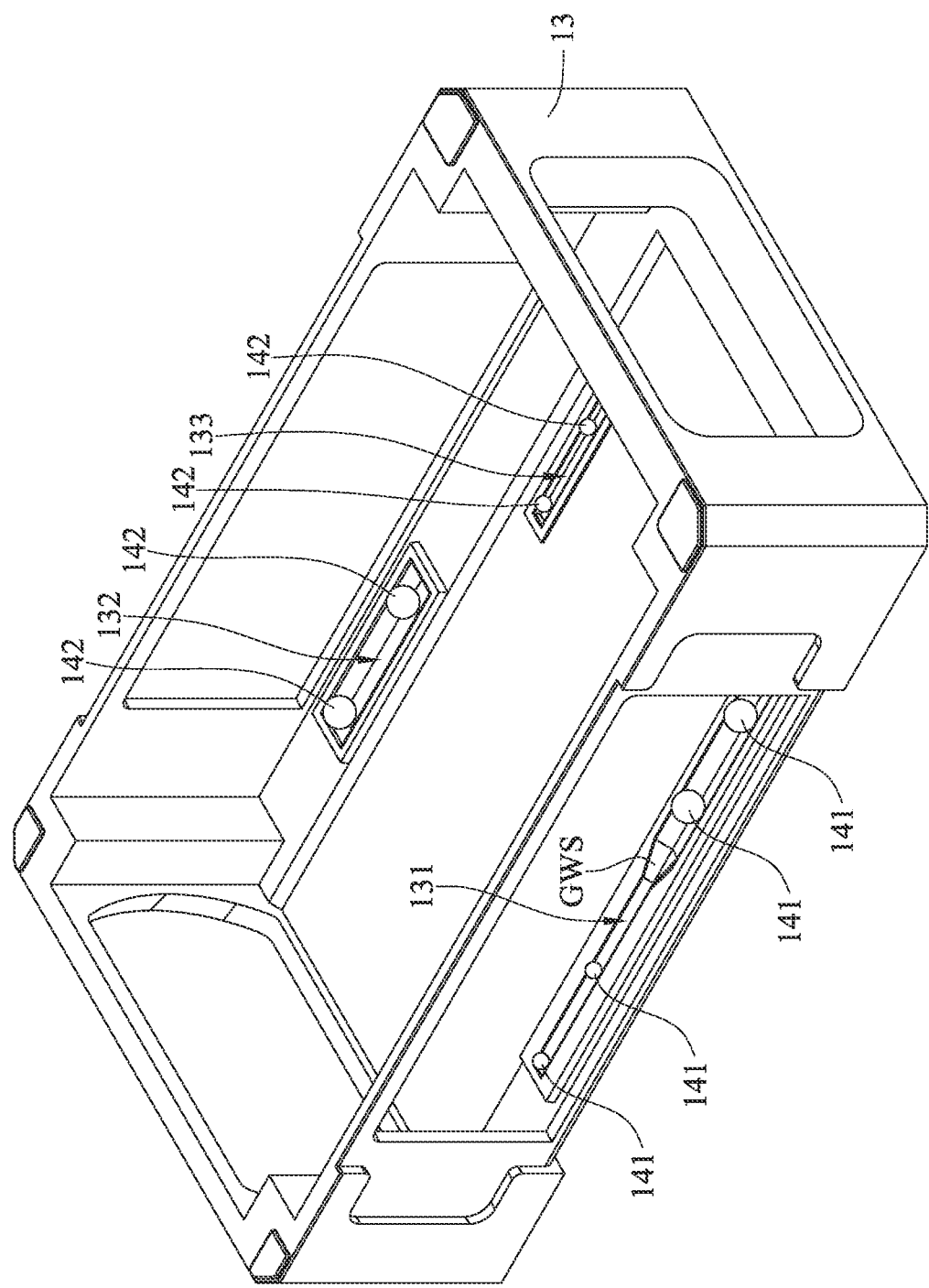
FIG. 8 is a perspective view of a base and a rollable support assembly of the imaging lens driving module in FIG. 1.
Figure 9:
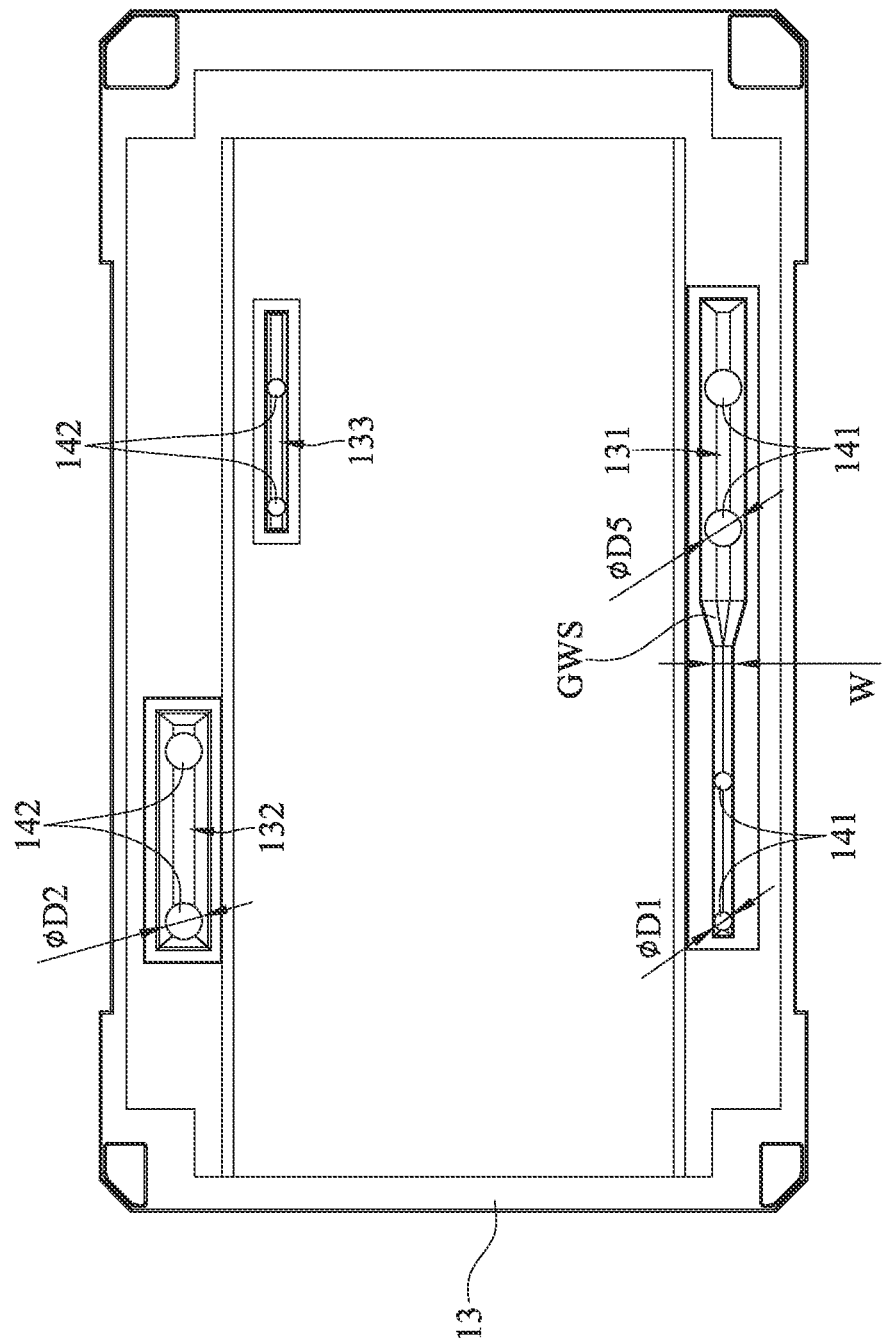
FIG. 9 is a top view of the base and the rollable support assembly in FIG. 8.

Please refer to FIG. 1 to FIG. 9. FIG. 1 is a perspective view of an imaging lens driving module according to the 1st embodiment of the present disclosure, FIG. 2 is an exploded view of the imaging lens driving module in FIG. 1, FIG. 3 is another exploded view of the imaging lens driving module in FIG. 1, FIG. 4 is a perspective view of the imaging lens driving module in FIG. 1 without a casing, FIG. 5 is a top view of the imaging lens driving module in FIG. 4, FIG. 6 is a cross-sectional view of the imaging lens driving module along line 6-6 in FIG. 5, FIG. 7 is a cross-sectional view of the imaging lens driving module along line 7-7 in FIG. 5, FIG. 8 is a perspective view of a base and a rollable support assembly of the imaging lens driving module in FIG. 1, and FIG. 9 is a top view of the base and the rollable support assembly in FIG. 8.

The imaging lens driving module 1 includes a casing 10, a lens system 11, a lens holder assembly 12, a base 13, a rollable support assembly 14 and a driving mechanism 15. The casing 10 is disposed on the base 13, and the casing 10 and base 13 together form an accommodation space for the lens holder assembly 12 to be slidably disposed therein. The lens system 11 has a plurality of optical lens elements LE, and the lens system 11 has an optical axis OA passing through the optical lens elements LE.

The lens holder assembly 12 includes, in order from the object side to the image side, a first lens holder 121 and a second lens holder 122. The first lens holder 121 is for some of the optical lens elements LE to be disposed therein, and the second lens holder 122 is for the other optical lens elements LE to be disposed therein. Moreover, each lens holder can accommodate one or more optical lens elements, and the present disclosure is not limited thereto.

The base 13 includes a guiding groove assembly 130, and the guiding groove assembly 130 includes a first guiding groove 131, a second guiding groove 132 and a third guiding groove 133. The first guiding groove 131 extends in a direction parallel to the optical axis OA and faces the first lens holder 121 and the second lens holder 122. The second guiding groove 132 extends in the direction parallel to the optical axis OA and only faces the first lens holder 121, and the third guiding groove 133 extends in the direction parallel to the optical axis OA and only faces the second lens holder 122. In specific, the first guiding groove 131 extends under the first lens holder 121 and the second lens holder 122, the second guiding groove 132 does not extend under the second lens holder 122 and thus does not face the second lens holder 122, and the third guiding groove 133 does not extend under the first lens holder 121 and thus does not face the first lens holder 121. In this embodiment, the first lens holder 121 and the second lens holder 122 of the lens holder assembly 12 share the first guiding groove 131, such that the lens holder assembly 12 has a partially shared rail design.

The rollable support assembly 14 is disposed between the lens holder assembly 12 and the base 13, and the rollable support assembly 14 is in physical contact with the lens holder assembly 12 and the base 13, such that the lens holder assembly 12 has a degree of freedom of parallel movement with respect to the base 13. The rollable support assembly 14 includes four principal rollable support elements 141 and four auxiliary rollable support elements 142. Two of the principal rollable support elements 141 are disposed between the first lens holder 121 and the first guiding groove 131, and the other two of the principal rollable support elements 141 are disposed between the second lens holder 122 and the first guiding groove 131. Two of the auxiliary rollable support elements 142 are disposed between the first lens holder 121 and the second guiding groove 132, and the other two of the auxiliary rollable support elements 142 are disposed between the second lens holder 122 and the third guiding groove 133. In this embodiment, the principal rollable support elements 141 and the auxiliary rollable support elements 142 are rigid balls.

As shown in FIG. 6, the first guiding groove 131 has two contact points with one principal rollable support element 141 so as to ensure straight movement of the principal rollable support element 141 in the direction parallel to the optical axis. In addition, each of the second guiding groove 132 and the third guiding groove 133 has a single contact point with one auxiliary rollable support element 142 so as to compensate for remaining assembly errors.

As shown in FIG. 8 and FIG. 9, the first guiding groove 131 has different cross-sectional areas in the direction parallel to the optical axis OA, such that the first guiding groove 131 forms a blocking mechanism at a portion thereof having a relatively small cross-sectional area so as to block the principal rollable support element 141, and therefore provides feasibility of the blocking mechanism and the base 13 to be one-piece formed. In addition, the first guiding groove 131 has a gradually expanding surface GWS, and the gradually expanding surface GWS gradually expands from the object side to the image side of the lens system 11 in the direction parallel to the optical axis OA so as to provide a configuration where the blocking mechanism provides better blocking effect.

The driving mechanism 15 includes a flexible printed circuit board 150, a plurality of driving magnets 151 and a plurality of driving coils 152. The flexible printed circuit board 150 is attached to the base 13, the driving magnets 151 are disposed on two opposite sides of the lens holder assembly 12, and the driving coils 152 are disposed on the flexible printed circuit board 150 and respectively correspond to the driving magnets 151. The driving mechanism 15 provides a driving force generated by the driving magnets 151 and the driving coils 152 to drive the lens holder assembly 12 to move, and with the collaboration of the principal rollable support elements 141 of the rollable support assembly 14, the lens holder assembly 12 is movable along the first guiding groove 131 (i.e., in the direction parallel to the optical axis OA) with respect to the base 13 after being driven by the driving mechanism 15. Moreover, each of the first lens holder 121 and the second lens holder 122 may have a relative motion with respect to each other.

When a diameter of the principal rollable support element 141 in physical contact with the first lens holder 121 is $\Phi D1$, and a diameter of the auxiliary rollable support element 142 in physical contact with the first lens holder 121 is $\Phi D2$, the following condition is satisfied: $\Phi D1 < \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. In this embodiment, both the diameters of the two principal rollable support elements 141 located between the first lens holder 121 and the first guiding groove 131 can be $\Phi D1$, and the two principal rollable support elements 141 are in physical contact with the first lens holder 121; alternatively, due to manufacturing errors, there may be only one of the two principal rollable support elements 141 located between the first lens holder 121 and the first guiding groove 131 having a diameter being $\Phi D1$ and in physical contact with the first lens holder 121, while the other principal rollable support element 141 has a diameter smaller than $\Phi D1$ and is not in physical contact with the first lens holder 121. Similarly, both the diameters of the two auxiliary rollable support elements 142 located between the first lens holder 121 and the second guiding groove 132 can be $\Phi D2$, and the two auxiliary rollable support elements 142 are in physical contact with the first lens holder 121; alternatively, due to manufacturing errors, there may be only one of the two auxiliary rollable support elements 142 located between the first lens holder 121 and the second guiding groove 132 having a diameter being $\Phi D2$ and in physical contact with the first lens holder 121, while the other auxiliary rollable support element 142 has a diameter smaller than $\Phi D2$ and is not in physical contact with the first lens holder 121.

When a minimum width of the gradually expanding surface GWS is W, and a diameter of the principal rollable support element 141 having the maximum diameter among the principal rollable support elements 141 is $\Phi D5$, the following condition is satisfied: $W < \Phi D5$. Therefore, it is favorable for the gradually expanding surface GWS to have the blocking mechanism, and the blocking mechanism provides better blocking effect when the above condition range is satisfied, thereby restricting the movement range of the principal rollable support elements 141 in the direction parallel to the optical axis OA. In this embodiment, both the diameters of the two principal rollable support elements 141 located between the second lens holder 122 and the first guiding groove 131 can be $\Phi D5$, and the two principal rollable support elements 141 are in physical contact with the second lens holder 122; alternatively, due to manufacturing errors, there may be only one of the two principal rollable support elements 141 located between the second lens holder 122 and the first guiding groove 131 having a diameter being ΦD5 and in physical contact with the second lens holder 122, while the other principal rollable support element 141 has a diameter smaller than ΦD5 and is not in physical contact with the second lens holder 122.

When the number of the principal rollable support elements 141 is N1, and the number of the auxiliary rollable support elements 142 is N2, the following condition is satisfied: N2=N1. Therefore, a proper number arrangement of the principal rollable support elements 141 and the auxiliary rollable support elements 142 is favorable for optimizing the driving efficiency of the imaging lens driving module 1. In this embodiment, the number (N1) of the principal rollable support elements 141 is four, and also, the number (N2) of the auxiliary rollable support elements 142 is four.

2nd Embodiment

Figure 10:
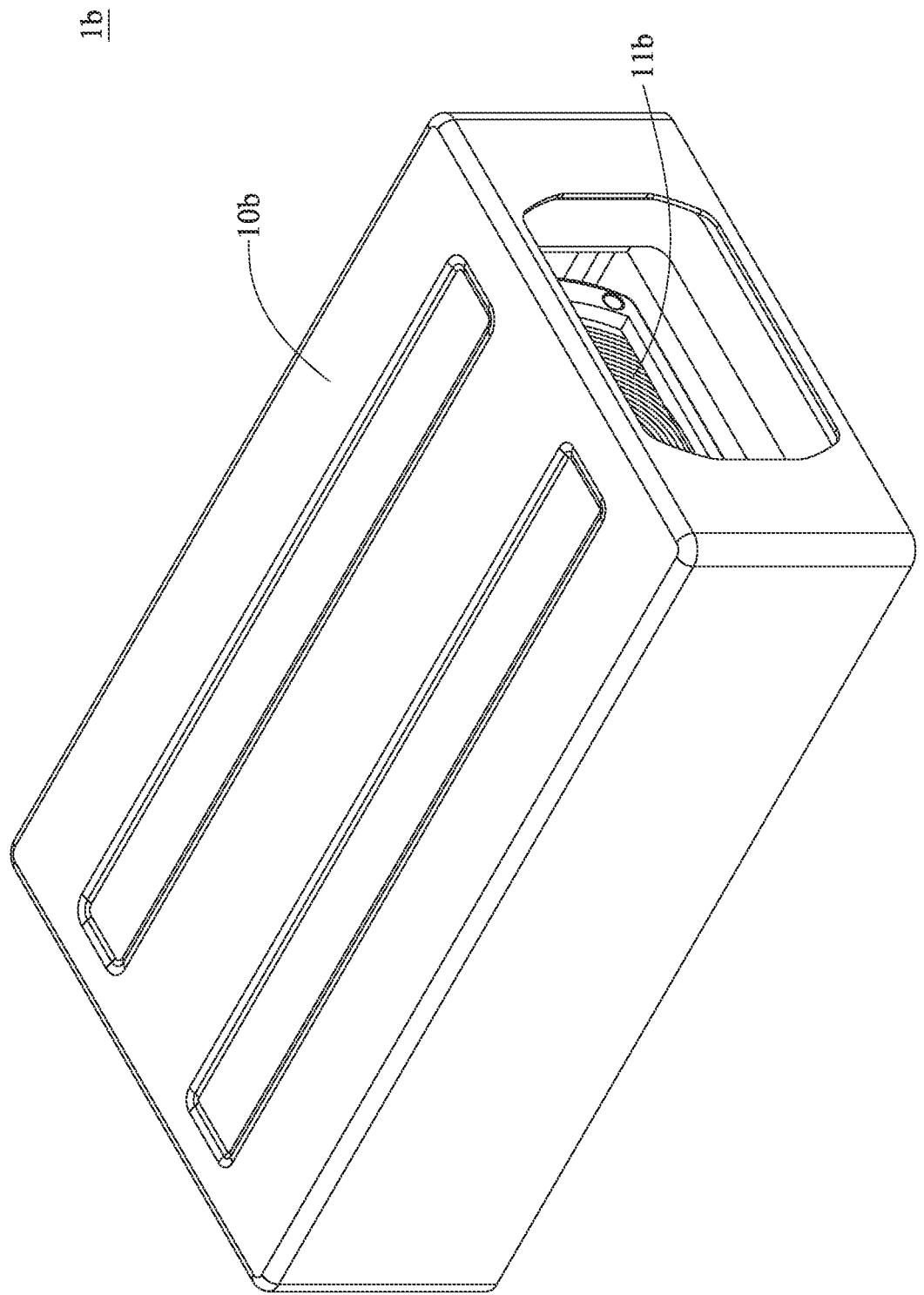
FIG. 10 is a perspective view of an imaging lens driving module according to the 2nd embodiment of the present disclosure.
Figure 11:
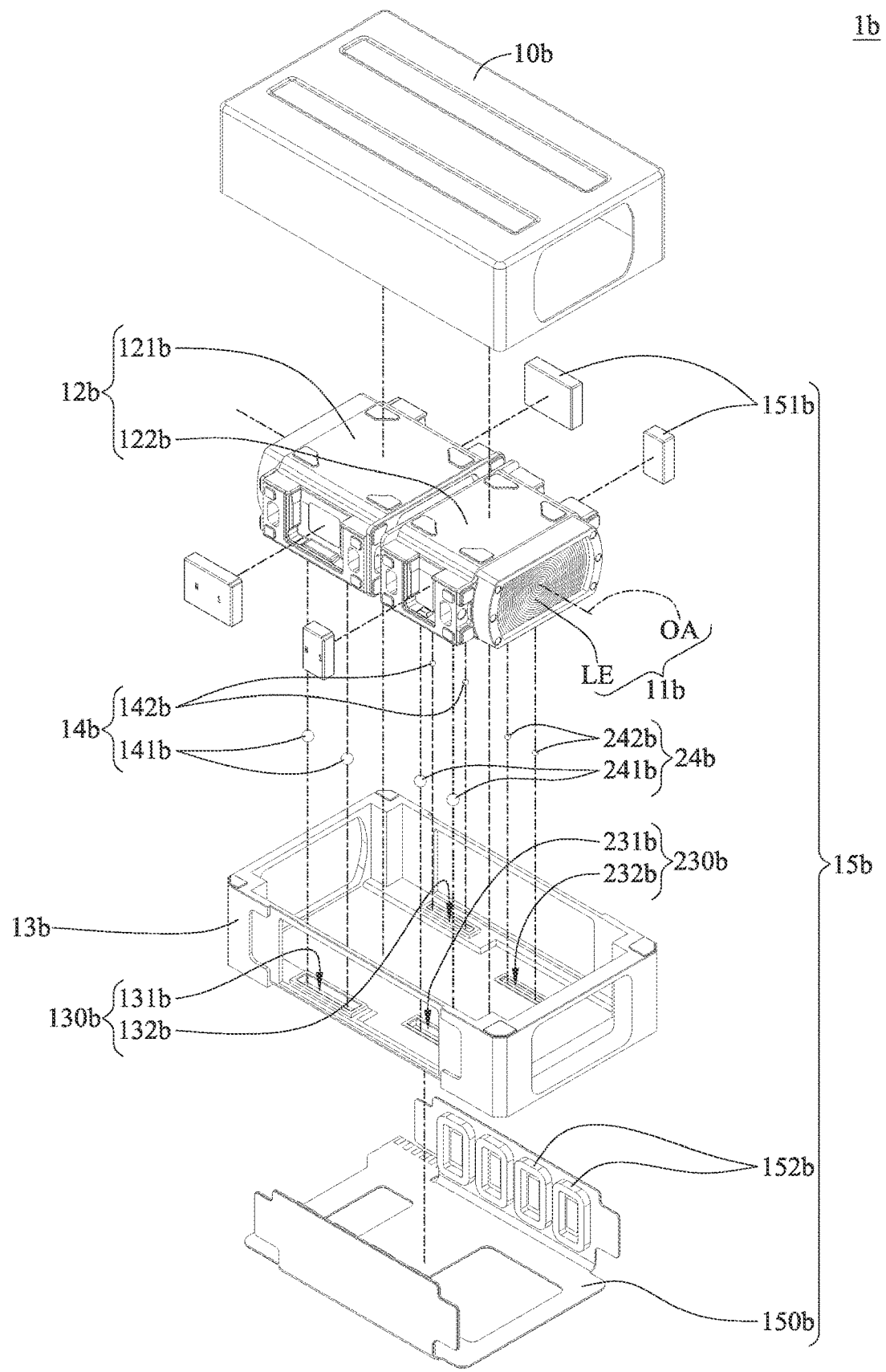
FIG. 11 is an exploded view of the imaging lens driving module in FIG. 10.
Figure 12:
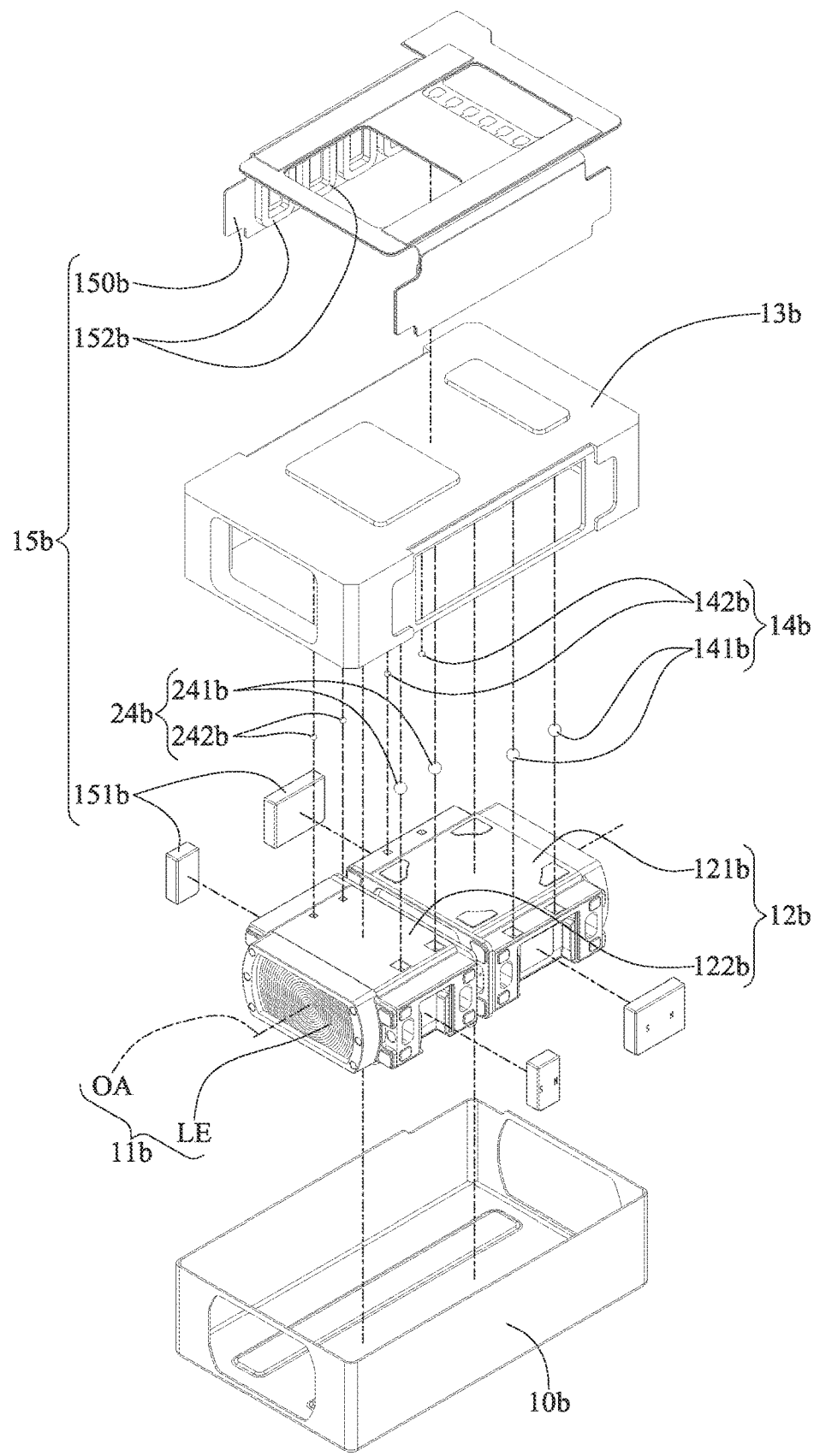
FIG. 12 is another exploded view of the imaging lens driving module in FIG. 10.
Figure 13:
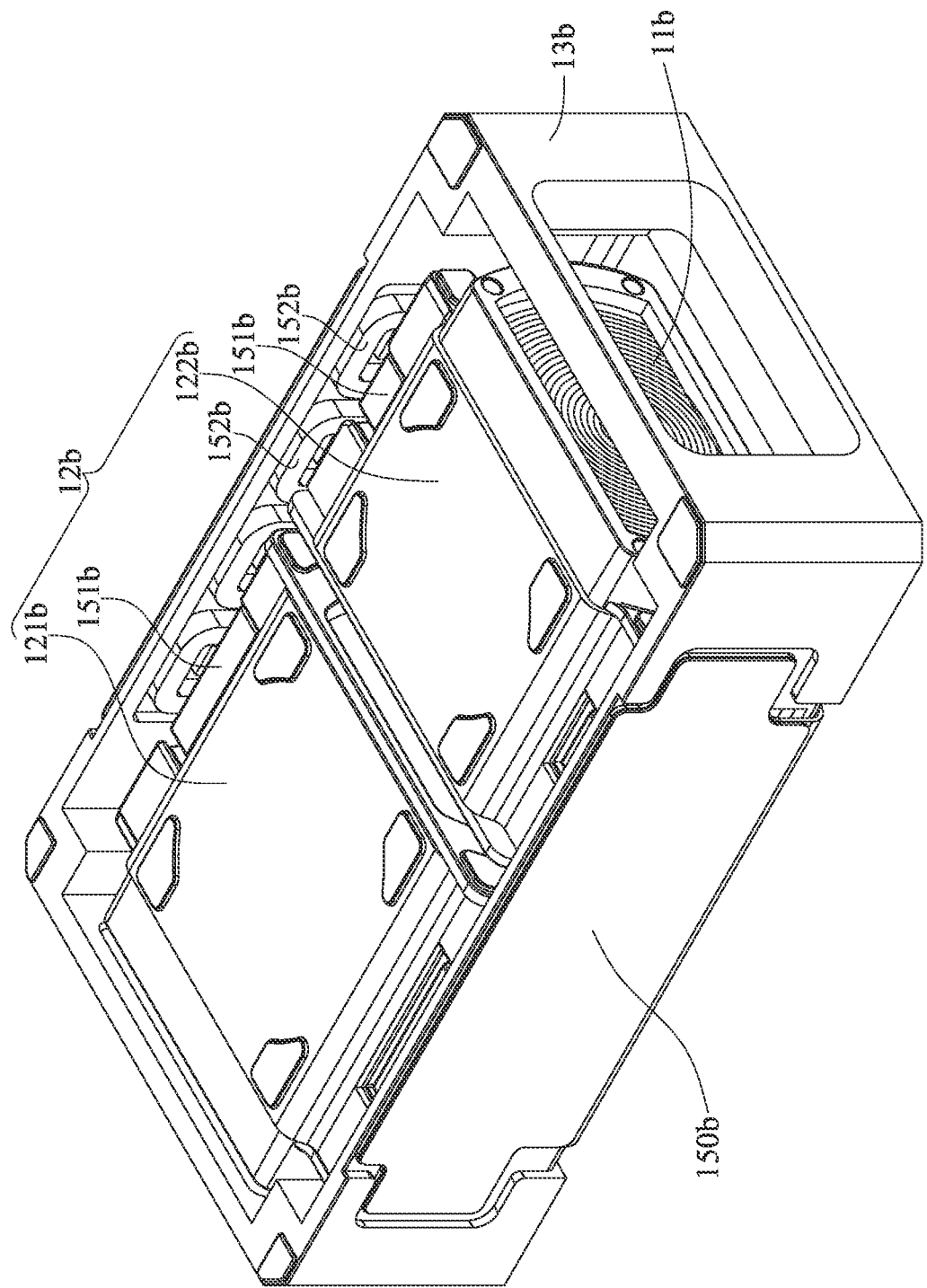
FIG. 13 is a perspective view of the imaging lens driving module in FIG. 10 without a casing.
Figure 14:
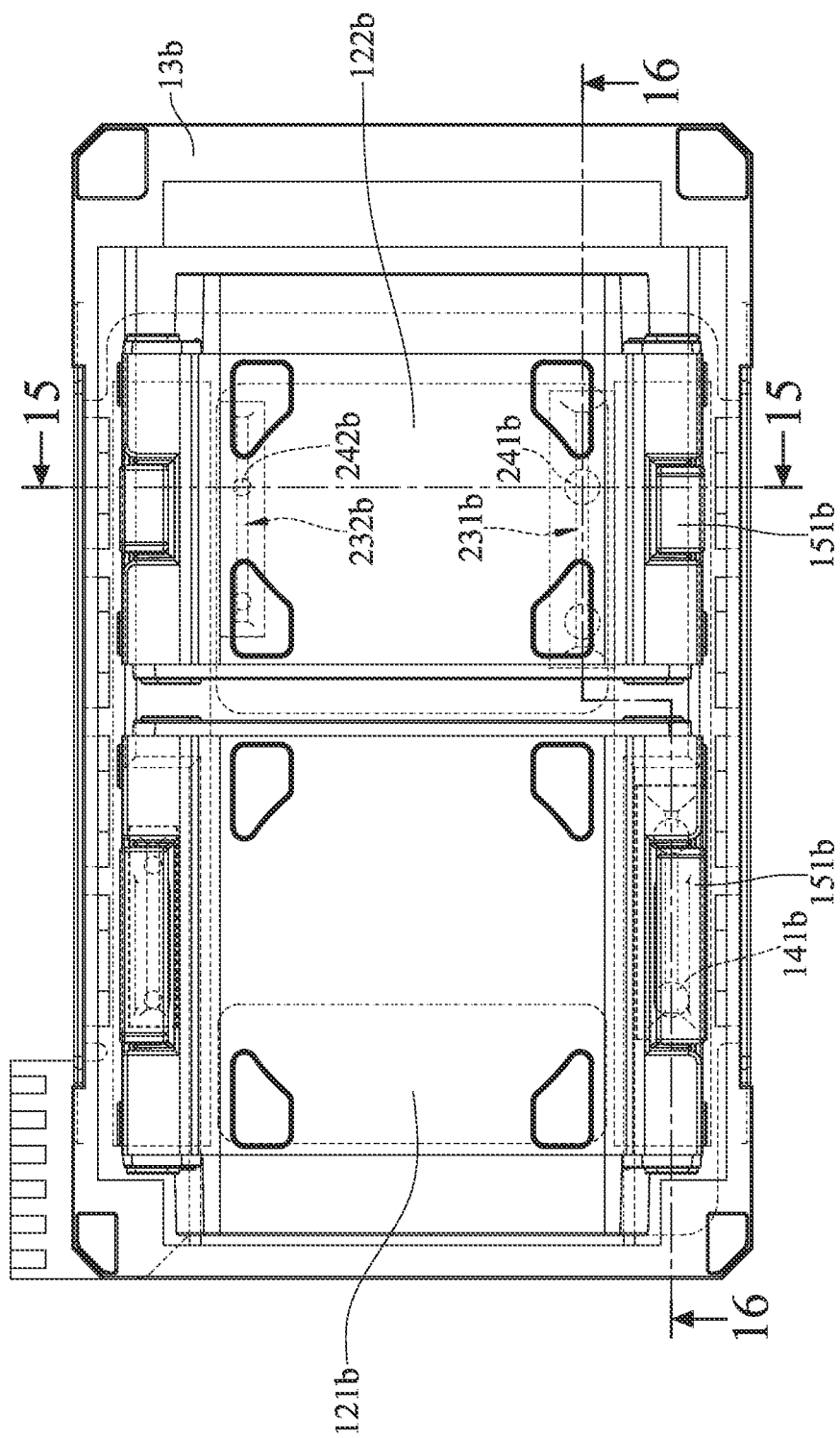
FIG. 14 is a top view of the imaging lens driving module in FIG. 13.
Figure 15:
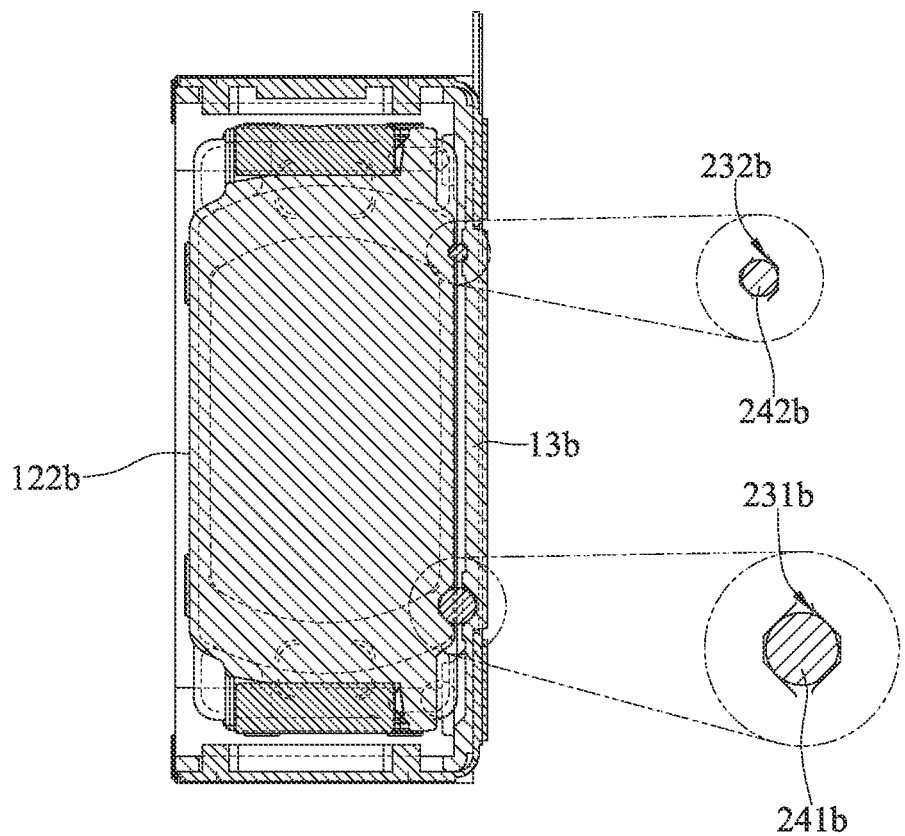
FIG. 15 is a cross-sectional view of the imaging lens driving module along line 15-15 in FIG. 14.
Figure 16:
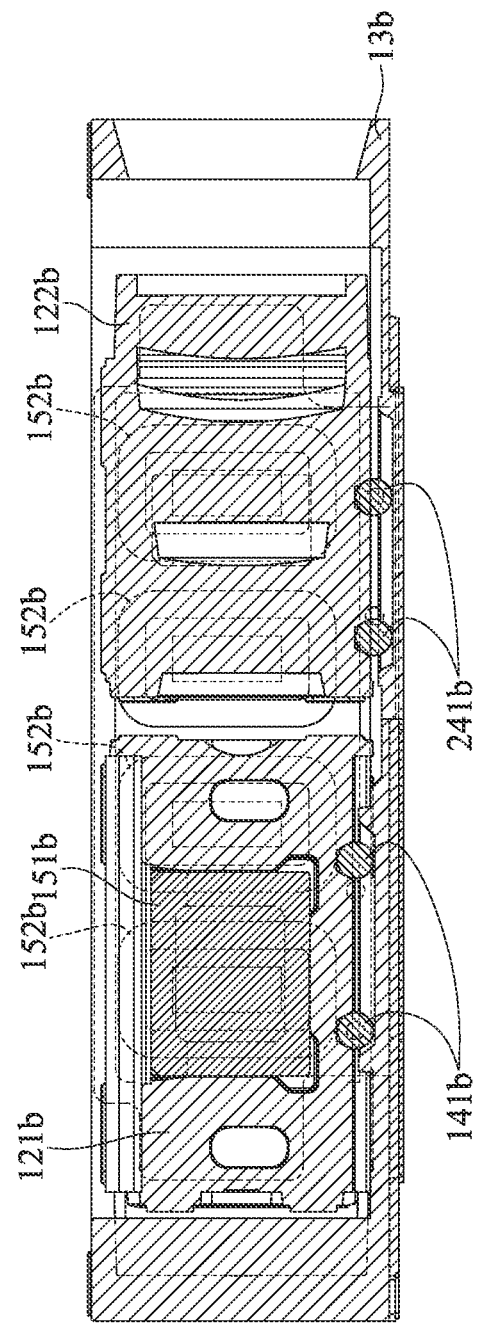
FIG. 16 is a cross-sectional view of the imaging lens driving module along line 16-16 in FIG. 14.
Figure 17:
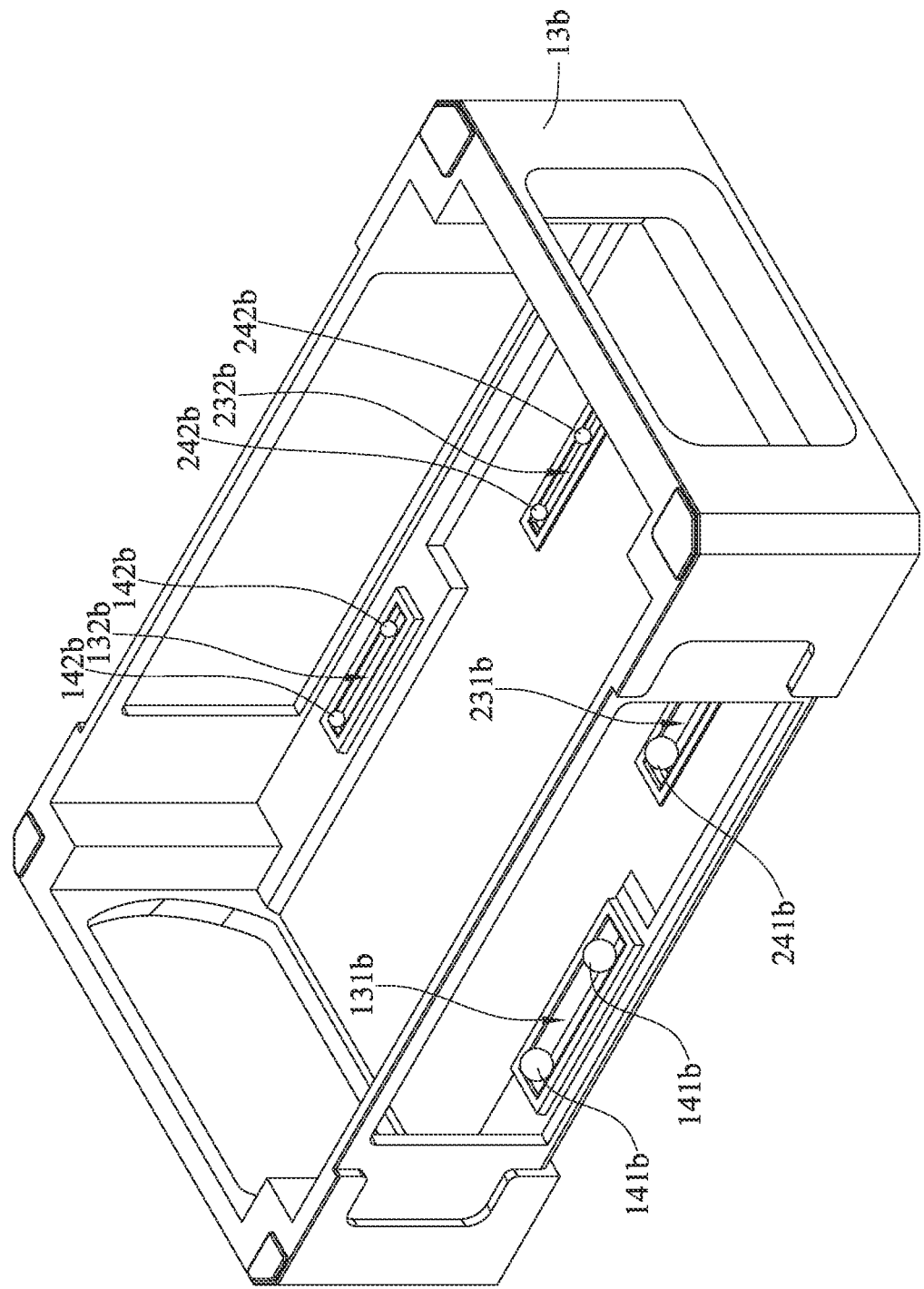
FIG. 17 is a perspective view of a base and rollable support assemblies of the imaging lens driving module in FIG. 10.
Figure 18:
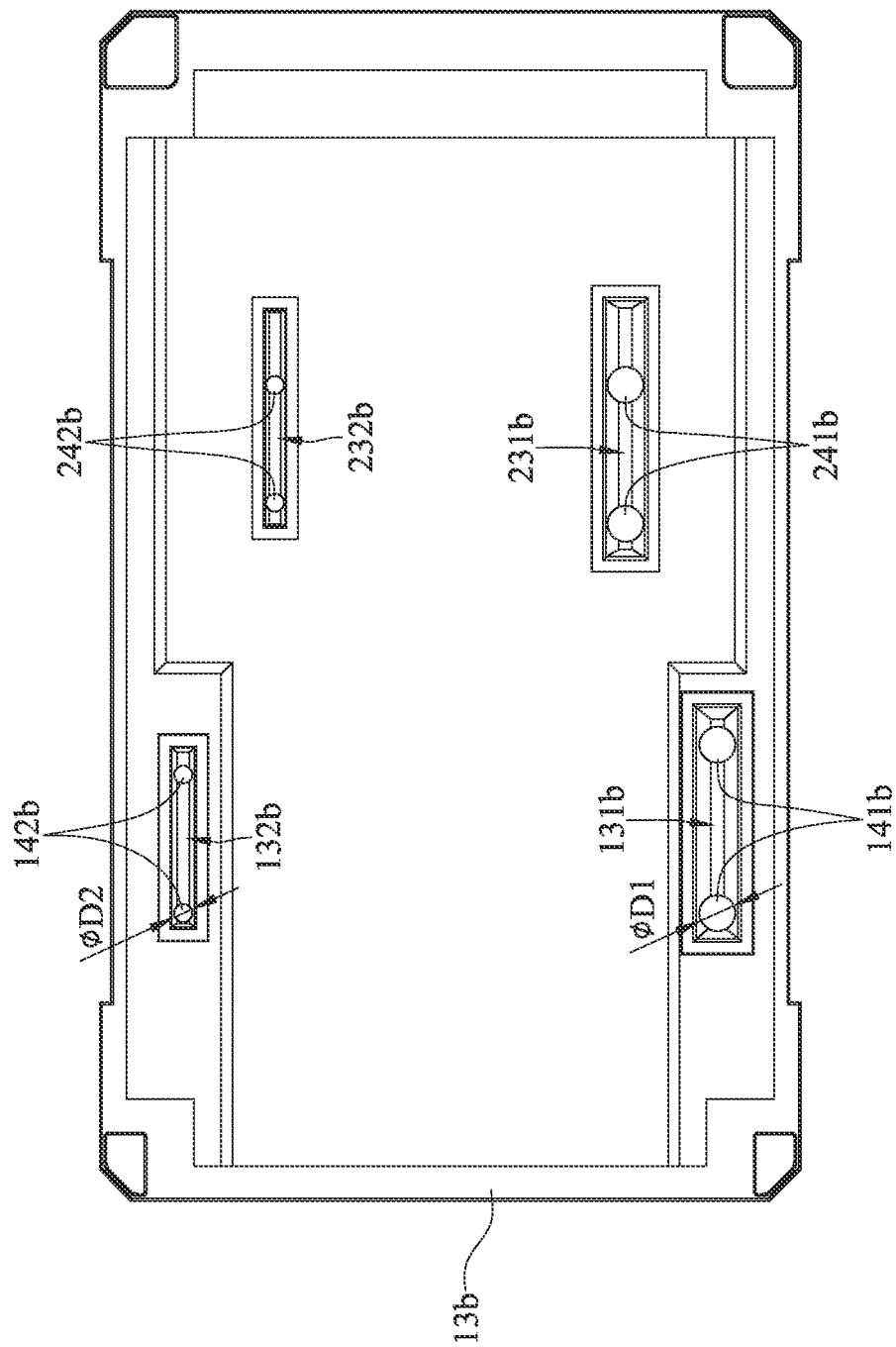
FIG. 18 is a top view of the base and the rollable support assemblies in FIG. 17.

Please refer to FIG. 10 to FIG. 18. FIG. 10 is a perspective view of an imaging lens driving module according to the 2nd embodiment of the present disclosure, FIG. 11 is an exploded view of the imaging lens driving module in FIG. 10, FIG. 12 is another exploded view of the imaging lens driving module in FIG. 10, FIG. 13 is a perspective view of the imaging lens driving module in FIG. 10 without a casing, FIG. 14 is a top view of the imaging lens driving module in FIG. 13, FIG. 15 is a cross-sectional view of the imaging lens driving module along line 15-15 in FIG. 14, FIG. 16 is a cross-sectional view of the imaging lens driving module along line 16-16 in FIG. 14, FIG. 17 is a perspective view of a base and rollable support assemblies of the imaging lens driving module in FIG. 10, and FIG. 18 is a top view of the base and the rollable support assemblies in FIG. 17.

The imaging lens driving module 1b includes a casing 10b, a lens system 11b, a lens holder assembly 12b, a base 13b, two rollable support assemblies 14b and 24b, and a driving mechanism 15b. The casing 10b is disposed on the base 13b, and the casing 10b and the base 13b together form an accommodation space for the lens holder assembly 12b to be slidably disposed therein. The lens system 11b has a plurality of optical lens elements LE, and the lens system 11b has an optical axis OA passing through the optical lens elements LE.

The lens holder assembly 12b includes, in order from the object side to the image side, a first lens holder 121b and a second lens holder 122b. The first lens holder 121b is for some of the optical lens elements LE to be disposed therein, and the second lens holder 122b is for the other optical lens elements LE to be disposed therein.

The base 13b includes two guiding groove assemblies 130b and 230b which are a first guiding groove assembly 130b and a second guiding groove assembly 230b. The first guiding groove assembly 130b faces the first lens holder 121b, and the first guiding groove assembly 130b includes a first guiding groove 131b and a second guiding groove 132b. The first guiding groove 131b extends in a direction parallel to the optical axis OA, and the second guiding groove 132b extends in the direction parallel to the optical axis OA and is disposed opposite to the first guiding groove 131b. The second guiding groove assembly 230b faces the second lens holder 122b, and the second guiding groove assembly 230b includes a third guiding groove 231b and a fourth guiding groove 232b. The third guiding groove 231b extends in the direction parallel to the optical axis OA, and the fourth guiding groove 232b extends in the direction parallel to the optical axis OA and is disposed opposite to the third guiding groove 231b.

The rollable support assemblies 14b and 24b are disposed between the lens holder assembly 12b and the base 13b, and the rollable support assemblies 14b and 24b are in physical contact with the lens holder assembly 12b and the base 13b, such that the lens holder assembly 12b has a degree of freedom of parallel movement with respect to the base 13b. The rollable support assemblies 14b and 24b are respectively a first rollable support assembly 14b and a second rollable support assembly 24b. The first rollable support assembly 14b includes two first principal rollable support elements 141b and two first auxiliary rollable support elements 142b. The first principal rollable support elements 141b are disposed between the first lens holder 121b and the first guiding groove 131b, and the first auxiliary rollable support elements 142b are disposed between the first lens holder 121b and the second guiding groove 132b. The second rollable support assembly 24b includes two second principal rollable support elements 241b and two second auxiliary rollable support elements 242b. The second principal rollable support elements 241b are disposed between the second lens holder 122b and the third guiding groove 231b, and the second auxiliary rollable support elements 242b are disposed between the second lens holder 122b and the fourth guiding groove 232b.

In this embodiment, the first guiding groove 131b has two contact points with one first principal rollable support element 141b, and the third guiding groove 231b has two contact points with one second principal rollable support element 241b (as shown in FIG. 15) so as to ensure straight movement of the principal rollable support element 141b in the direction parallel to the optical axis. In addition, the second guiding groove 132b has a single contact point with one first auxiliary rollable support element 142b, and the fourth guiding groove 232b has a single contact point with one second auxiliary rollable support element 242b (as shown in FIG. 15) so as to compensate for remaining assembly errors and absorb assembly warpage generated during the assembly process, thereby improving yield rate.

The driving mechanism 15b includes a flexible printed circuit board 150b, a plurality of driving magnets 151b and a plurality of driving coils 152b. The flexible printed circuit board 150b is attached to the base 13b, the driving magnets 151b are disposed on two opposite sides of the lens holder assembly 12b, and the driving coils 152b are disposed on the flexible printed circuit board 150b and respectively correspond to the driving magnets 151b. The driving mechanism 15b provides a driving force generated by the driving magnets 151b and the driving coils 152b to drive the lens holder assembly 12b to move, and with the collaboration of the principal rollable support elements 141b and 241b of the rollable support assemblies 14b and 24b, the lens holder assembly 12b is movable along the first guiding groove 131b and the third guiding groove 231b (i.e., in the direction parallel to the optical axis OA) with respect to the base 13b after being driven by the driving mechanism 15b. Moreover, each of the first lens holder 121b and the second lens holder 122b may have a relative motion with respect to each other.

When a diameter of the first principal rollable support element 141b in physical contact with the first lens holder 121b is ΦD1, and a diameter of the first auxiliary rollable support element 142b in physical contact with the first lens holder 121b is ΦD2, the following condition is satisfied:

ΦD1>ΦD2. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. In this embodiment, both the diameters of the two first principal rollable support elements 141b located between the first lens holder 121b and the first guiding groove 131b can be ΦD1, and the two first principal rollable support elements 141b are in physical contact with the first lens holder 121b; alternatively, due to manufacturing errors, there may be only one of the two first principal rollable support elements 141b located between the first lens holder 121b and the first guiding groove 131b having a diameter being ΦD1 and in physical contact with the first lens holder 121b, while the other first principal rollable support element 141b has a diameter smaller than ΦD1 and is not in physical contact with the first lens holder 121b. Similarly, both the diameters of the two first auxiliary rollable support elements 142b located between the first lens holder 121b and the second guiding groove 132b can be ΦD2, and the two first auxiliary rollable support elements 142b are in physical contact with the first lens holder 121b; alternatively, due to manufacturing errors, there may be only one of the two first auxiliary rollable support elements 142b located between the first lens holder 121b and the second guiding groove 132b having a diameter being ΦD2 and in physical contact with the first lens holder 121b, while the other first auxiliary rollable support element 142b has a diameter smaller than ΦD2 and is not in physical contact with the first lens holder 121b.

When the number of the principal rollable support elements 141b and 241b is N1, and the number of the auxiliary rollable support elements 142b and 242b is N2, the following condition is satisfied: N2=N1. Therefore, a proper number arrangement of the principal rollable support elements 141b and 241b and the auxiliary rollable support elements 142b and 242b is favorable for optimizing the driving efficiency of the imaging lens driving module 1b. In this embodiment, the total number (N1) of the first principal rollable support elements 141b and the second principal rollable support elements 241b is four, and also, the total number (N2) of the first auxiliary rollable support elements 142b and the second auxiliary rollable support elements 242b is four.

As shown in FIG. 17 and FIG. 18, the first guiding groove assembly 130b (i.e., the first guiding groove 131b and the second guiding groove 132b) and the second guiding groove assembly 230b (i.e., the third guiding groove 231b and the fourth guiding groove 232b) do not overlap each other in the direction parallel to the optical axis OA, and the first guiding groove assembly 130b and the second guiding groove assembly 230b do not overlap each other in a direction perpendicular to the optical axis OA, either. Therefore, it is favorable for increasing the mold design flexibility so as to meet requirements of guiding grooves for various driving manners.

Figure 19:
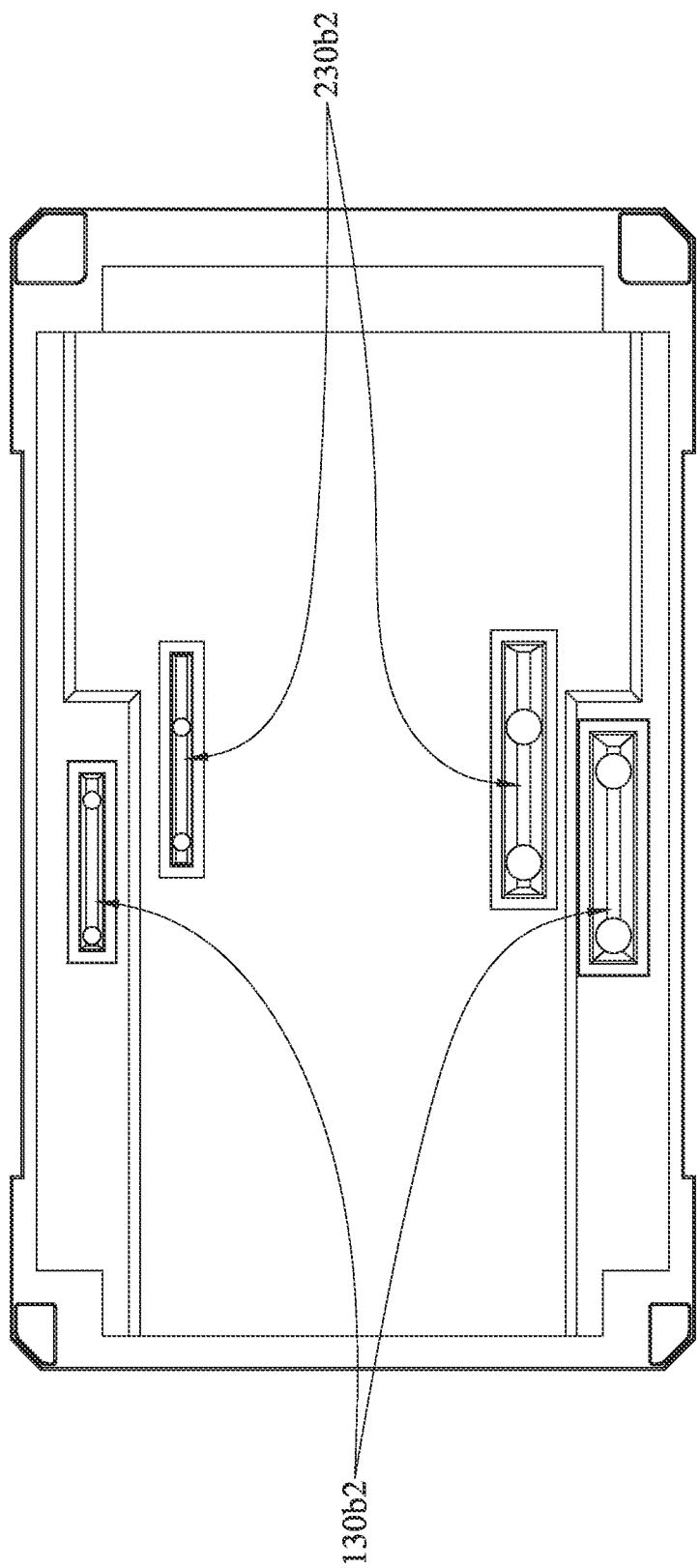
FIG. 19 is a top view of a base and rollable support assemblies of the imaging lens driving module in FIG. 10 according to another example of the present disclosure.

However, the present disclosure is not limited to the above described configuration of guiding groove assembly. Please refer to FIG. 19 and FIG. 20. FIG. 19 is a top view of a base and rollable support assemblies of the imaging lens driving module in FIG. 10 according to another example of the present disclosure, and FIG. 20 is a top view of a base and rollable support assemblies of the imaging lens driving module in FIG. 10 according to another example of the present disclosure.

As shown in FIG. 19, in one example, the first guiding groove assembly 130b2 and the second guiding groove assembly 230b2 overlap each other in the direction perpendicular to the optical axis OA, but not overlap each other in the direction parallel to the optical axis OA.

Figure 20:
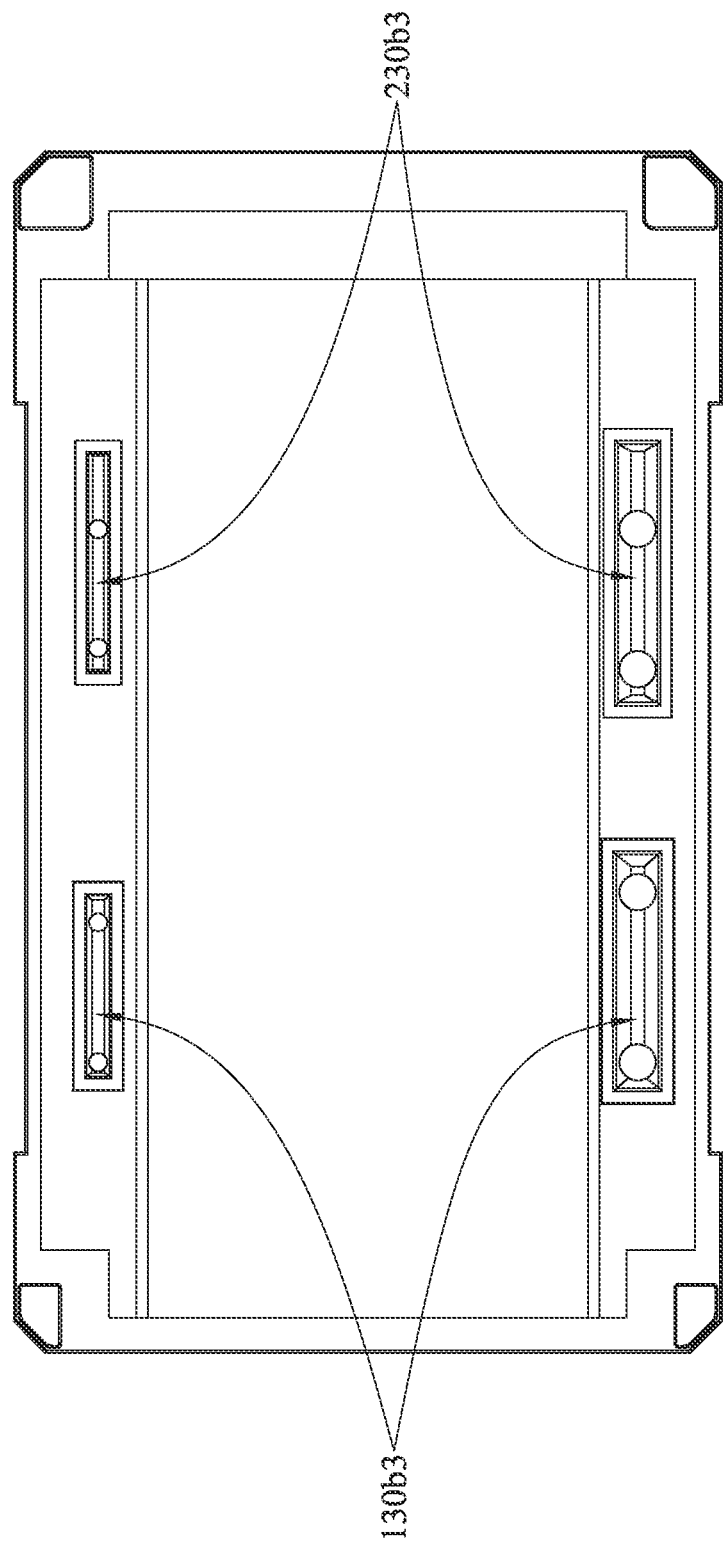
FIG. 20 is a top view of a base and rollable support assemblies of the imaging lens driving module in FIG. 10 according to another example of the present disclosure.

As shown in FIG. 20, in one example, the first guiding groove assembly 130b3 and the second guiding groove assembly 230b3 overlap each other in the direction parallel to the optical axis OA, but not overlap each other in the direction perpendicular to the optical axis OA.

3rd Embodiment

Figure 21:
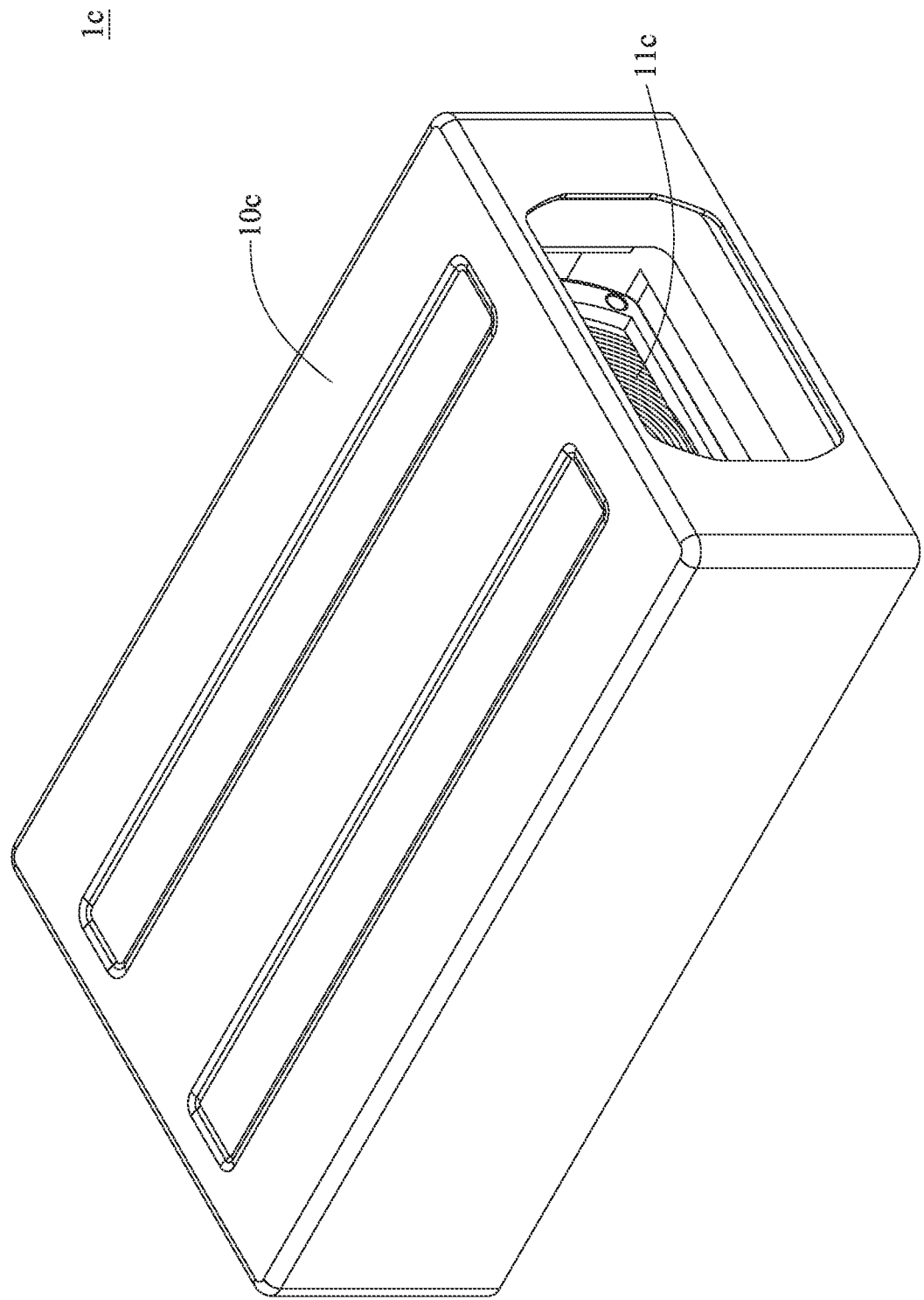
FIG. 21 is a perspective view of an imaging lens driving module according to the 3rd embodiment of the present disclosure.
Figure 22:
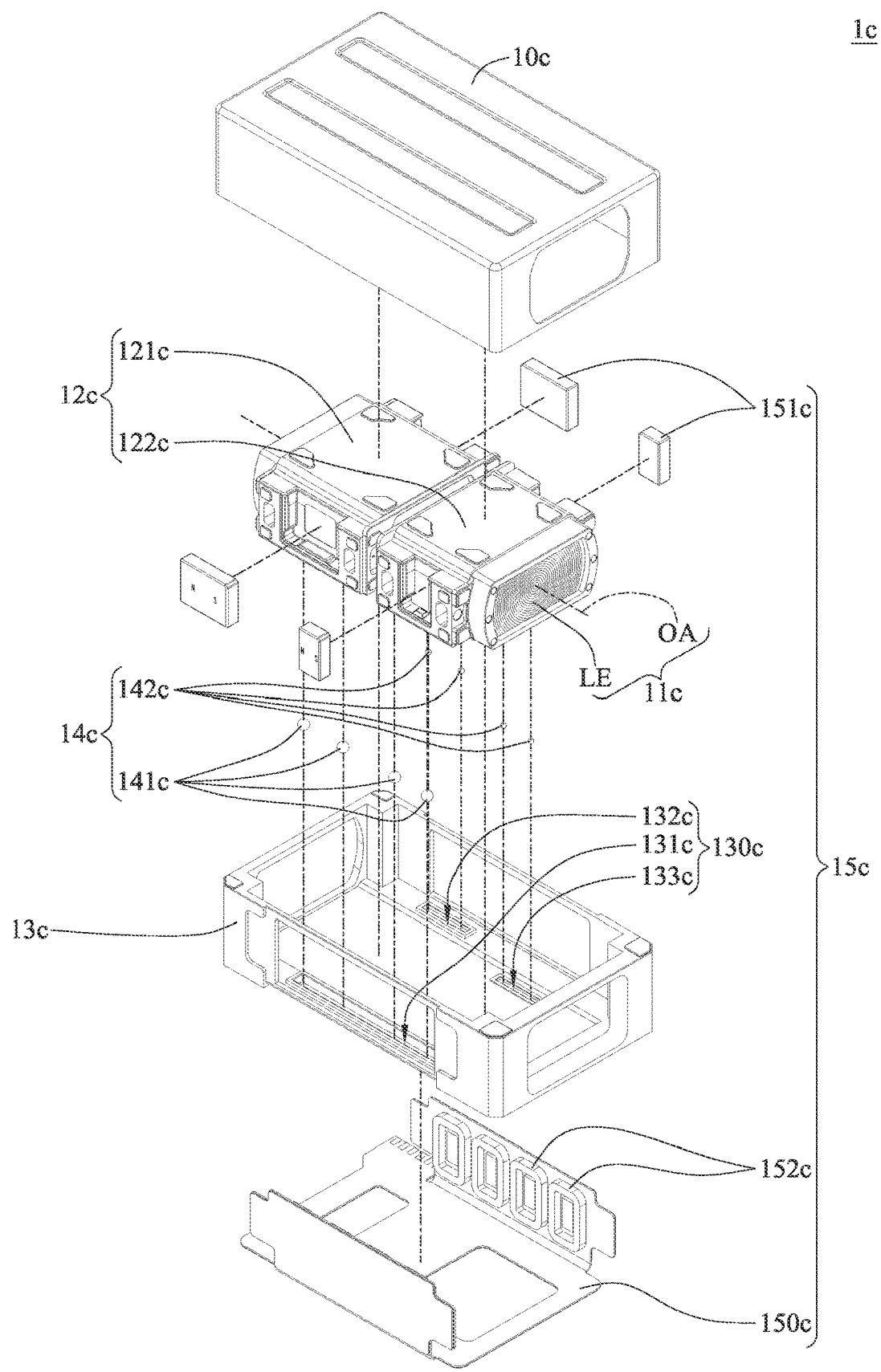
FIG. 22 is an exploded view of the imaging lens driving module in FIG. 21.
Figure 23:
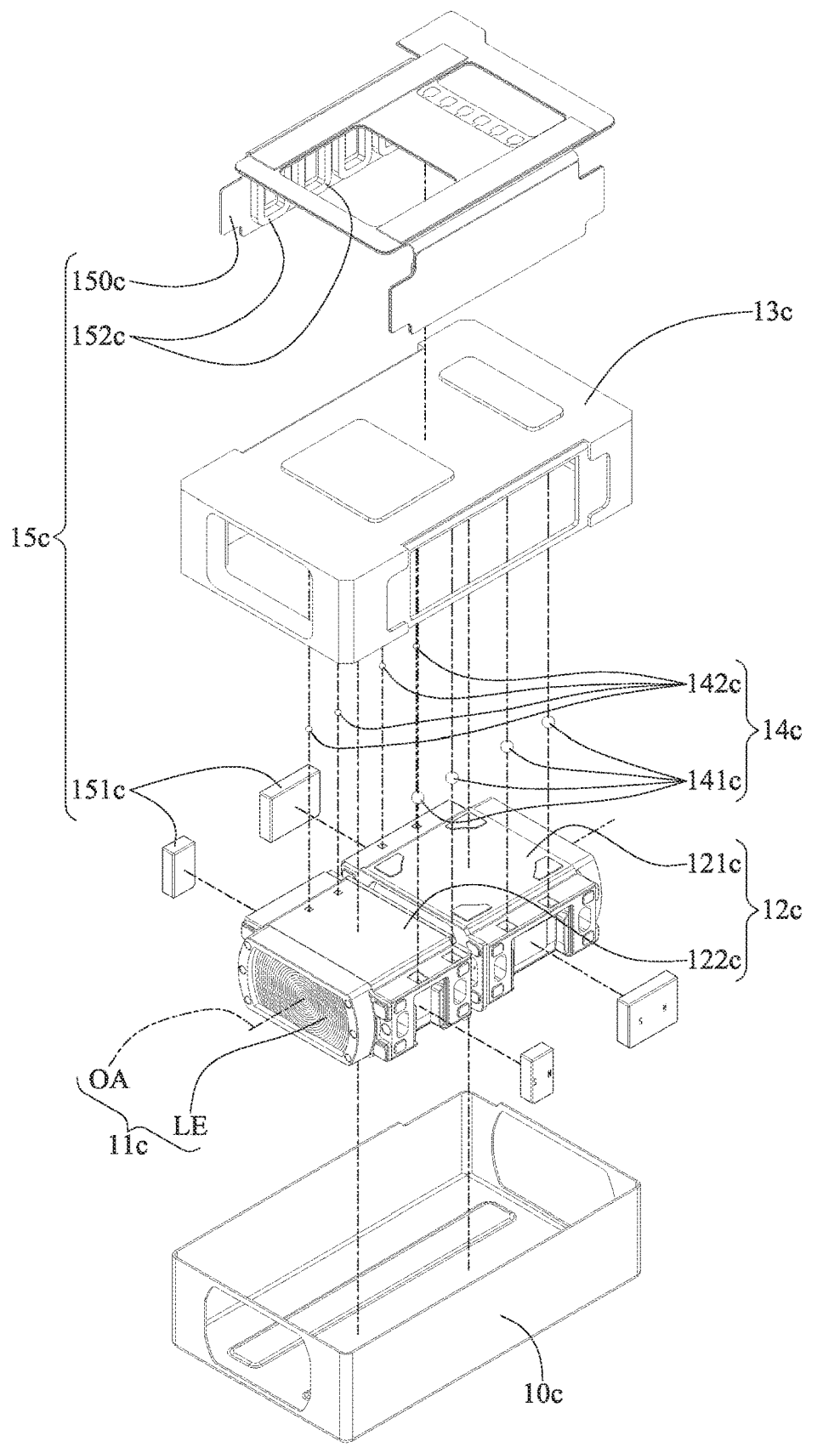
FIG. 23 is another exploded view of the imaging lens driving module in FIG. 21.
Figure 24:
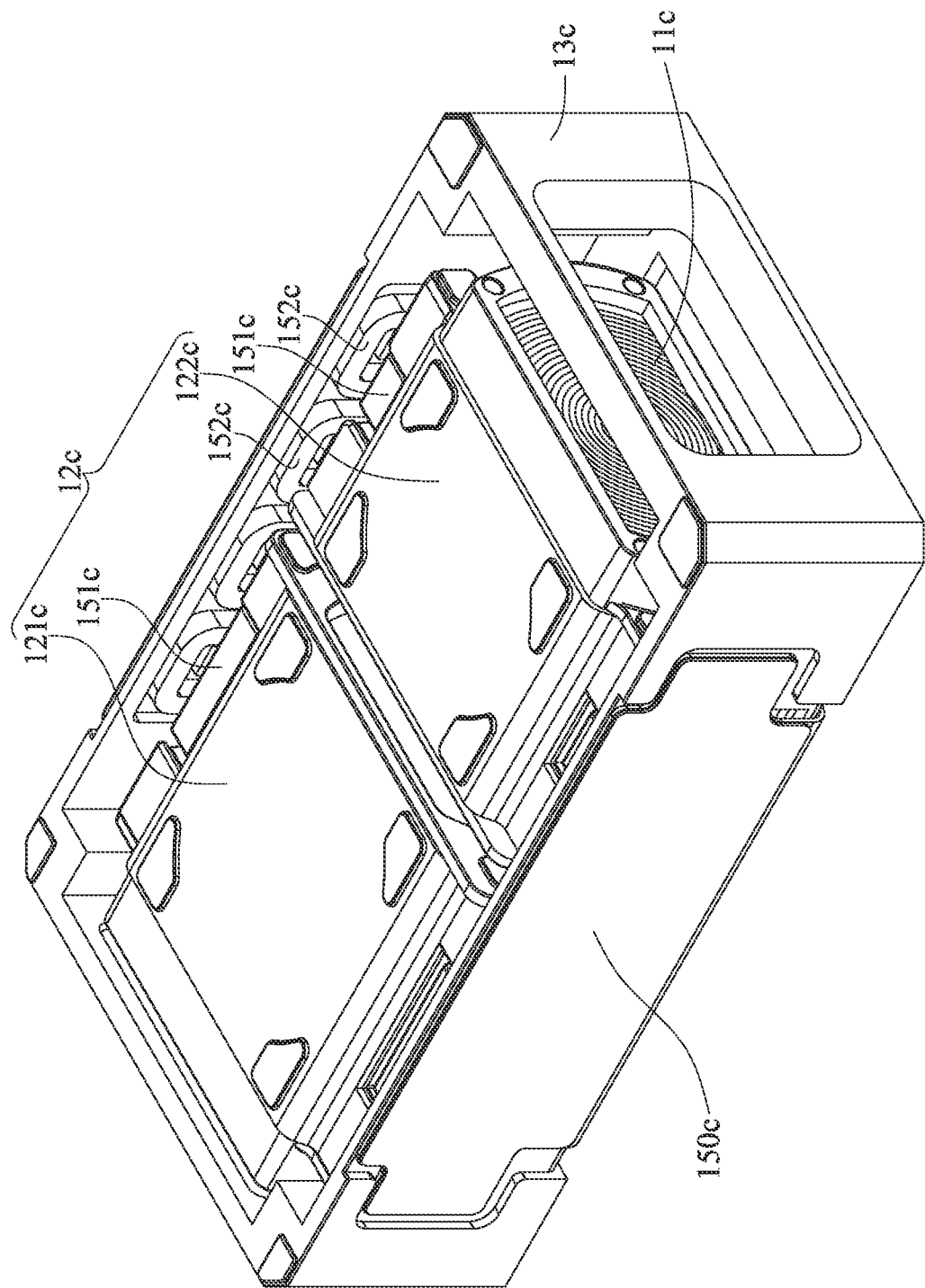
FIG. 24 is a perspective view of the imaging lens driving module in FIG. 21 without a casing.
Figure 25:
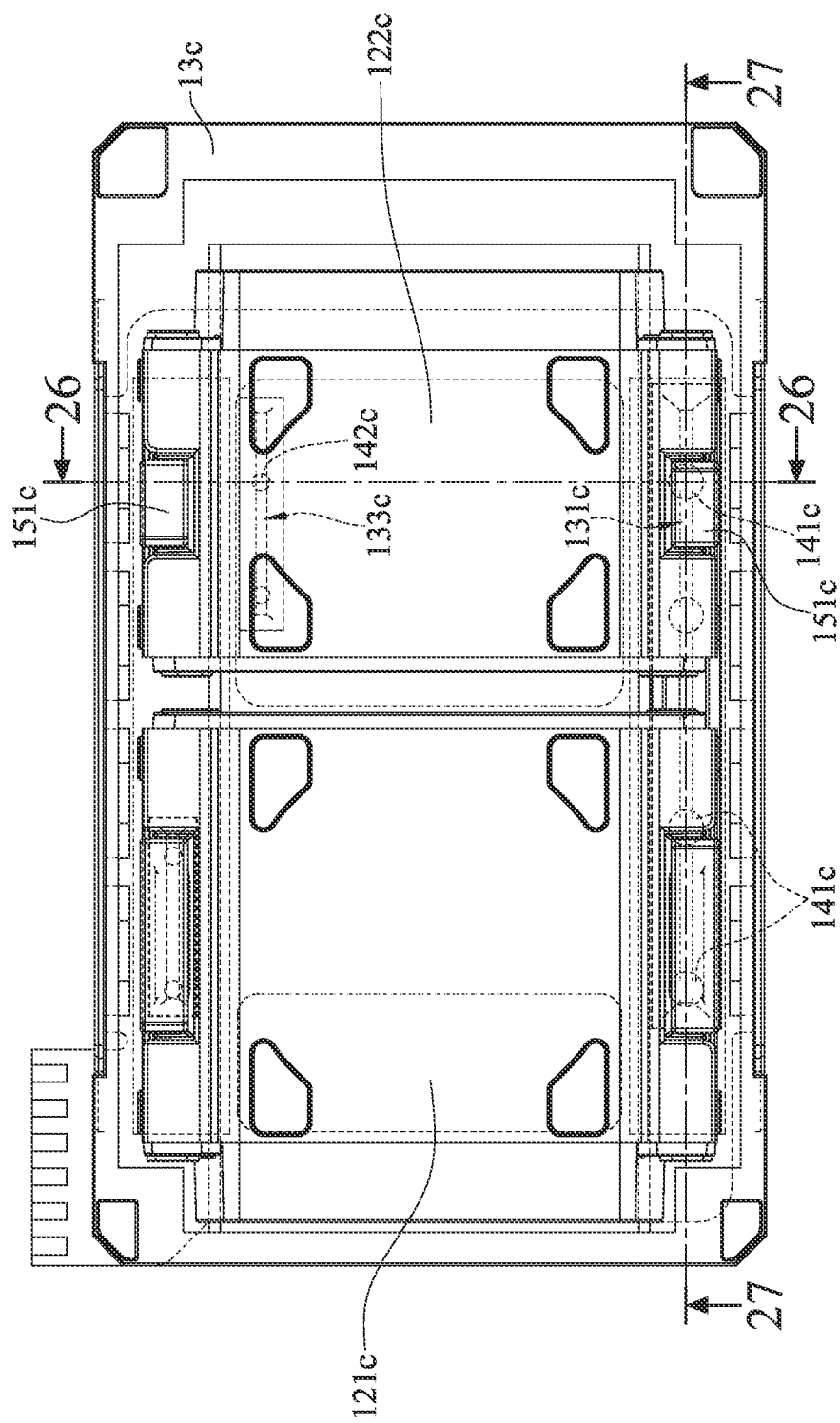
FIG. 25 is a top view of the imaging lens driving module in FIG. 24.
Figure 26:
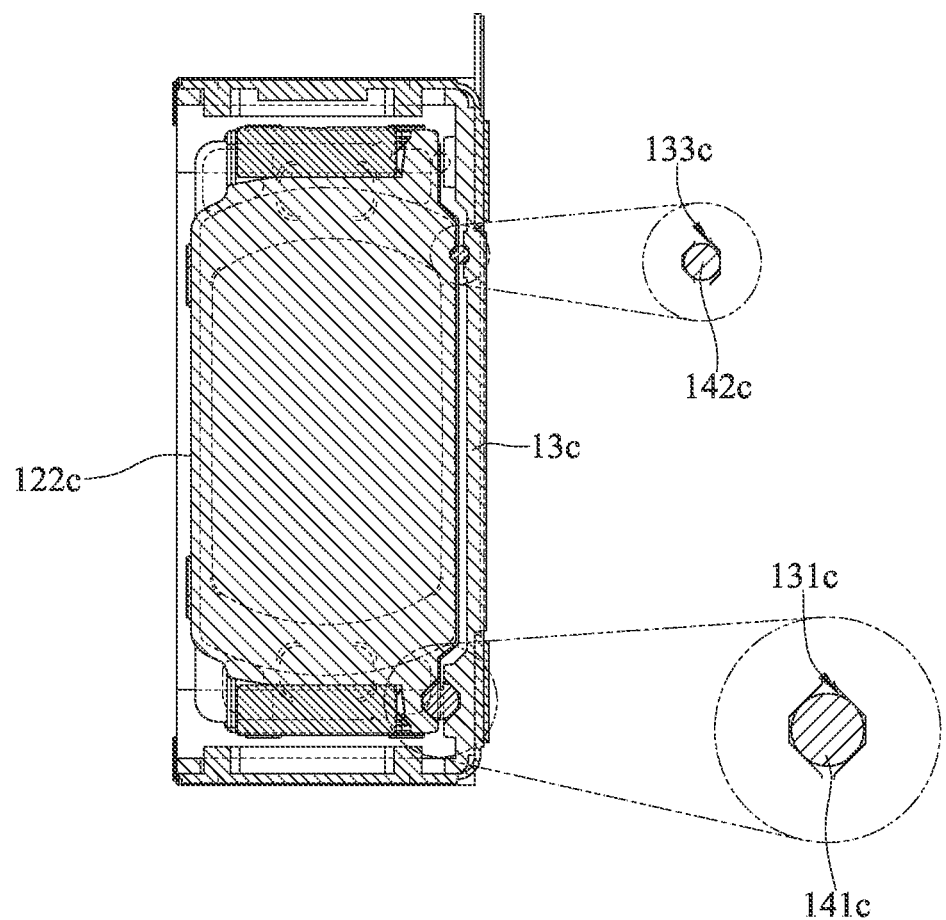
FIG. 26 is a cross-sectional view of the imaging lens driving module along line 26-26 in FIG. 25.
Figure 27:
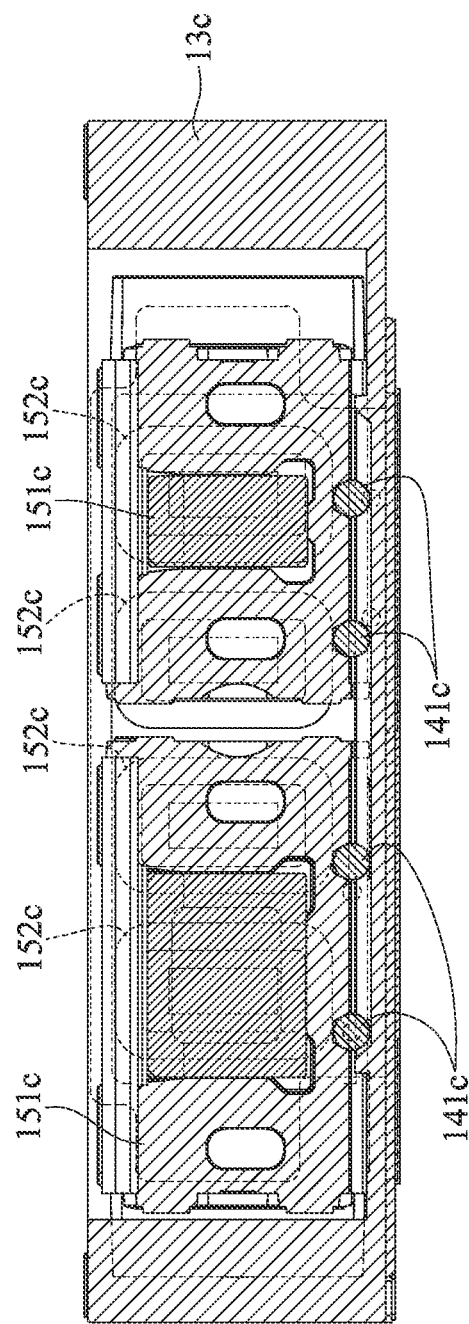
FIG. 27 is a cross-sectional view of the imaging lens driving module along line 27-27 in FIG. 25.
Figure 28:
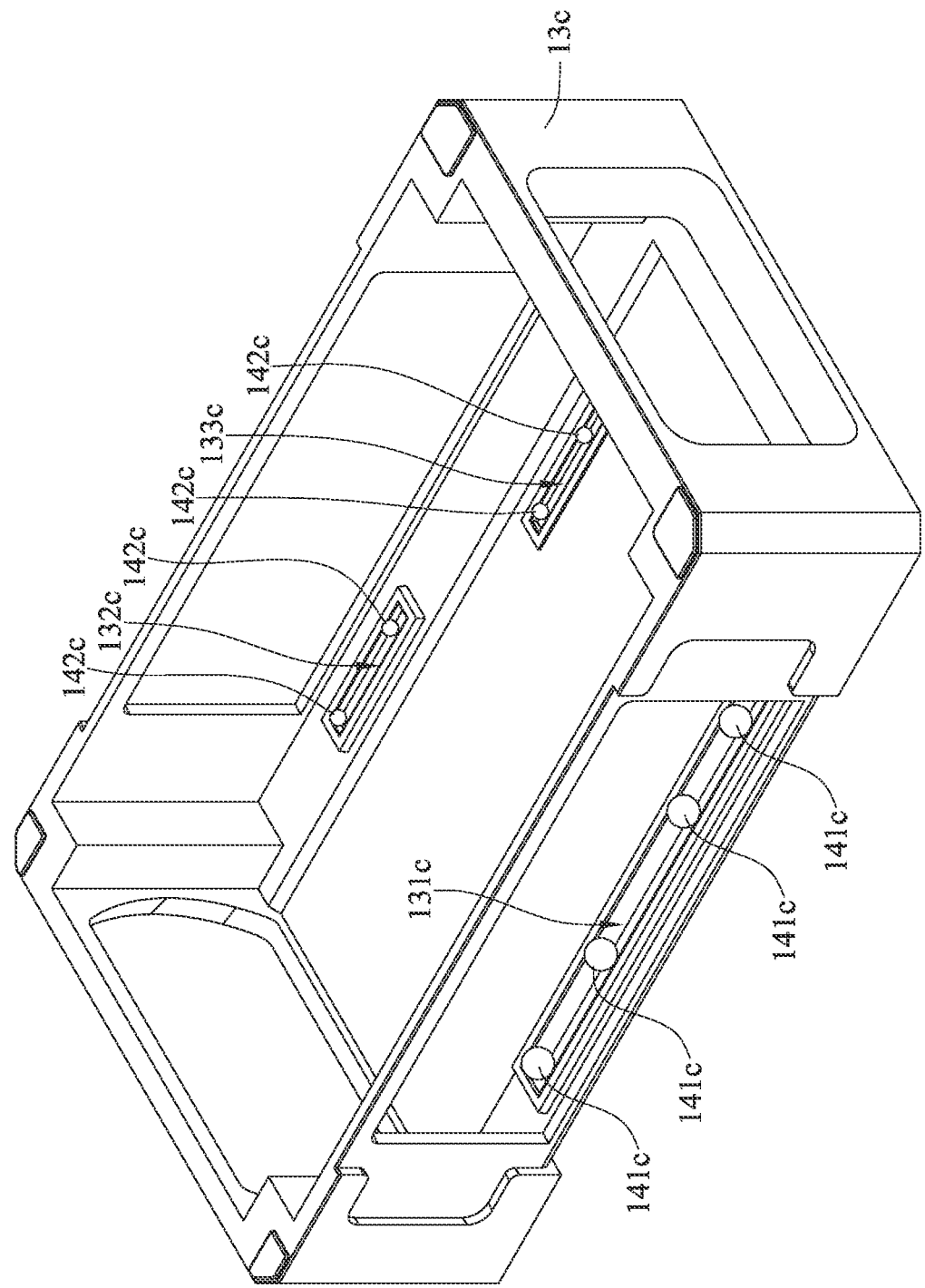
FIG. 28 is a perspective view of a base and a rollable support assembly of the imaging lens driving module in FIG. 21.
Figure 29:
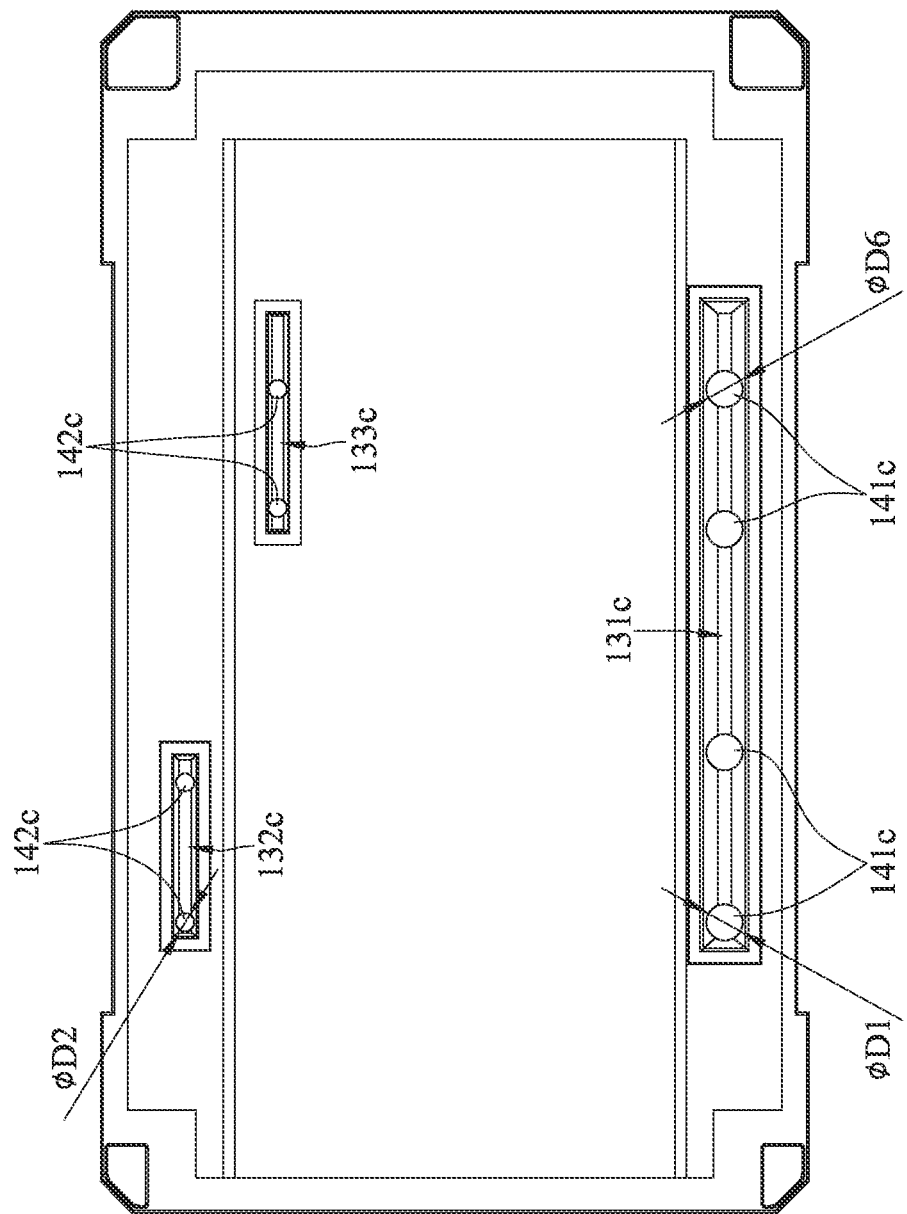
FIG. 29 is a top view of the base and the rollable support assembly in FIG. 28.

Please refer to FIG. 21 to FIG. 29. FIG. 21 is a perspective view of an imaging lens driving module according to the 3rd embodiment of the present disclosure, FIG. 22 is an exploded view of the imaging lens driving module in FIG. 21, FIG. 23 is another exploded view of the imaging lens driving module in FIG. 21, FIG. 24 is a perspective view of the imaging lens driving module in FIG. 21 without a casing, FIG. 25 is a top view of the imaging lens driving module in FIG. 24, FIG. 26 is a cross-sectional view of the imaging lens driving module along line 26-26 in FIG. 25, FIG. 27 is a cross-sectional view of the imaging lens driving module along line 27-27 in FIG. 25, FIG. 28 is a perspective view of a base and a rollable support assembly of the imaging lens driving module in FIG. 21, and FIG. 29 is a top view of the base and the rollable support assembly in FIG. 28.

The imaging lens driving module 1c includes a casing 10c, a lens system 11c, a lens holder assembly 12c, a base 13c, a rollable support assembly 14c and a driving mechanism 15c. The casing 10c is disposed on the base 13c, and the casing 10c and the base 13c together form an accommodation space for the lens holder assembly 12c to be slidably disposed therein. The lens system 11c has a plurality of optical lens elements LE, and the lens system 11c has an optical axis OA passing through the optical lens elements LE.

The lens holder assembly 12c includes, in order from the object side to the image side, a first lens holder 121c and a second lens holder 122c. The first lens holder 121c is for some of the optical lens elements LE to be disposed therein, and the second lens holder 122c is for the other optical lens elements LE to be disposed therein.

The base 13c includes a guiding groove assembly 130c, and the guiding groove assembly 130c includes a first guiding groove 131c, a second guiding groove 132c and a third guiding groove 133c. The first guiding groove 131c extends in a direction parallel to the optical axis OA and faces the first lens holder 121c and the second lens holder 122c, the second guiding groove 132c extends in the direction parallel to the optical axis OA and only faces the first lens holder 121c, and the third guiding groove 133c extends in the direction parallel to the optical axis OA and only faces the second lens holder 122c. In specific, the first guiding groove 131c extends under the first lens holder 121c and the second lens holder 122c, the second guiding groove 132c does not extend under the second lens holder 122c and thus does not face the second lens holder 122c, and the third guiding groove 133c does not extend under the first lens holder 121c and thus does not face the first lens holder 121c. In this embodiment, the first lens holder 121c and the second lens holder 122c of the lens holder assembly 12c share the first guiding groove 131c, such that the lens holder assembly 12c has a partially shared rail design.

The rollable support assembly 14c is disposed between the lens holder assembly 12c and the base 13c, and the rollable support assembly 14c is in physical contact with the lens holder assembly 12c and the base 13c, such that the lens holder assembly 12c has a degree of freedom of parallel movement with respect to the base 13c. The rollable support assembly 14c includes four principal rollable support elements 141c and four auxiliary rollable support elements 142c. Two of the principal rollable support elements 141c are disposed between the first lens holder 121c and the first guiding groove 131c, and the other two principal rollable support elements 141c are disposed between the second lens holder 122c and the first guiding groove 131c. Two of the auxiliary rollable support elements 142c are disposed between the first lens holder 121c and the second guiding groove 132c, and the other two auxiliary rollable support elements 142c are disposed between the second lens holder 122c and the third guiding groove 133c.

As shown in FIG. 26, the first guiding groove 131c has two contact points with one principal rollable support element 141c so as to ensure straight movement of the principal rollable support element 141c in the direction parallel to the optical axis. In addition, each of the second guiding groove 132c and the third guiding groove 133c has a single contact point with one auxiliary rollable support element 142c so as to compensate for remaining assembly errors.

As shown in FIG. 28 and FIG. 29, the first guiding groove 131c has same cross-sectional areas in the direction parallel to the optical axis OA, and therefore, it is favorable for increasing the mold design flexibility so as to meet requirements of guiding grooves for various driving manners.

The driving mechanism 15c includes a flexible printed circuit board 150c, a plurality of driving magnets 151c and a plurality of driving coils 152c. The flexible printed circuit board 150c is attached to the base 13c, the driving magnets 151c are disposed on two opposite sides of the lens holder assembly 12c, and the driving coils 152c are disposed on the flexible printed circuit board 150c and respectively correspond to the driving magnets 151c. The driving mechanism 15c provides a driving force generated by the driving magnets 151c and the driving coils 152c to drive the lens holder assembly 12c to move, and with the collaboration of the principal rollable support elements 141c of the rollable support assembly 14c, the lens holder assembly 12c is movable along the first guiding groove 131c (i.e., in the direction parallel to the optical axis OA) with respect to the base 13c after being driven by the driving mechanism 15c. Moreover, each of the first lens holder 121c and the second lens holder 122c may have a relative motion with respect to each other.

When a diameter of the principal rollable support element 141c in physical contact with the first lens holder 121c is $\Phi D1$, and a diameter of the auxiliary rollable support element 142c in physical contact with the first lens holder 121c is $\Phi D2$, the following condition is satisfied: $\Phi D1 > \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. In this embodiment, both the diameters of the two principal rollable support elements 141c located between the first lens holder 121c and the first guiding groove 131c can be $\Phi D1$, and the two principal rollable support elements 141c are in physical contact with the first lens holder 121c; alternatively, due to manufacturing errors, there may be only one of the two principal rollable support elements 141c located between the first lens holder 121c and the first guiding groove 131c having a diameter being $\Phi D1$ and in physical contact with the first lens holder 121c, while the other principal rollable support element 141c has a diameter smaller than $\Phi D1$ and is not in physical contact with the first lens holder 121c. Similarly, both the diameters of the two auxiliary rollable support elements 142c located between the first lens holder 121c and the second guiding groove 132c can be $\Phi D2$, and the two auxiliary rollable support elements 142c are in physical contact with the first lens holder 121c; alternatively, due to manufacturing errors, there may be only one of the two auxiliary rollable support elements 142c located between the first lens holder 121c and the second guiding groove 132c having a diameter being $\Phi D2$ and in physical contact with the first lens holder 121c, while the other auxiliary rollable support element 142c has a diameter smaller than $\Phi D2$ and is not in physical contact with the first lens holder 121c.

Furthermore, in this embodiment, both the diameters of the two principal rollable support elements 141c located between the second lens holder 122c and the first guiding groove 131c can be $\Phi D6$, and the two principal rollable support elements 141c are in physical contact with the second lens holder 122c; alternatively, due to manufacturing errors, there may be only one of the two principal rollable support elements 141c located between the second lens holder 122c and the first guiding groove 131c having a diameter being $\Phi D6$ and in physical contact with the second lens holder 122c, while the other principal rollable support element 141c has a diameter smaller than $\Phi D6$ and is not in physical contact with the second lens holder 122c. Additionally, $\Phi D6$ may be equal to or different from $\Phi D1$, and the present disclosure is not limited thereto.

When the number of the principal rollable support elements 141c is N1, and the number of the auxiliary rollable support elements 142c is N2, the following condition is satisfied: $N2=N1$. Therefore, a proper number arrangement of the principal rollable support elements 141c and the auxiliary rollable support elements 142c is favorable for optimizing the driving efficiency of the imaging lens driving module 1c. In this embodiment, the number (N1) of the principal rollable support elements 141c is four, and also, the number (N2) of the auxiliary rollable support elements 142c is four.

4th Embodiment

Figure 30:
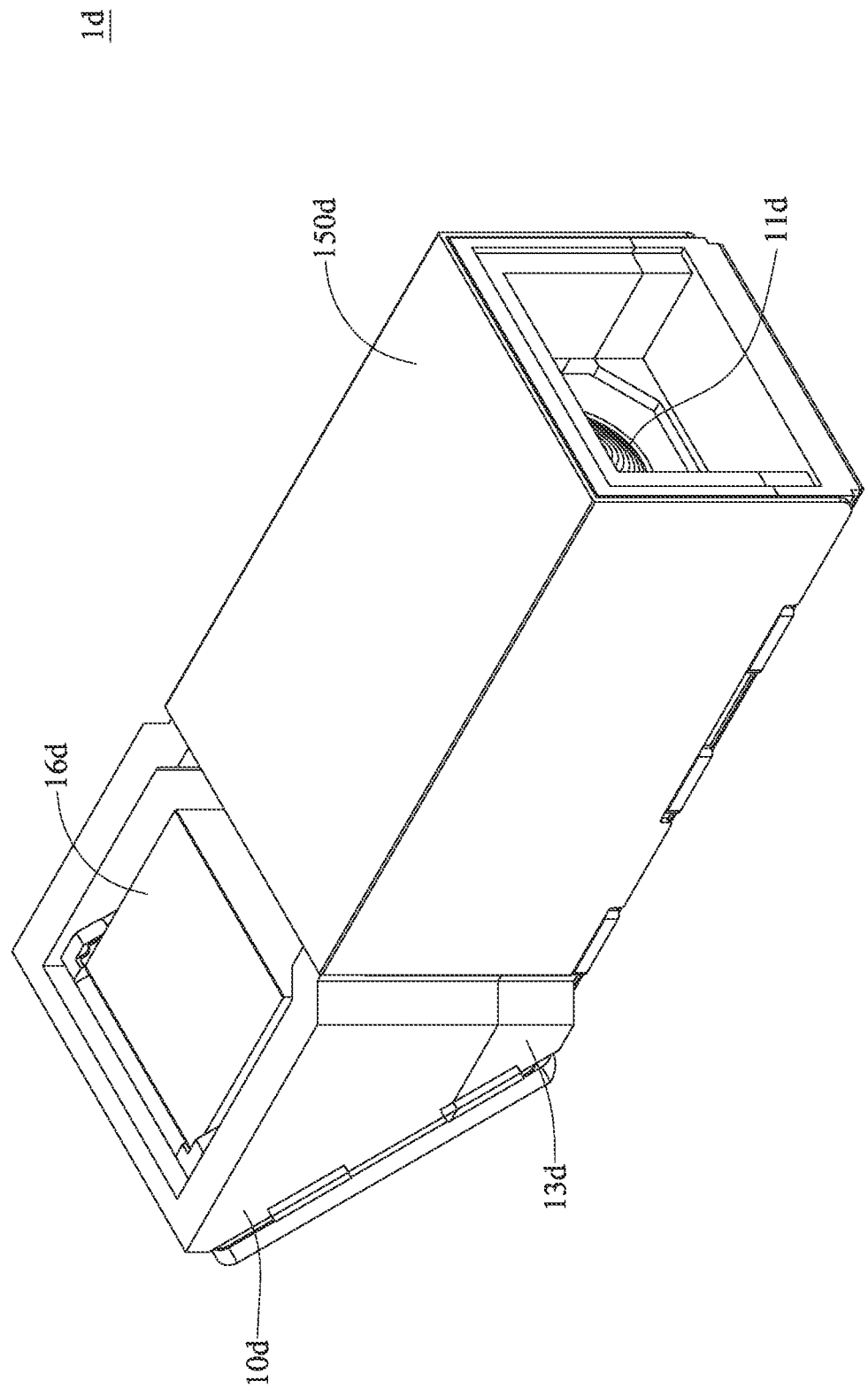
FIG. 30 is a perspective view of an imaging lens driving module according to the 4th embodiment of the present disclosure.
Figure 31:
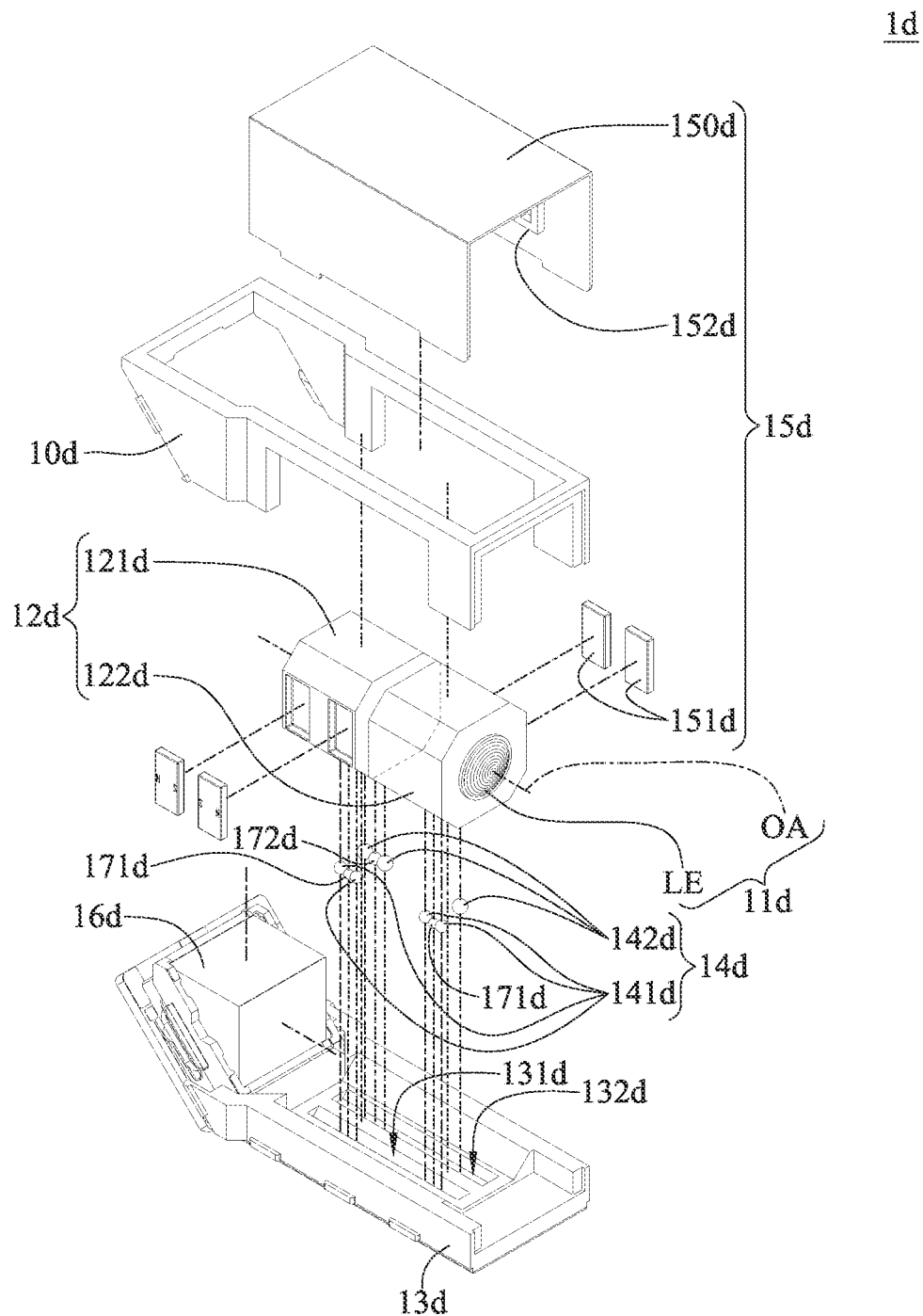
FIG. 31 is an exploded view of the imaging lens driving module in FIG. 30.
Figure 32:
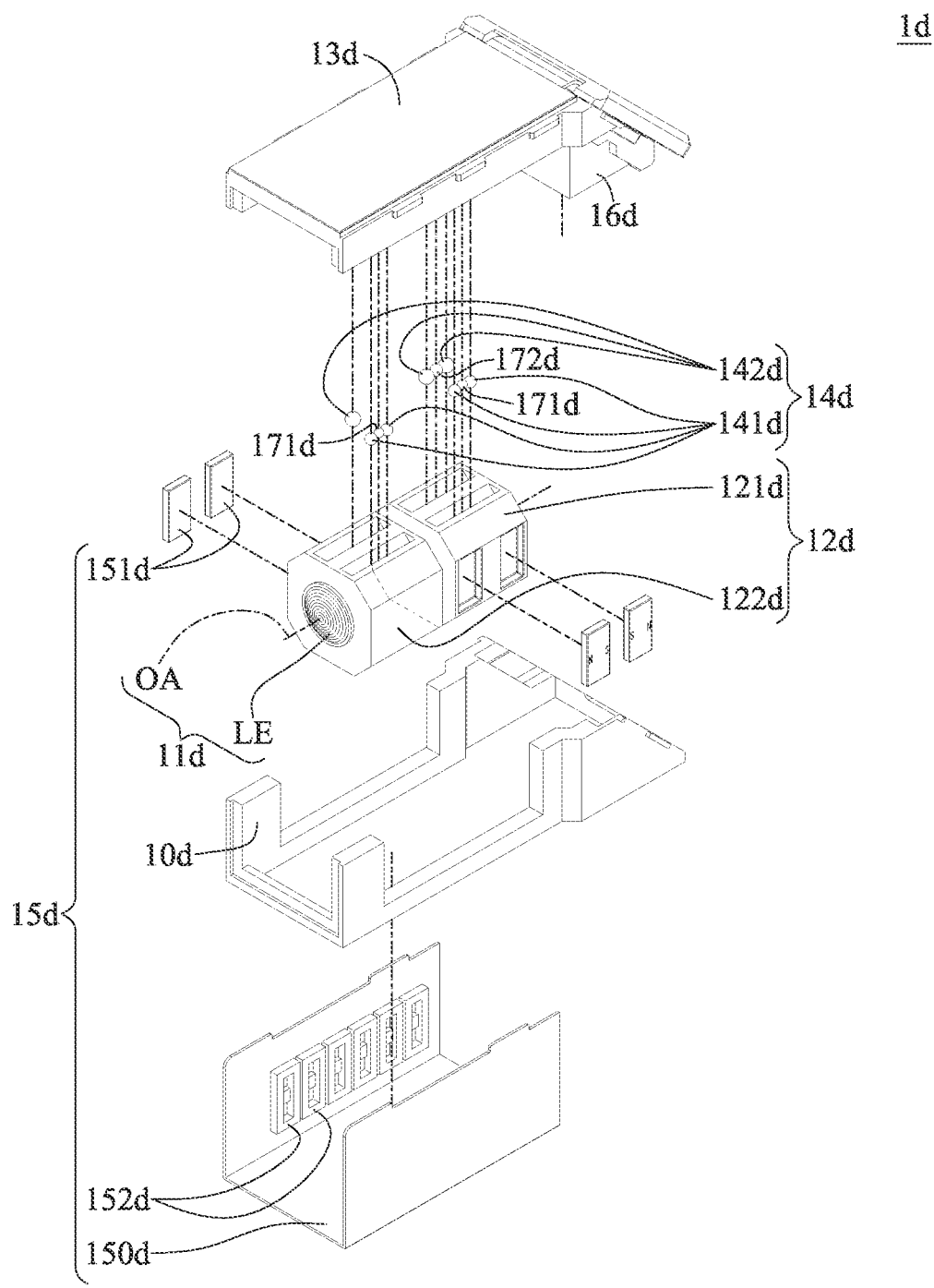
FIG. 32 is another exploded view of the imaging lens driving module in FIG. 30.
Figure 33:
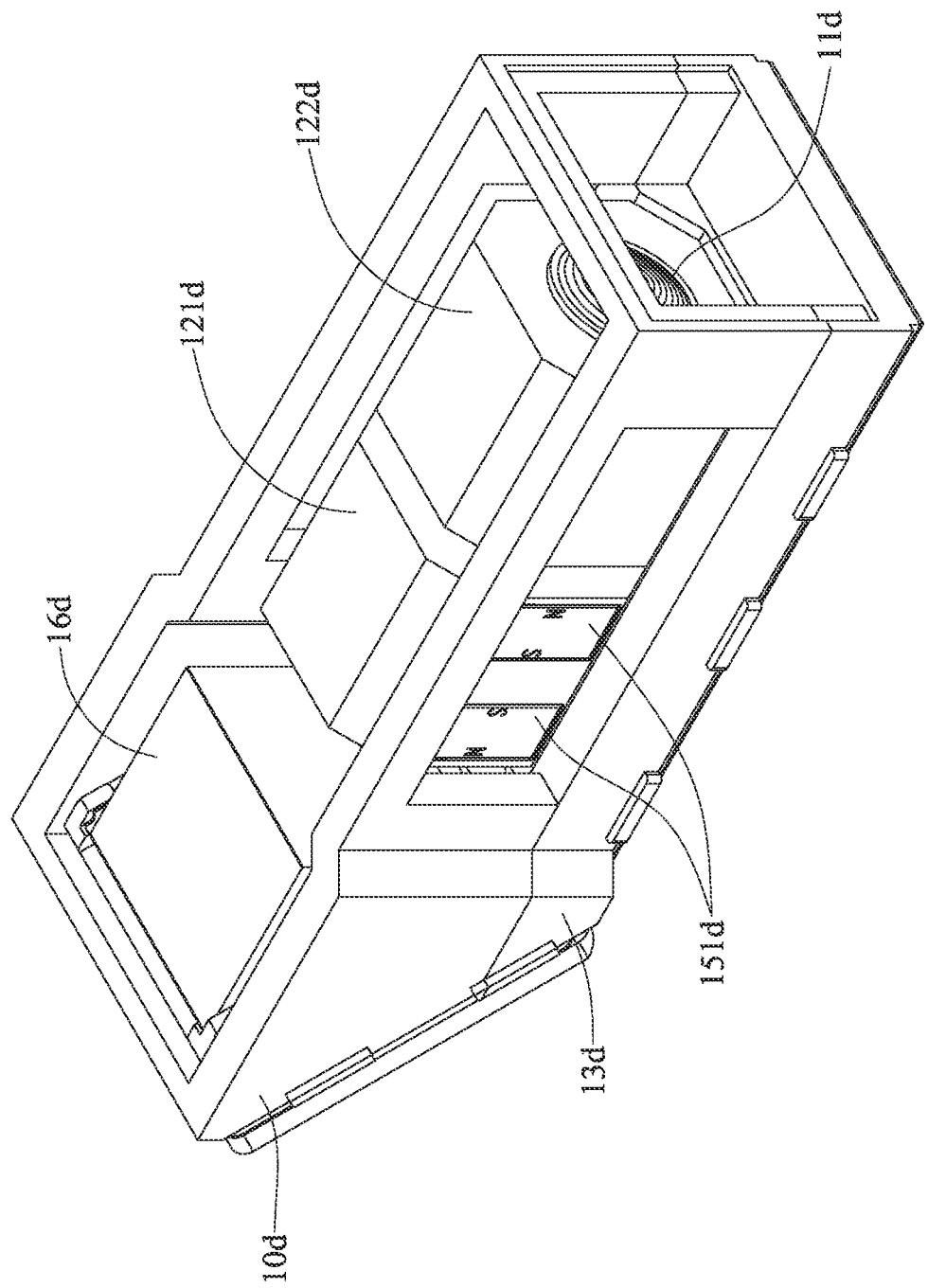
FIG. 33 is a perspective view of the imaging lens driving module in FIG. 30 without a flexible printed circuit board and driving coils.
Figure 34:
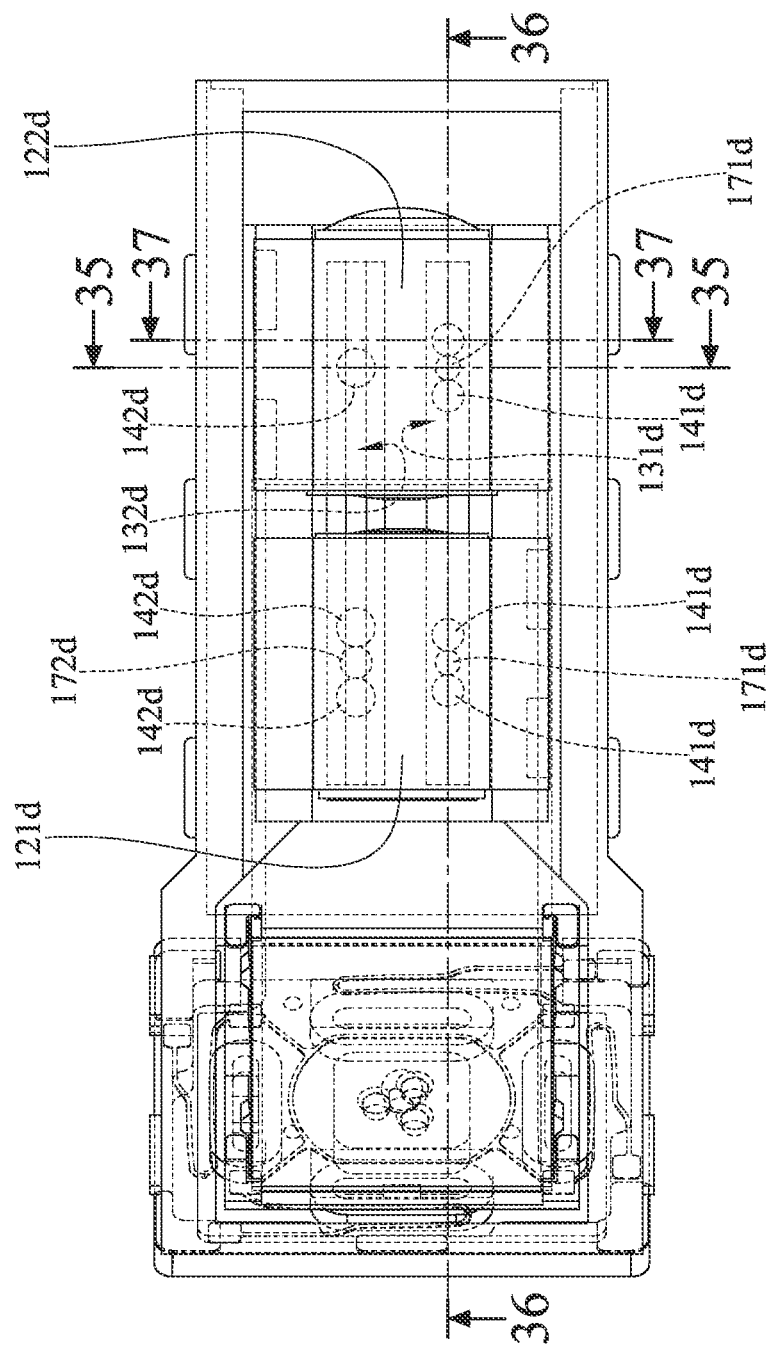
FIG. 34 is a top view of the imaging lens driving module in FIG. 33.
Figure 35:
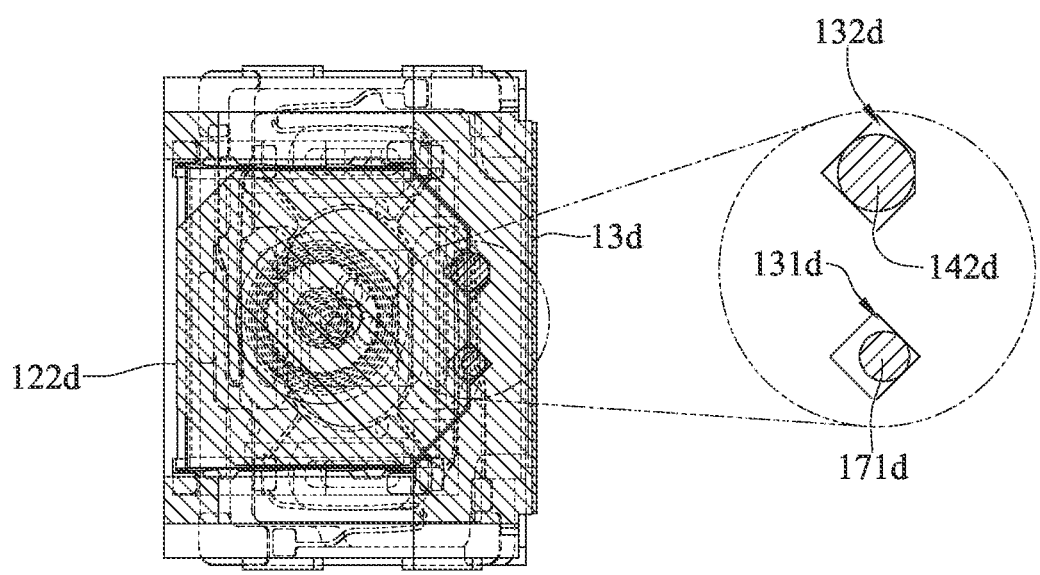
FIG. 35 is a cross-sectional view of the imaging lens driving module along line 35-35 in FIG. 34.
Figure 36:
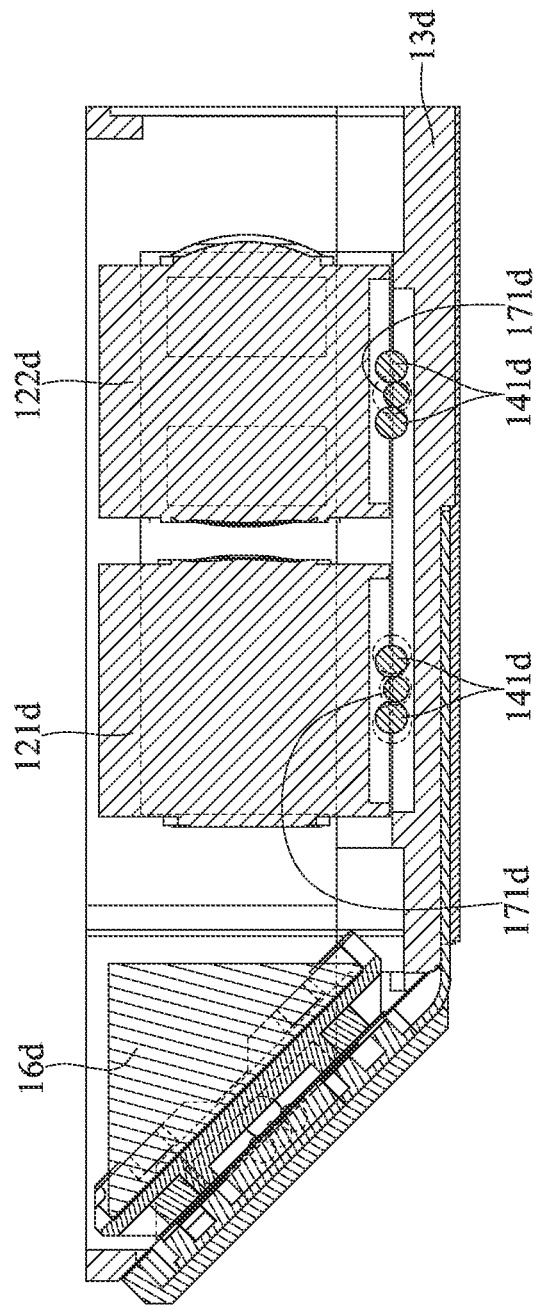
FIG. 36 is a cross-sectional view of the imaging lens driving module along line 36-36 in FIG. 34.
Figure 37:
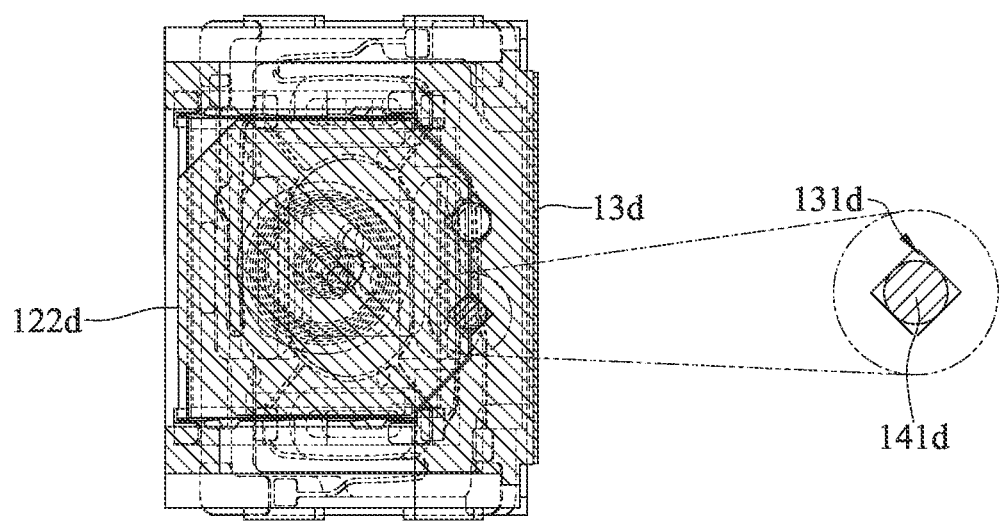
FIG. 37 is a cross-sectional view of the imaging lens driving module along line 37-37 in FIG. 34.
Figure 38:
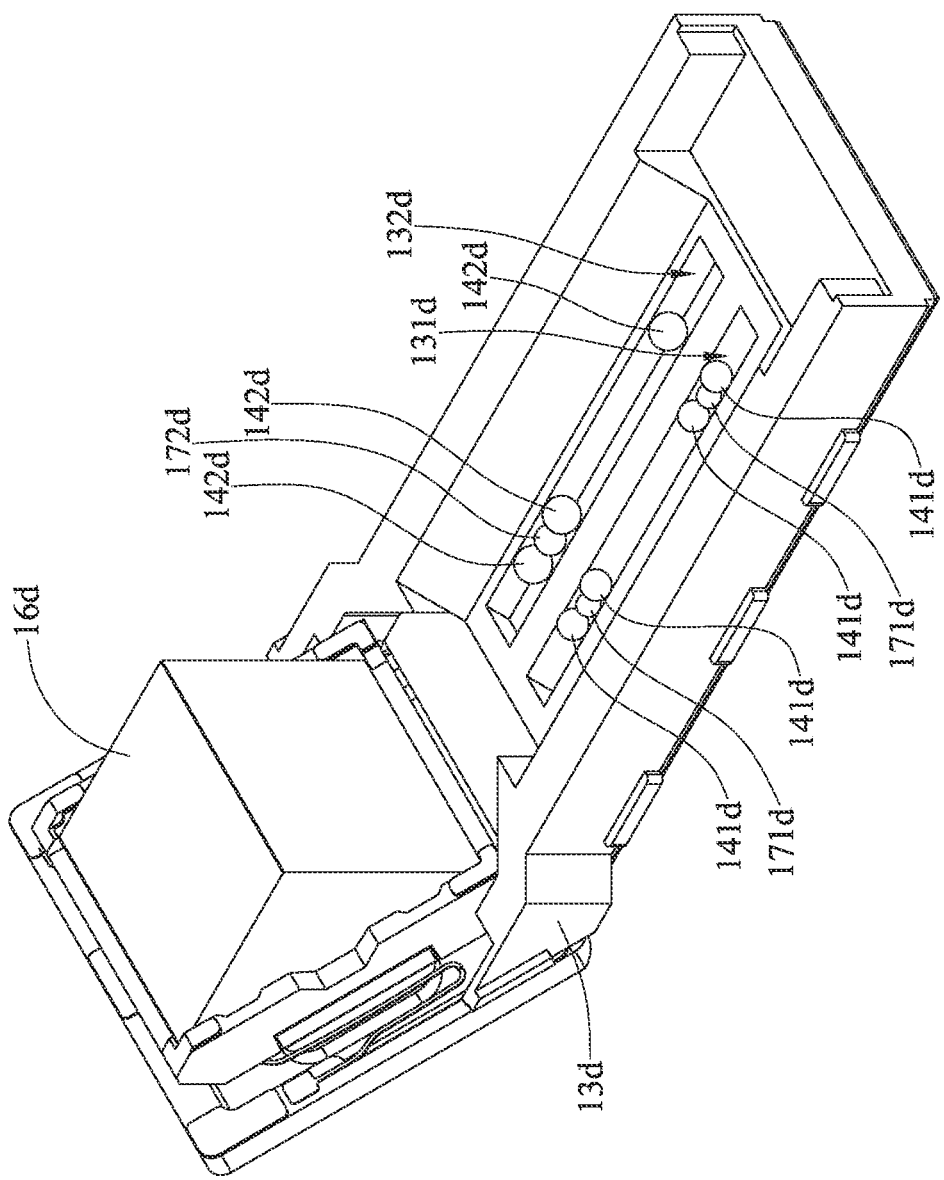
FIG. 38 is a perspective view of a base, a rollable support assembly, buffering support elements and a light-folding element of the imaging lens driving module in FIG. 30.
Figure 39:
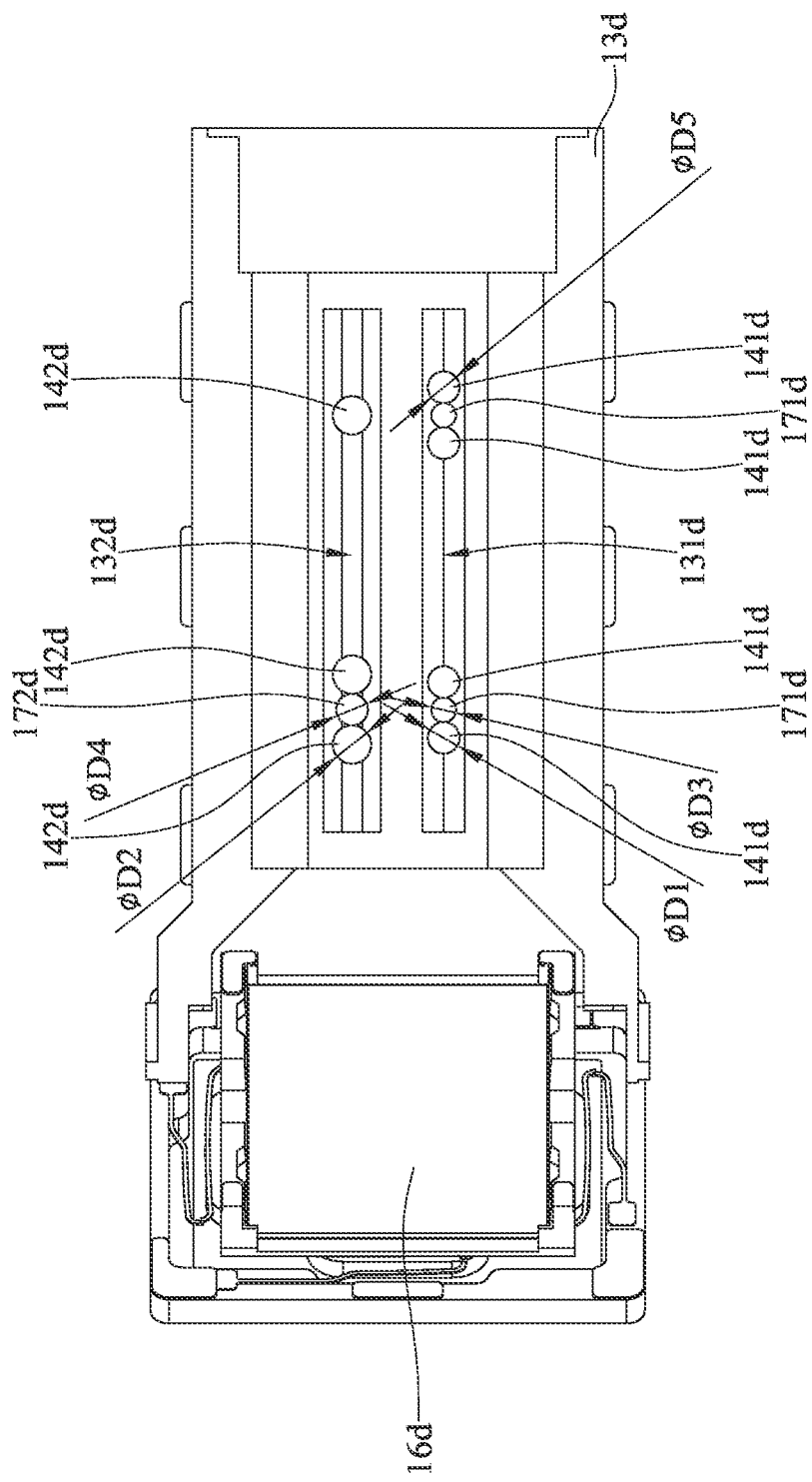
FIG. 39 is a top view of the base, the rollable support assembly, the buffering support elements and the light-folding element in FIG. 38.

Please refer to FIG. 30 to FIG. 39. FIG. 30 is a perspective view of an imaging lens driving module according to the 4th embodiment of the present disclosure, FIG. 31 is an exploded view of the imaging lens driving module in FIG. 30, FIG. 32 is another exploded view of the imaging lens driving module in FIG. 30, FIG. 33 is a perspective view of the imaging lens driving module in FIG. 30 without a flexible printed circuit board and driving coils, FIG. 34 is a top view of the imaging lens driving module in FIG. 33, FIG. 35 is a cross-sectional view of the imaging lens driving module along line 35-35 in FIG. 34, FIG. 36 is a cross-sectional view of the imaging lens driving module along line 36-36 in FIG. 34, FIG. 37 is a cross-sectional view of the imaging lens driving module along line 37-37 in FIG. 34, FIG. 38 is a perspective view of a base, a rollable support assembly, buffering support elements and a light-folding element of the imaging lens driving module in FIG. 30, and FIG. 39 is a top view of the base, the rollable support assembly, the buffering support elements and the light-folding element in FIG. 38.

The imaging lens driving module 1d includes a casing 10d, a lens system 11d, a lens holder assembly 12d, a light-folding element 16d, a base 13d, a rollable support assembly 14d and a driving mechanism 15d. The casing 10d is disposed on the base 13d, and the casing 10d and the base 13d together form an accommodation space for the lens holder assembly 12d to be slidably disposed therein. The lens system 11d has a plurality of optical lens elements LE, and the lens system 11d has an optical axis OA passing through the optical lens elements LE.

The lens holder assembly 12d includes, in order from the object side to the image side, a first lens holder 121d and a second lens holder 122d. The first lens holder 121d is for some of the optical lens elements LE to be disposed therein, and the second lens holder 122d is for the other optical lens elements LE to be disposed therein.

The light-folding element 16d is disposed on the base 13d and locate on the object side of the lens holder assembly 12d for folding an incident optical trace PL towards the optical lens elements LE, and it is favorable for reducing the size of the imaging lens driving module 1d. In this embodiment, the light-folding element 16d is a prism.

The base 13d includes a guiding groove assembly 130d, and the guiding groove assembly 130d includes a first guiding groove 131d and a second guiding groove 132d. The first guiding groove 131d extends in a direction parallel to the optical axis OA and faces the first lens holder 121d and the second lens holder 122d, the second guiding groove 132d extends in the direction parallel to the optical axis OA and is disposed opposite to the first guiding groove 131d, and the second guiding groove 132d faces the first lens holder 121d and the second lens holder 122d. In this embodiment, the first lens holder 121d and the second lens holder 122d of the lens holder assembly 12d share the first guiding groove 131d and the second guiding groove 132d, such that the lens holder assembly 12d has a shared rail design.

The rollable support assembly 14d is disposed between the lens holder assembly 12d and the base 13d, and the rollable support assembly 14d is in physical contact with the lens holder assembly 12d and the base 13d, such that the lens holder assembly 12d has a degree of freedom of parallel movement with respect to the base 13d. The rollable support assembly 14d includes four principal rollable support elements 141d and three auxiliary rollable support elements 142d. Two of the principal rollable support elements 141d are disposed between the first lens holder 121d and the first guiding groove 131d, and the other two of the principal rollable support elements 141d are disposed between the second lens holder 122d and the first guiding groove 131d. Two of the auxiliary rollable support elements 142d are disposed between the first lens holder 121d and the second guiding groove 132d, and the other one of the auxiliary rollable support elements 142d is disposed between the second lens holder 122d and the second guiding groove 132d.

A first buffering support element 171d is disposed between the two principal rollable support elements 141d facing the first lens holder 121d so as to reduce the rolling resistance between the principal rollable support elements 141d, thereby reducing the driving power consumption of the imaging lens driving module 1d. Moreover, there is another first buffering support element 171d disposed between the two principal rollable support elements 141d facing the second lens holder 122d.

A second buffering support element 172d is disposed between the two auxiliary rollable support elements 142d facing the first lens holder 121d so as to reduce the rolling resistance between the auxiliary rollable support elements 142d, thereby reducing the driving power consumption of the imaging lens driving module 1d.

As shown in FIG. 37, the first guiding groove 131d has two contact points with one principal rollable support element 141d so as to ensure straight movement of the principal rollable support element 141d in the direction parallel to the optical axis. In addition, as shown in FIG. 35, the second guiding groove 132d has a single contact point with one auxiliary rollable support element 142d so as to compensate for remaining assembly errors.

As shown in FIG. 38 and FIG. 39, the first guiding groove 131d has same cross-sectional areas in the direction parallel to the optical axis OA, and therefore, it is favorable for increasing the mold design flexibility so as to meet requirements of guiding grooves for various driving manners.

The driving mechanism 15d includes a flexible printed circuit board 150d, a plurality of driving magnets 151d and a plurality of driving coils 152d. The flexible printed circuit board 150d is attached to the casing 10d. The driving magnets 151d are disposed on two opposite sides of the lens holder assembly 12d, the driving magnets 151d located on one side are disposed on the first lens holder 121d, and the driving magnets 151d locate on the other side are disposed on the second lens holder 122d. The driving coils 152d are disposed on the flexible printed circuit board 150d and respectively correspond to driving magnets 151d. The driving mechanism 15d provides a driving force generated by the driving magnets 151d and the driving coils 152d to drive the lens holder assembly 12d to move, and with the collaboration of the principal rollable support elements 141d of the rollable support assembly 14d, the lens holder assembly 12d is movable along the first guiding groove 131d (i.e., in the direction parallel to the optical axis OA) with respect to the base 13d after being driven by the driving mechanism 15d. Moreover, each of the first lens holder 121d and the second lens holder 122d may have a relative motion with respect to each other.

When a diameter of the principal rollable support element 141d in physical contact with the first lens holder 121d is $\Phi D1$, and a diameter of the auxiliary rollable support element 142d in physical contact with the first lens holder 121d is $\Phi D2$, the following condition is satisfied: $\Phi D1 < \Phi D2$. Therefore, since the diameters of the principal rollable support element and the auxiliary rollable support element in physical contact with the same lens holder are different from each other, it can be a foolproof mechanism during the assembly process of the imaging lens driving module, thereby improving recognition efficiency during the assembly process. In this embodiment, both the diameters of the two principal rollable support elements 141d located between the first lens holder 121d and the first guiding groove 131d can be $\Phi D1$, and the two principal rollable support elements 141d are in physical contact with the first lens holder 121d; alternatively, due to manufacturing errors, there may be only one of the two principal rollable support elements 141d located between the first lens holder 121d and the first guiding groove 131d having a diameter being $\Phi D1$ and in physical contact with the first lens holder 121d, while the other diameter principal rollable support element 141d has a diameter smaller than $\Phi D1$ and is not in physical contact with the first lens holder 121d. Similarly, both the diameters of the two auxiliary rollable support elements 142d located between the first lens holder 121d and the second guiding groove 132d can be $\Phi D2$, and the two auxiliary rollable support elements 142d are in physical contact with the first lens holder 121d; alternatively, due to manufacturing errors, there may be only one of the two auxiliary rollable support elements 142d located between the first lens holder 121d and the second guiding groove 132d having a diameter being ΦD2 and in physical contact with the first lens holder 121d, while the other auxiliary rollable support element 142d has a diameter smaller than ΦD2 and is not in physical contact with the first lens holder 121d.

Furthermore, in this embodiment, both the diameters of the two principal rollable support elements 141d located between the second lens holder 122d and the first guiding groove 131d can be ΦD5, and the two principal rollable support elements 141d are in physical contact with the second lens holder 122d; alternatively, due to manufacturing errors, there may be only one of the two principal rollable support elements 141d located between the second lens holder 122d and the first guiding groove 131d having a diameter being ΦD5 and in physical contact with the second lens holder 122d, while the other principal rollable support element 141d has a diameter smaller than ΦD5 and is not in physical contact with the second lens holder 122d. Additionally, ΦD5 may be equal to or different from ΦD1, the present disclosure is not limited thereto.

When the diameter of the principal rollable support element 141d in physical contact with the first lens holder 121d is ΦD1, the diameter of the auxiliary rollable support element 142d in physical contact with the first lens holder 121d is ΦD2, a diameter of the first buffering support element 171d is ΦD3, and a diameter of the second buffering support element 172d is ΦD4, the following conditions are satisfied: ΦD3<ΦD1; and ΦD4<ΦD2. Therefore, it is favorable for reducing the driving power consumption of the imaging lens driving module 1d.

When the number of the principal rollable support elements 141d is N1, and the number of the auxiliary rollable support elements 142d is N2, the following condition is satisfied: N2<N1. Therefore, a proper number arrangement of the principal rollable support elements 141d and the auxiliary rollable support elements 142d is favorable for optimizing the driving efficiency of the imaging lens driving module 1d. In this embodiment, the number (N1) of the principal rollable support elements 141d is four, and the number (N2) of the auxiliary rollable support elements 142d is three.

5th Embodiment

Figure 40:
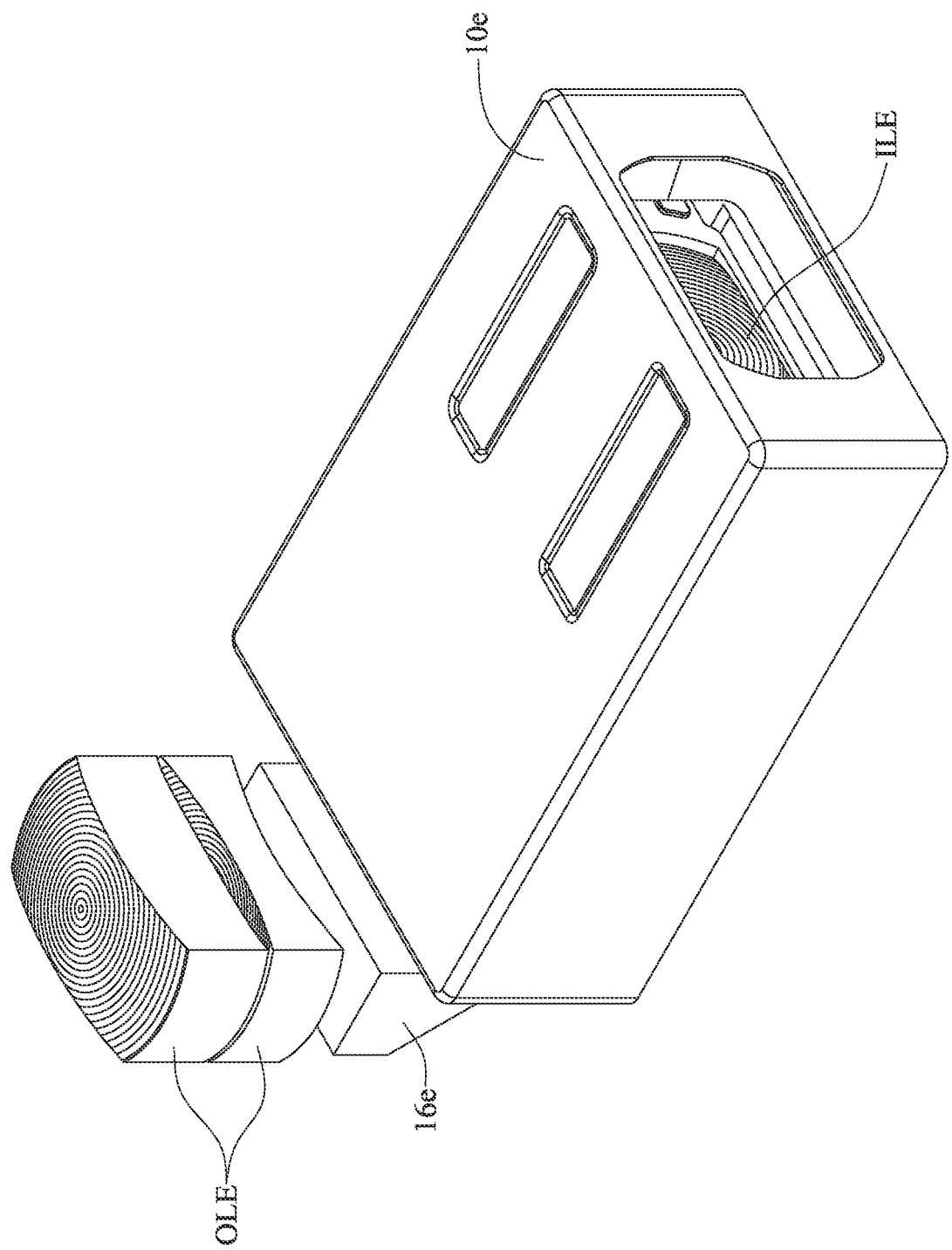
FIG. 40 is a perspective view of an imaging lens driving module according to the 5th embodiment of the present disclosure.
Figure 41:
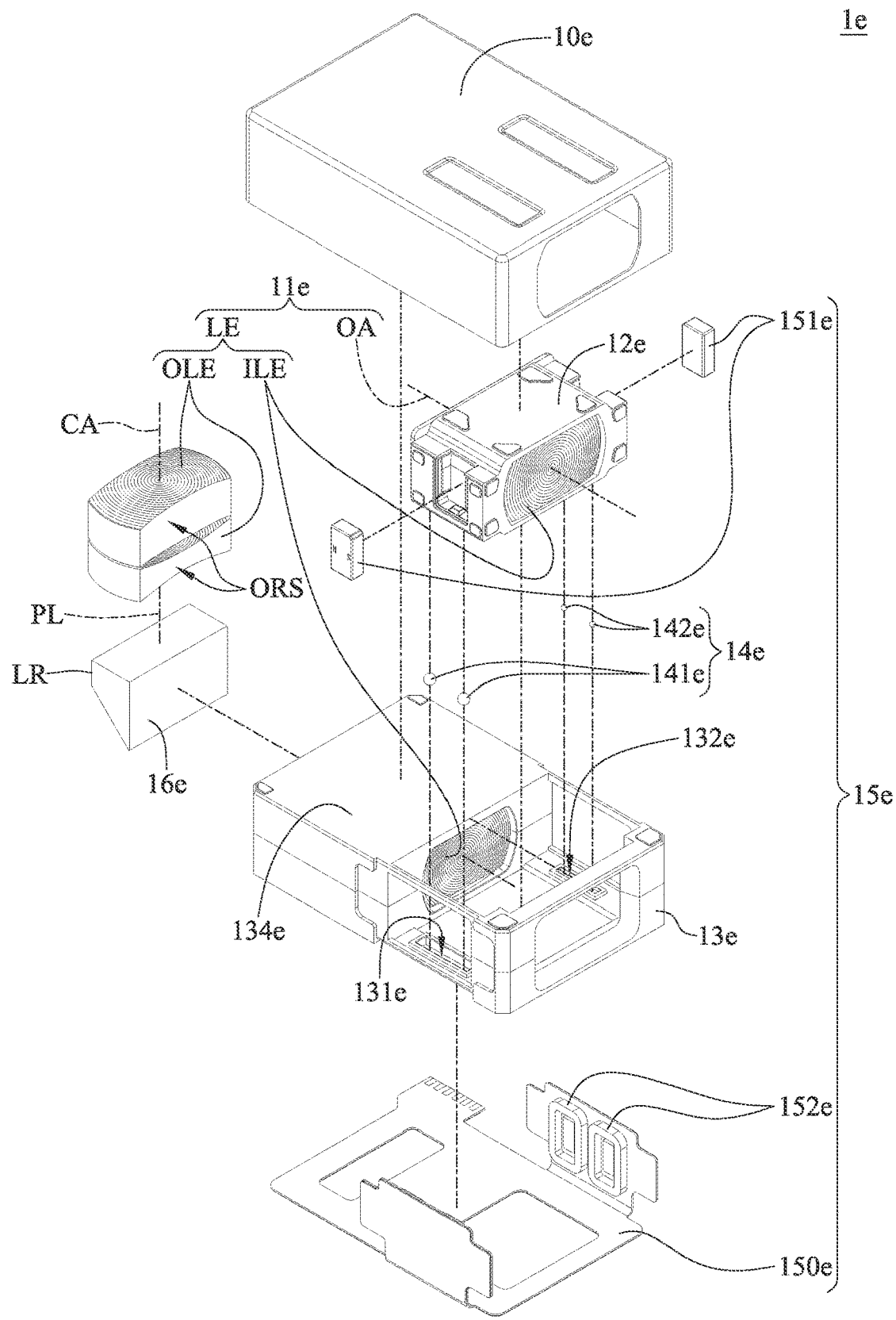
FIG. 41 is an exploded view of the imaging lens driving module in FIG. 40.
Figure 42:
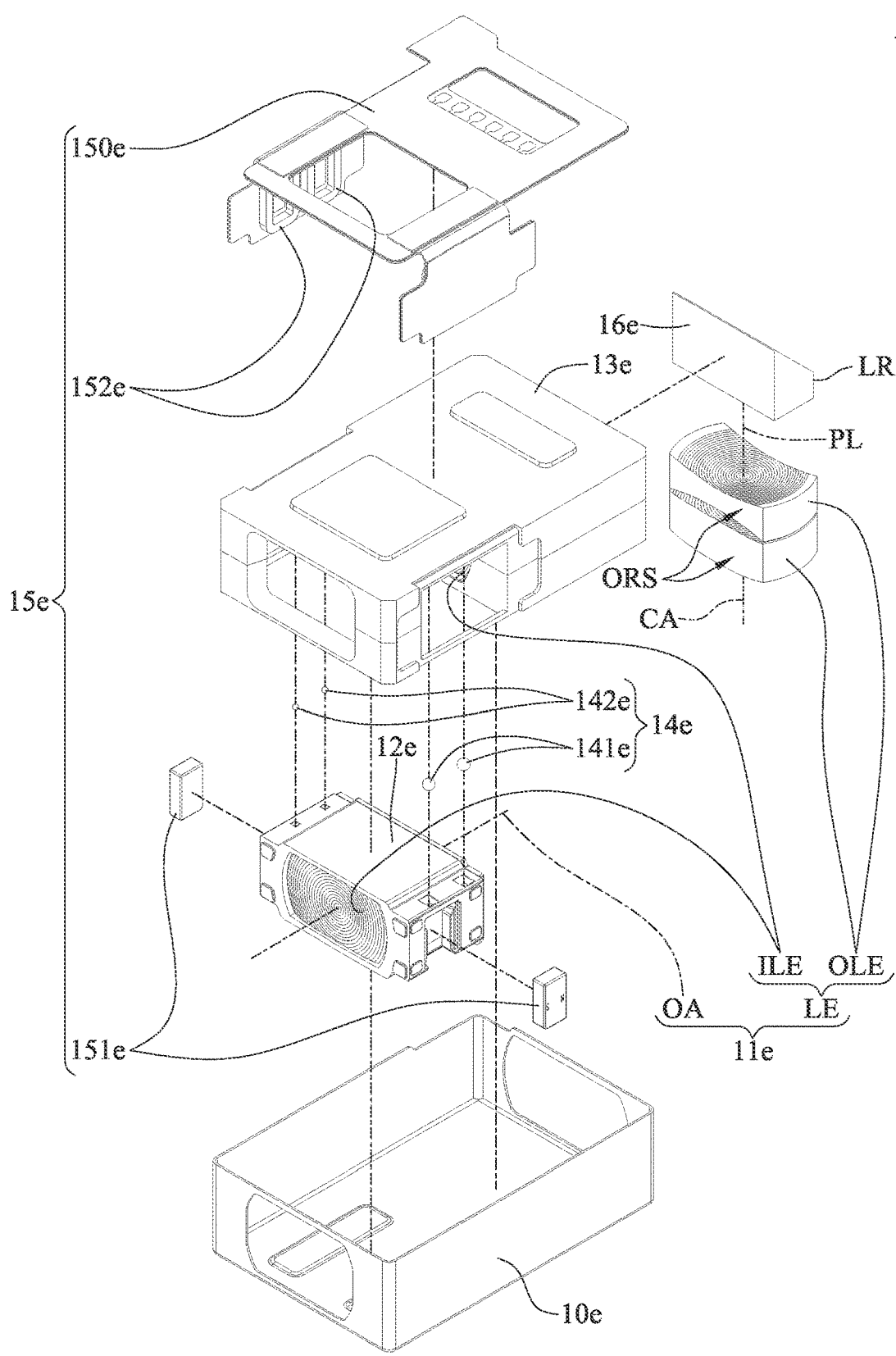
FIG. 42 is another exploded view of the imaging lens driving module in FIG. 40.
Figure 43:
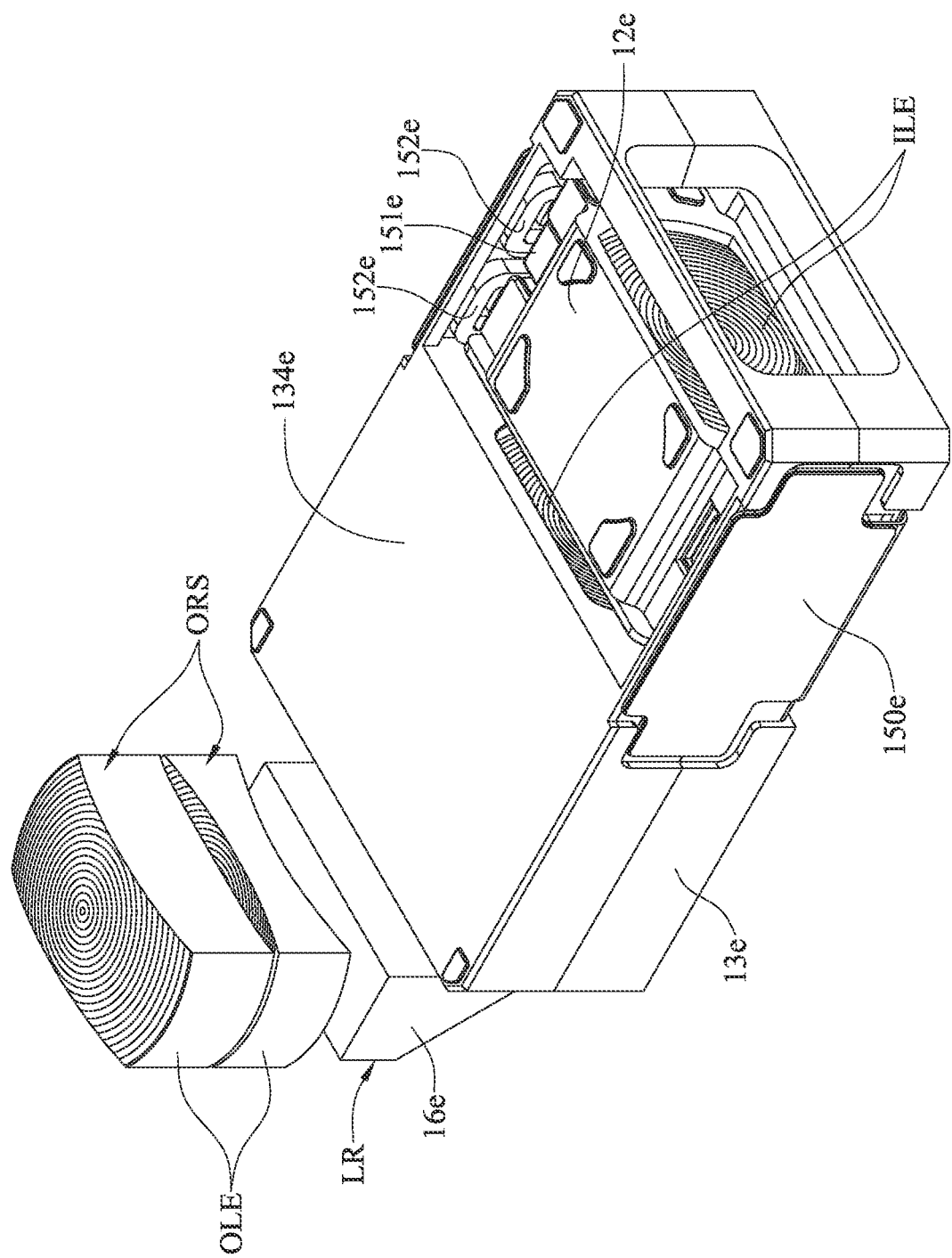
FIG. 43 is a perspective view of the imaging lens driving module in FIG. 40 without a casing.
Figure 44:
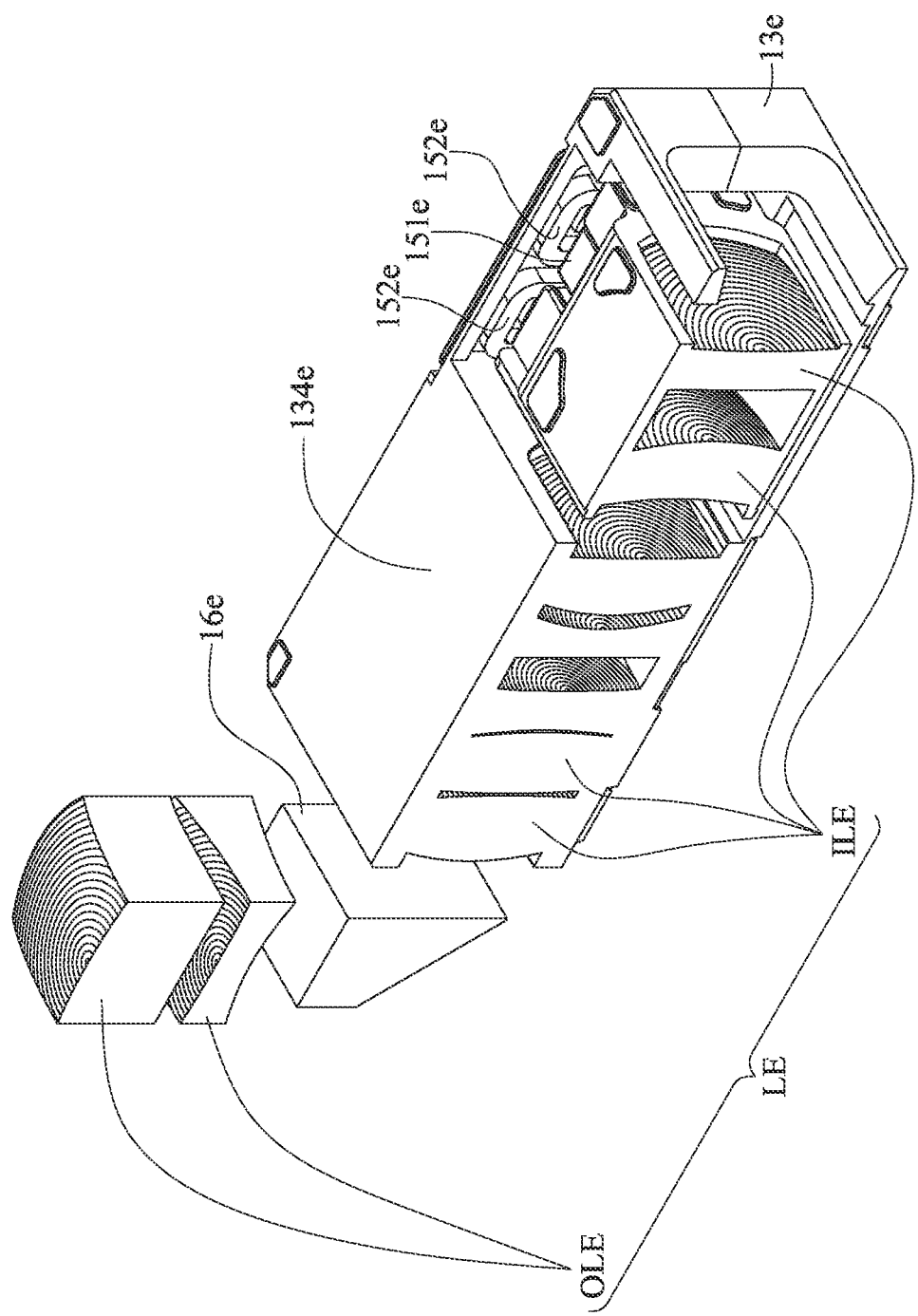
FIG. 44 is a sectional view of the imaging lens driving module in FIG. 43.
Figure 45:
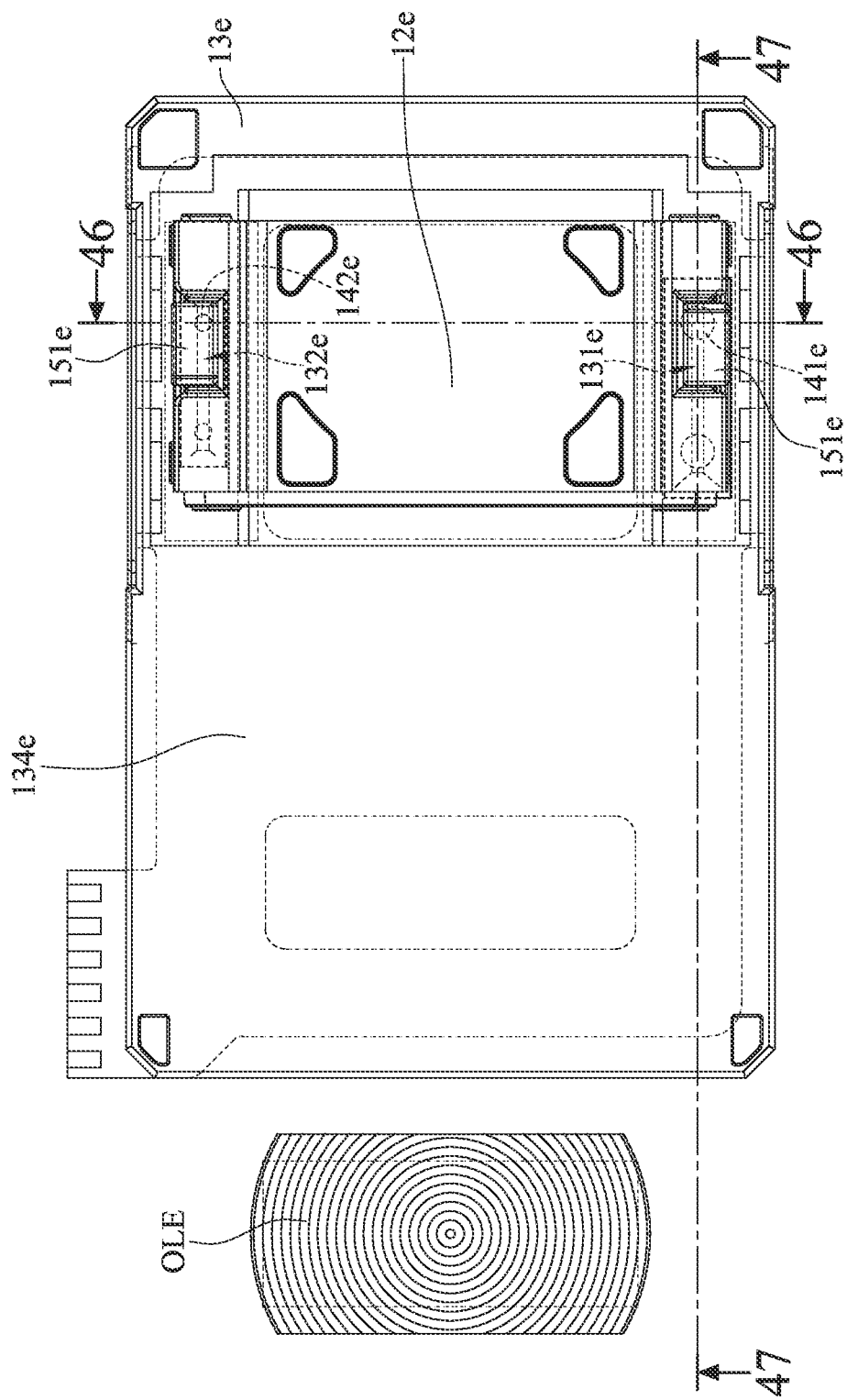
FIG. 45 is a top view of the imaging lens driving module in FIG. 43.
Figure 46:
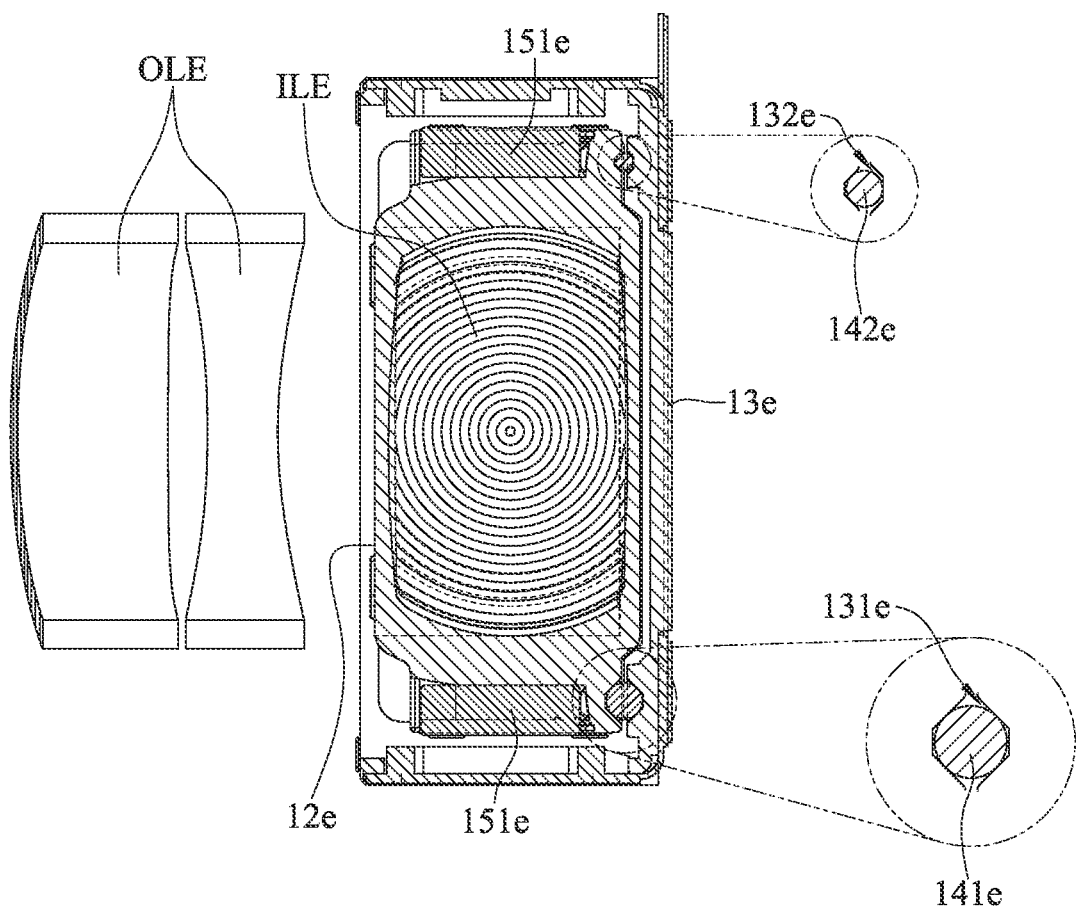
FIG. 46 is a cross-sectional view of the imaging lens driving module along line 46-46 in FIG. 45.
Figure 47:
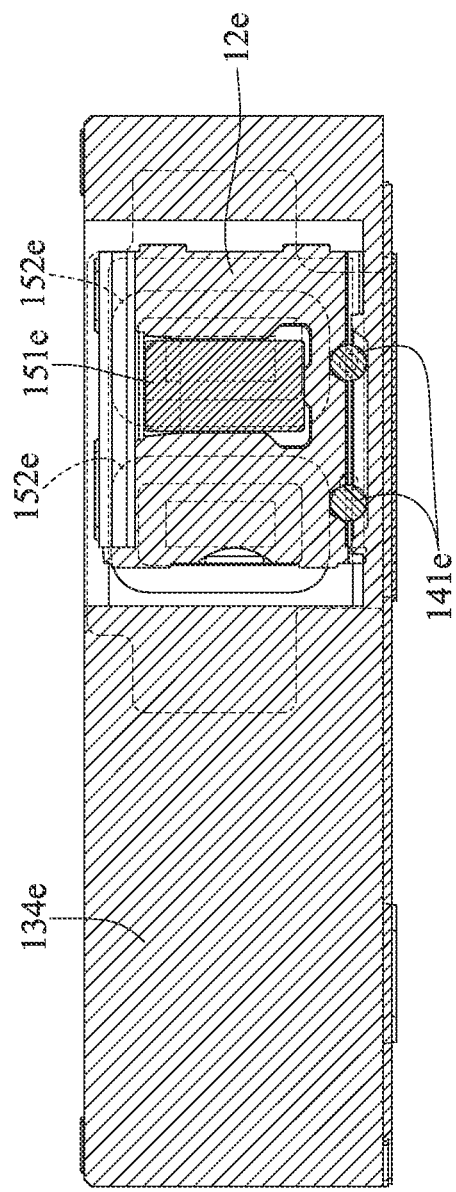
FIG. 47 is a cross-sectional view of the imaging lens driving module along line 47-47 in FIG. 45.
Figure 47:
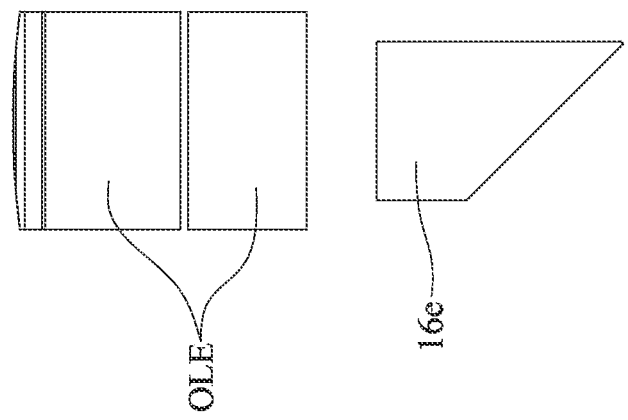
Figure 48:
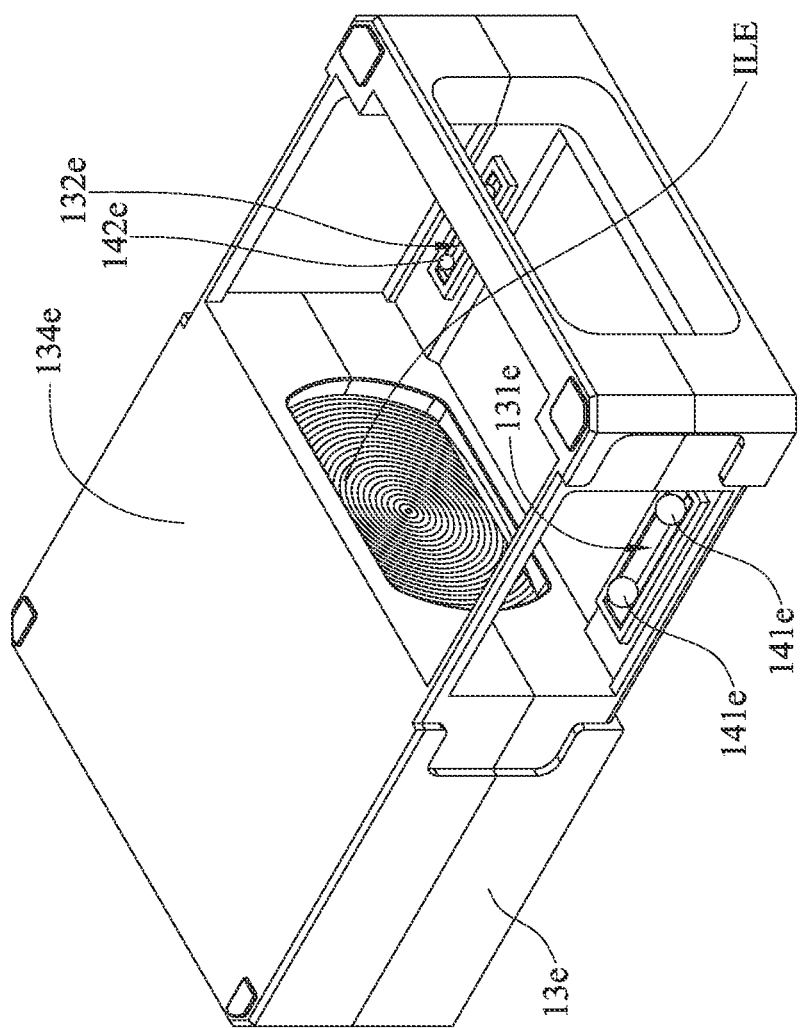
FIG. 48 is a perspective view of a base, a rollable support assembly and some image-side optical lens elements of the imaging lens driving module in FIG. 40.
Figure 49:
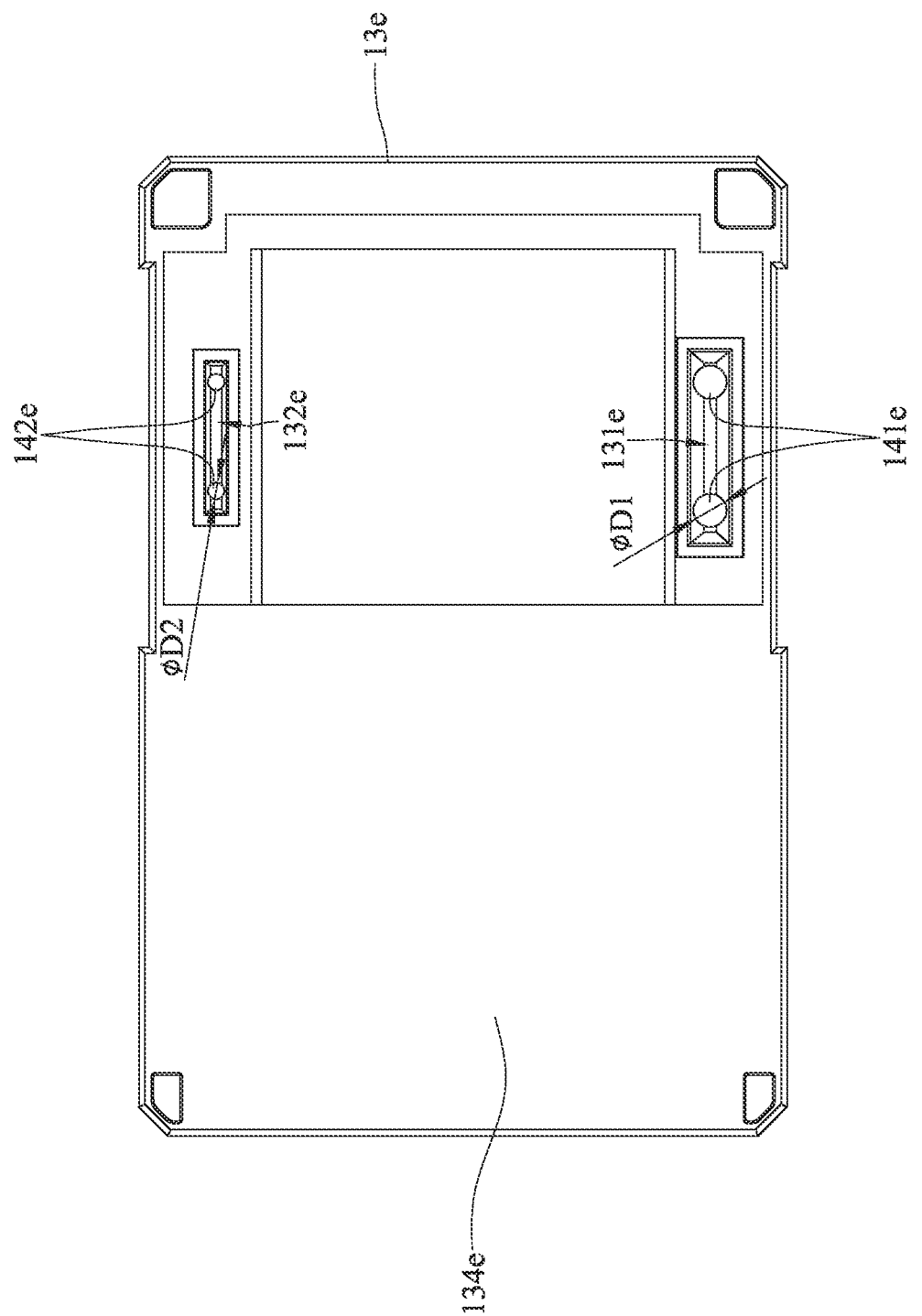
FIG. 49 is a top view of the base and the rollable support assembly in FIG. 48.

Please refer to FIG. 40 to FIG. 49. FIG. 40 is a perspective view of an imaging lens driving module according to the 5th embodiment of the present disclosure, FIG. 41 is an exploded view of the imaging lens driving module in FIG. 40, FIG. 42 is another exploded view of the imaging lens driving module in FIG. 40, FIG. 43 is a perspective view of the imaging lens driving module in FIG. 40 without a casing, FIG. 44 is a sectional view of the imaging lens driving module in FIG. 43, FIG. 45 is a top view of the imaging lens driving module in FIG. 43, FIG. 46 is a cross-sectional view of the imaging lens driving module along line 46-46 in FIG. 45, FIG. 47 is a cross-sectional view of the imaging lens driving module along line 47-47 in FIG. 45, FIG. 48 is a perspective view of a base, a rollable support assembly and some image-side optical lens elements of the imaging lens driving module in FIG. 40, and FIG. 49 is a top view of the base and the rollable support assembly in FIG. 48.

The imaging lens driving module 1e includes a casing 10e, a lens system 11e, a lens holder 12e, a light-folding element 16e, a base 13e, a rollable support assembly 14e and a driving mechanism 15e. The casing 10e is disposed on the base 13e, and the casing 10e and the base 13e together form an accommodation space for the lens holder 12e to be slidably disposed therein.

The lens system 11e has a plurality of optical lens elements LE, and the lens system 11e has an optical axis OA passing through the optical lens elements LE. The optical lens elements LE includes a plurality of object-side optical lens elements OLE and a plurality of image-side optical lens elements ILE. The object-side optical lens elements OLE are located on the object side of the image-side optical lens elements ILE. In this embodiment, the object-side optical lens elements OLE have a central axis CA, and each of the object-side optical lens elements OLE has an outer peripheral reduction structure ORS reduced in a straight-line direction perpendicular to the central axis CA so as to provide a configuration having better space utilization arrangement, thereby reducing the size of the imaging lens driving module.

The lens holder 12e is for some of the image-side optical lens elements ILE to be disposed therein. The light-folding element 16e is located on the object side of the lens holder 12e and located on the image side of the object-side optical lens elements OLE for folding an incident optical trace PL towards the image-side optical lens elements ILE, and it is favorable for reducing the size of the imaging lens driving module 1e. In this embodiment, the light-folding element 16e is a prism, and the light-folding element 16e includes a reduction portion LR, and the reduction portion LR is reduced from the periphery of the light-folding element 16e towards the center of the light-folding element 16e so as to provide a configuration having better space utilization arrangement, thereby reducing the size of the imaging lens driving module 1e.

The base 13e includes a first guiding groove 131e, a second guiding groove 132e and a lens holder structure 134e. The first guiding groove 131e extends in a direction parallel to the optical axis OA and faces the lens holder 12e, the second guiding groove 132e extends in the direction parallel to the optical axis OA and is disposed opposite to the first guiding groove 131e, and the second guiding groove 132e faces the lens holder 12e. The lens holder structure 134e is for the other image-side optical lens elements ILE to be disposed therein, and it is favorable for increasing the optical design flexibility so as to meet optical requirements of higher product specifications.

In this embodiment, the image-side optical lens elements ILE disposed in the lens holder structure 134e have no relative motion with respect to the base 13e, such that the optical lens elements can be installed in predetermined positions more easily so as to improve image quality. It can be understood that only the image-side optical lens elements ILE disposed in the lens holder 12e among all image-side optical lens elements ILE have a relative motion with respect to the base 13e.

In this embodiment, the light-folding element 16e has no relative motion with respect to the base 13e, and the object-side optical lens elements OLE have no relative motion with respect to the base 13e, either.

The rollable support assembly 14e is disposed between the lens holder 12e and the base 13e, and the rollable support assembly 14e is in physical contact with the lens holder 12e and the base 13e, such that the lens holder 12e has a degree of freedom of parallel movement with respect to the base 13e. The rollable support assembly 14e includes two principal rollable support elements 141e and two auxiliary rollable support elements 142e. The principal rollable support elements 141e are disposed between the lens holder 12e and the first guiding groove 131e, and the auxiliary rollable support elements 142e are disposed between the lens holder 12e and the second guiding groove 132e.

As shown in FIG. 46, the first guiding groove 131e has two contact points with one principal rollable support element 141e so as to ensure straight movement of the principal rollable support element 141e in the direction parallel to the optical axis. In addition, the second guiding groove 132e has a single contact point with one auxiliary rollable support element 142e so as to compensate for remaining assembly errors and absorb assembly warpage generated during the assembly process, thereby improving yield rate.

The driving mechanism 15e includes a flexible printed circuit board 150e, a plurality of driving magnets 151e and a plurality of driving coils 152e. The flexible printed circuit board 150e is attached to the base 13e, the driving magnets 151e are disposed on two opposite sides of the lens holder 12e, and the driving coils 152e are disposed on the flexible printed circuit board 150e and respectively correspond to the driving magnets 151e. The driving mechanism 15e provides a driving force generated by the driving magnets 151e and the driving coils 152e to drive the lens holder 12e to move, and with the collaboration of the principal rollable support elements 141e of the rollable support assembly 14e, the lens holder 12e is movable along the first guiding groove 131e (i.e., in the direction parallel to the optical axis OA) with respect to the base 13e after being driven by the driving mechanism 15e.

When a diameter of the principal rollable support element 141e in physical contact with the lens holder 12e is ΦD1, and a diameter of the auxiliary rollable support element 142e in physical contact with the lens holder 12e is ΦD2, the following condition is satisfied: ΦD1>ΦD2. Therefore, since the diameters of the principal rollable support element and the auxiliary rollable support element in physical contact with the lens holder are different from each other, it can be a foolproof mechanism during the assembly process of the imaging lens driving module, thereby improving recognition efficiency during the assembly process. In this embodiment, both the diameters of the two principal rollable support elements 141e can be ΦD1, and the two principal rollable support elements 141e are in physical contact with the lens holder 12e; alternatively, due to manufacturing errors, there may be only one of the two principal rollable support elements 141e having a diameter being ΦD1 and in physical contact with the lens holder 12e, while the other principal rollable support element 141e has a diameter smaller than ΦD1 and is not in physical contact with the lens holder 12e. Similarly, both the diameters of the two auxiliary rollable support elements 142e can be ΦD2, and the two auxiliary rollable support elements 142e are in physical contact with the lens holder 12e; alternatively, due to manufacturing errors, there may be only one of the two auxiliary rollable support elements 142e having a diameter being ΦD2 and in physical contact with the lens holder 12e, while the other auxiliary rollable support element 142e has a diameter smaller than ΦD2 and is not in physical contact with the lens holder 12e.

When the number of the principal rollable support elements 141e is N1, and the number of the auxiliary rollable support elements 142e is N2, the following condition is satisfied: N2=N1. Therefore, a proper number arrangement of the principal rollable support elements 141e and the auxiliary rollable support elements 142e is favorable for optimizing the driving efficiency of the imaging lens driving module 1e. In this embodiment, the number (N1) of the principal rollable support elements 141e is two, and also, the number (N2) of the auxiliary rollable support elements 142e is two.

6th Embodiment

Figure 50:
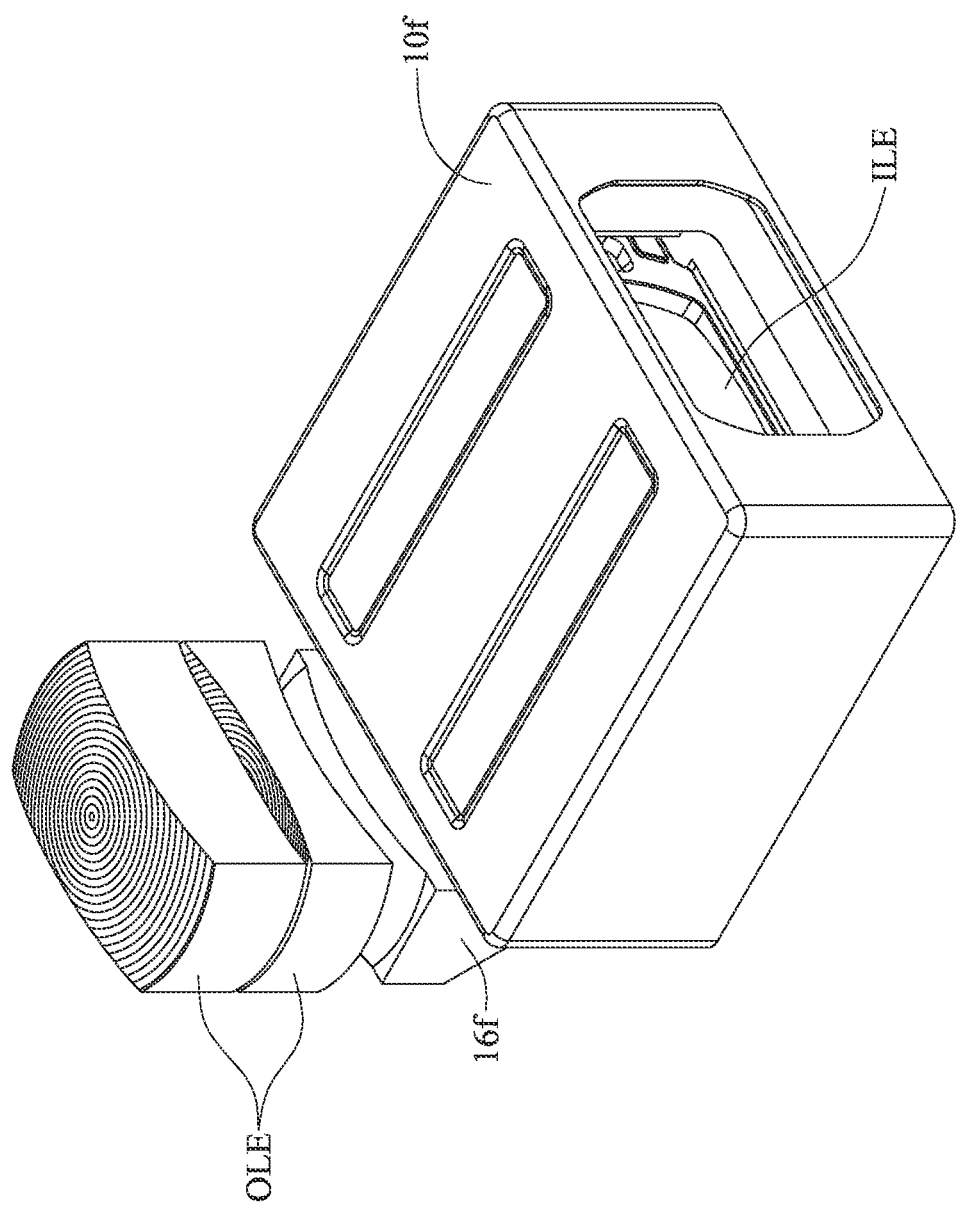
FIG. 50 is a perspective view of an imaging lens driving module according to the 6th embodiment of the present disclosure.
Figure 51:
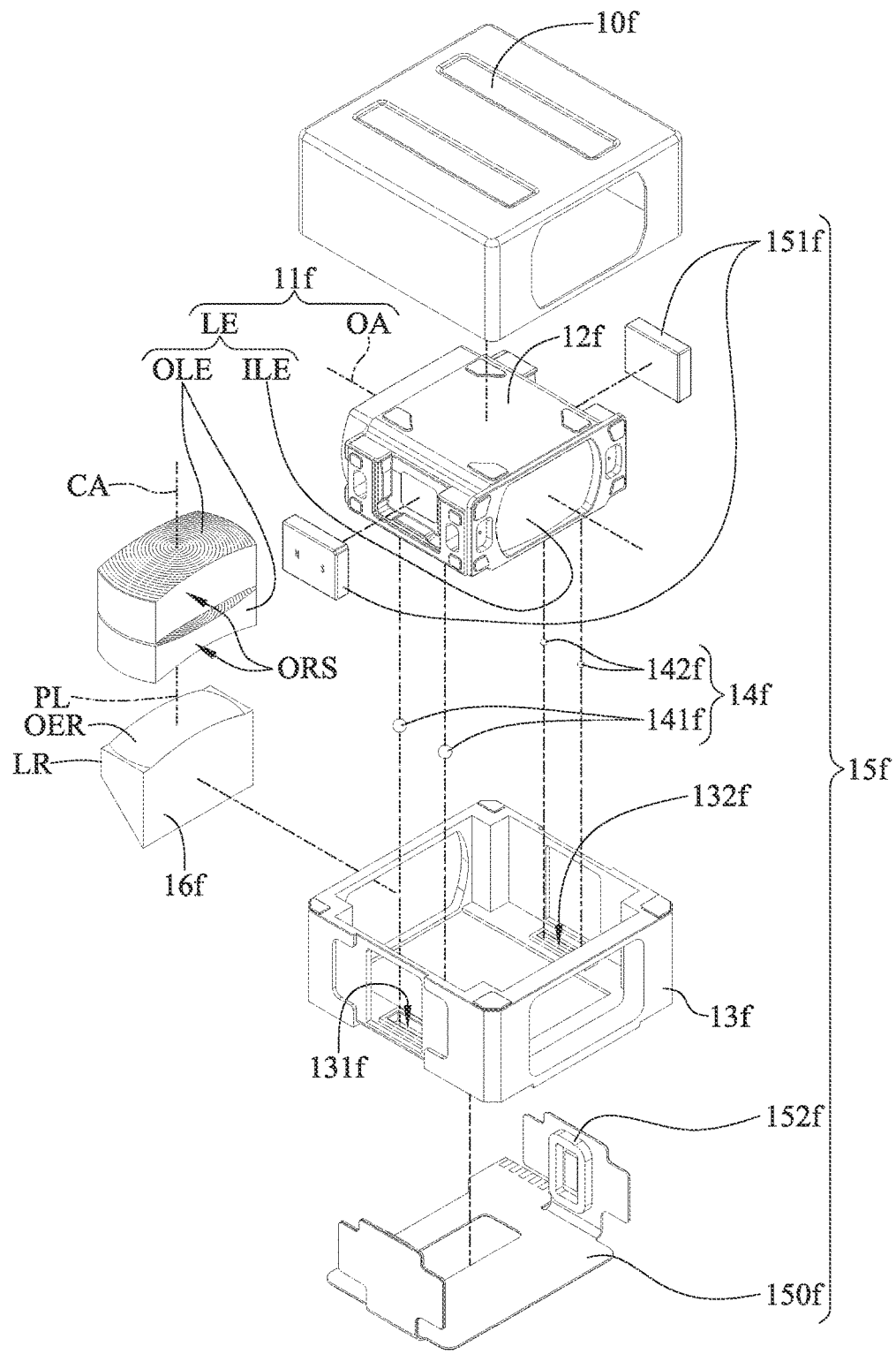
FIG. 51 is an exploded view of the imaging lens driving module in FIG. 50.
Figure 52:
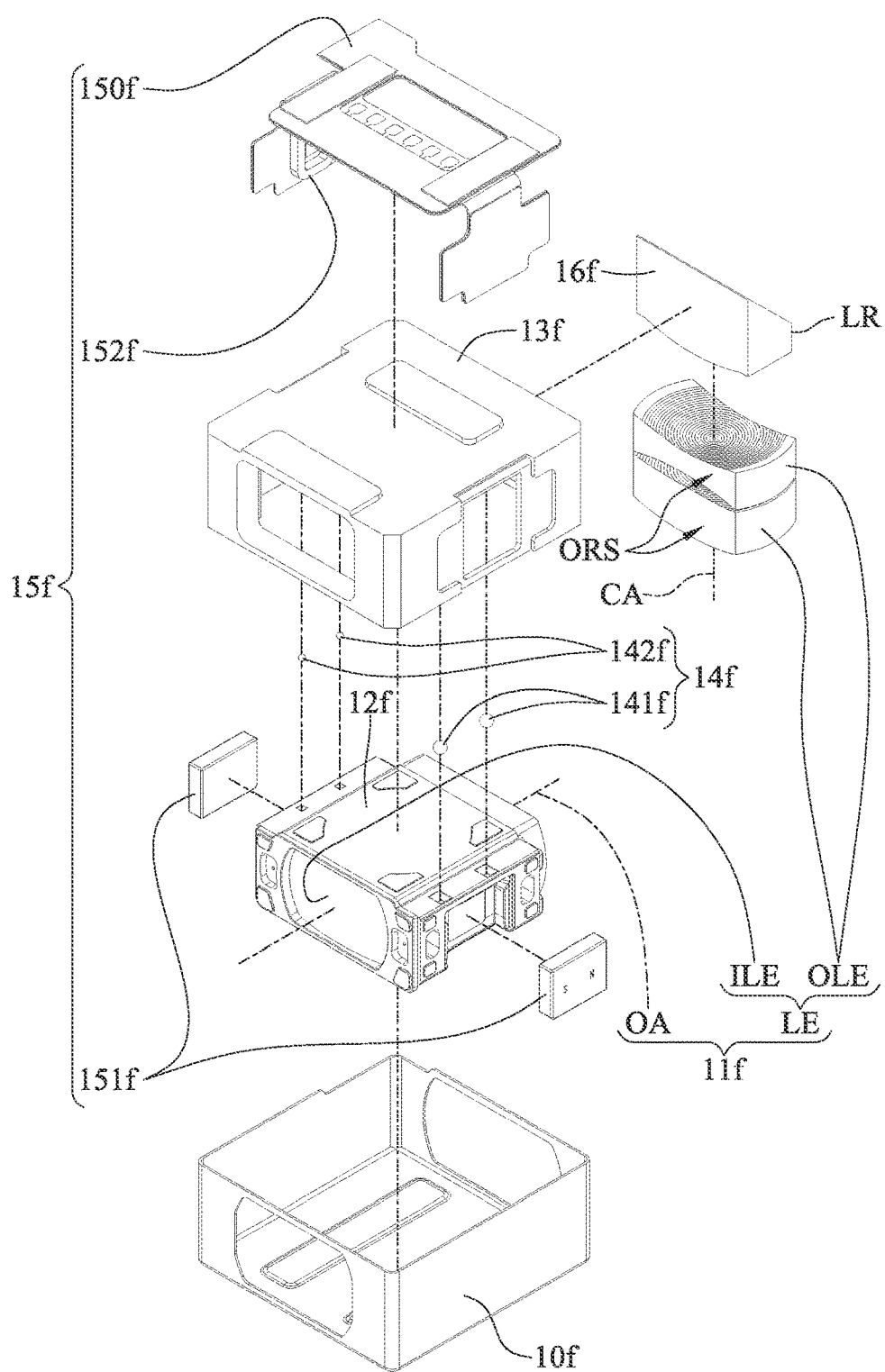
FIG. 52 is another exploded view of the imaging lens driving module in FIG. 50.
Figure 53:
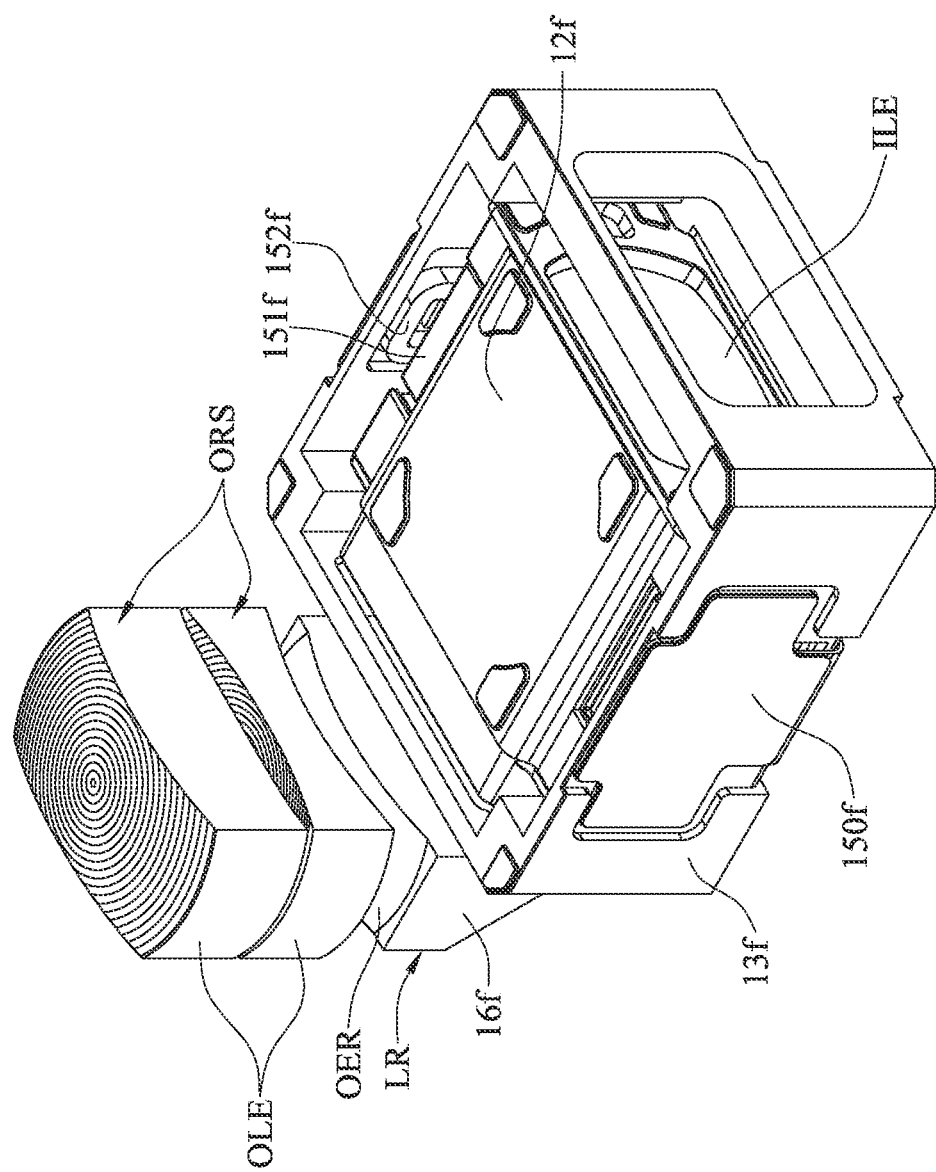
FIG. 53 is a perspective view of the imaging lens driving module in FIG. 50 without a casing.
Figure 54:
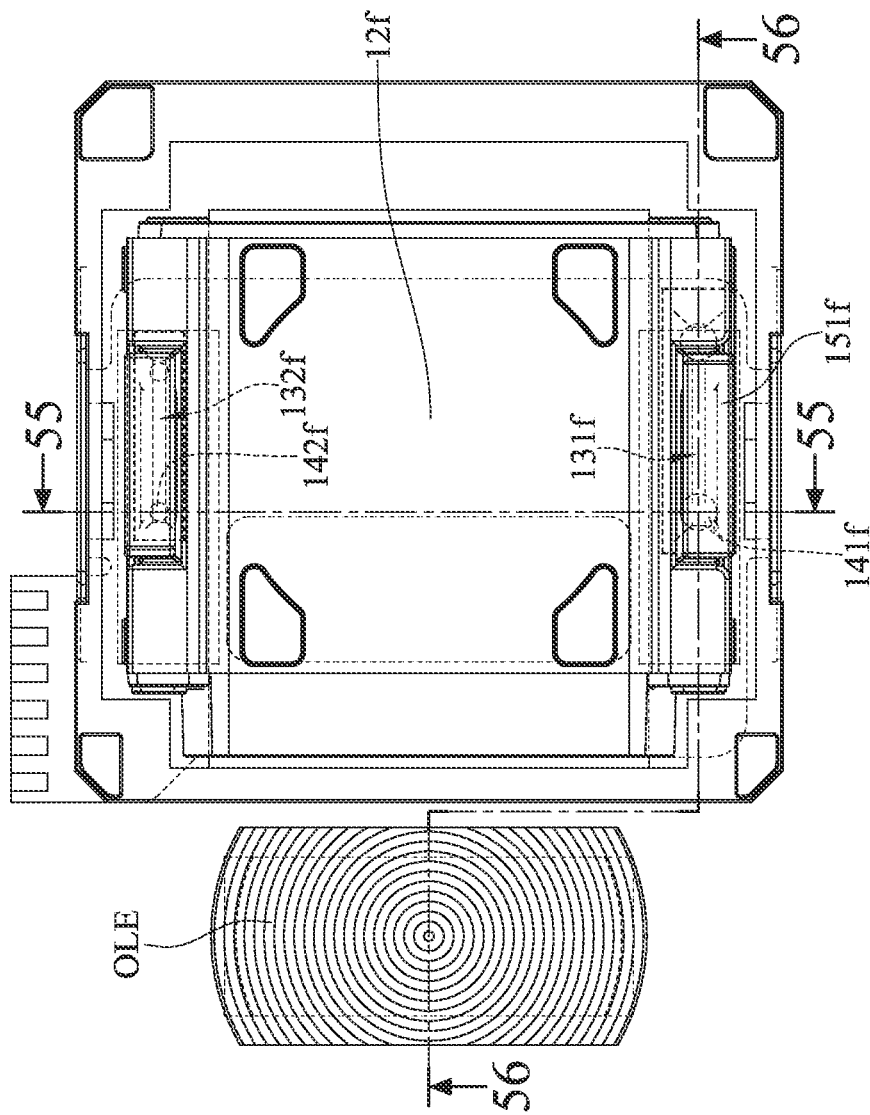
FIG. 54 is a top view of the imaging lens driving module in FIG. 53.
Figure 55:
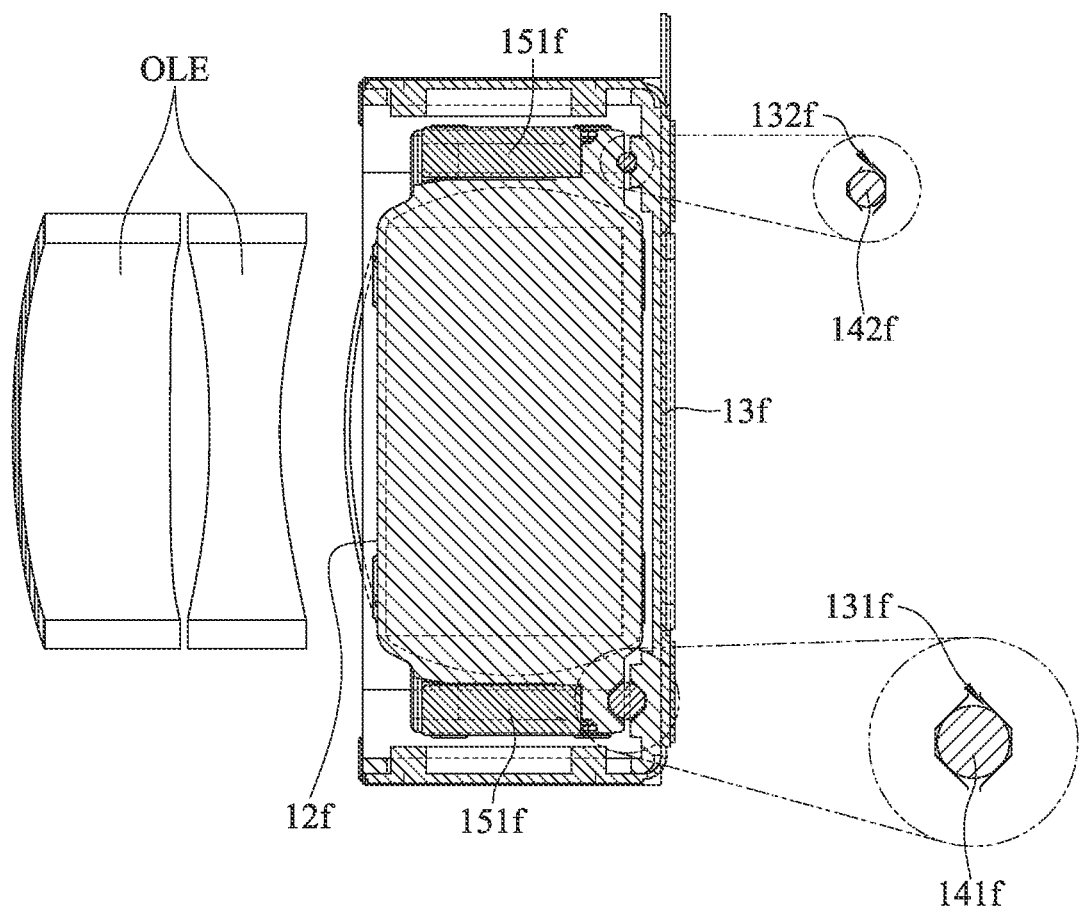
FIG. 55 is a cross-sectional view of the imaging lens driving module along line 55-55 in FIG. 54.
Figure 56:
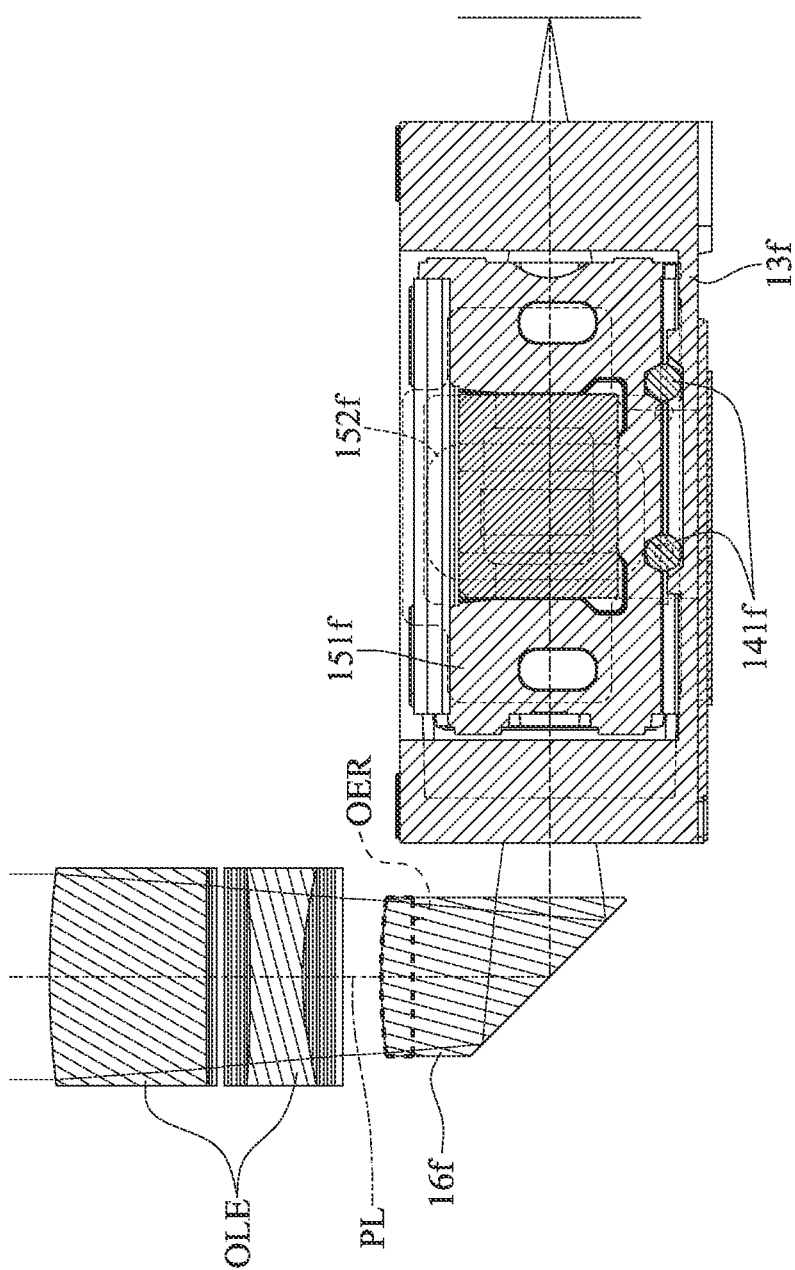
FIG. 56 is a cross-sectional view of the imaging lens driving module along line 56-56 in FIG. 54.
Figure 57:
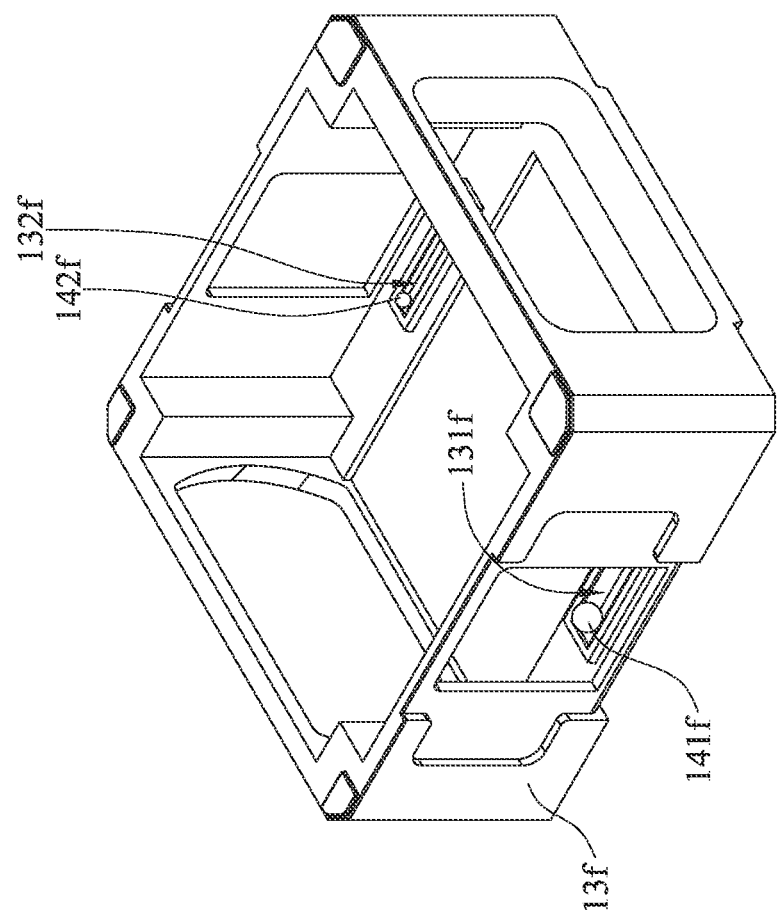
FIG. 57 is a perspective view of a base and a rollable support assembly of the imaging lens driving module in FIG. 50.
Figure 58:
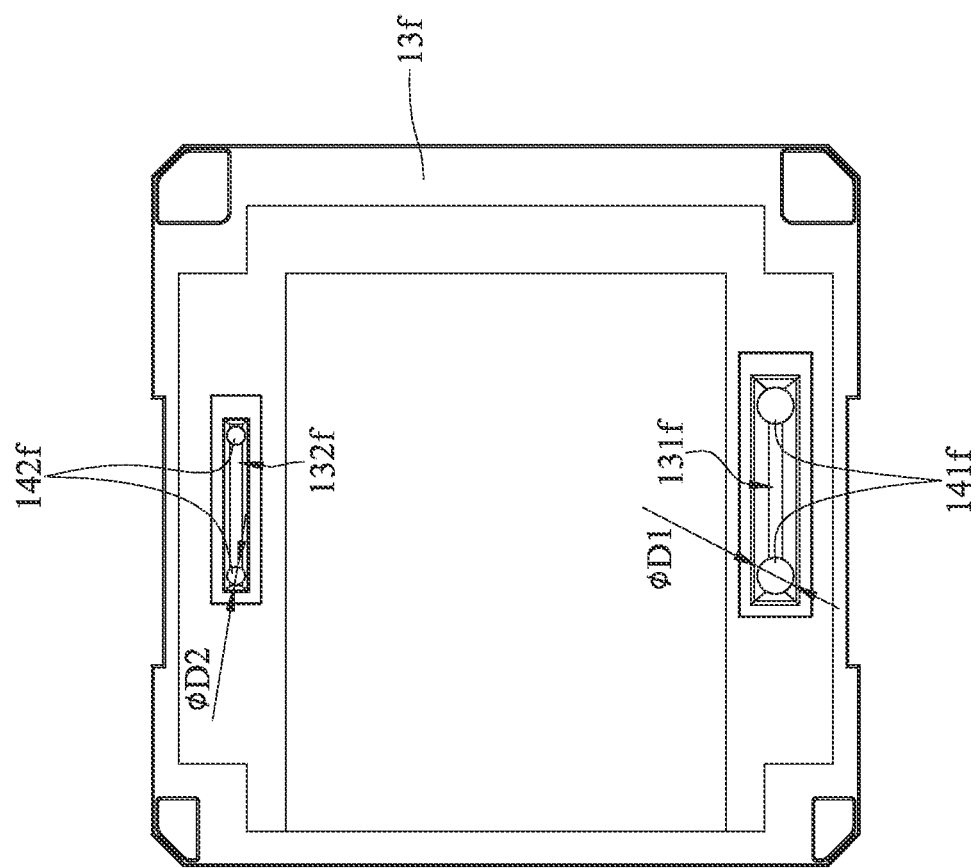
FIG. 58 is a top view of the base and the rollable support assembly in FIG. 57.

Please refer to FIG. 50 to FIG. 58. FIG. 50 is a perspective view of an imaging lens driving module according to the 6th embodiment of the present disclosure, FIG. 51 is an exploded view of the imaging lens driving module in FIG. 50, FIG. 52 is another exploded view of the imaging lens driving module in FIG. 50, FIG. 53 is a perspective view of the imaging lens driving module in FIG. 50 without a casing, FIG. 54 is a top view of the imaging lens driving module in FIG. 53, FIG. 55 is a cross-sectional view of the imaging lens driving module along line 55-55 in FIG. 54, FIG. 56 is a cross-sectional view of the imaging lens driving module along line 56-56 in FIG. 54, FIG. 57 is a perspective view of a base and a rollable support assembly of the imaging lens driving module in FIG. 50, and FIG. 58 is a top view of the base and the rollable support assembly in FIG. 57.

The imaging lens driving module 1f includes a casing 10f, a lens system 11f, a lens holder 12f, a light-folding element 16f, a base 13f, a rollable support assembly 14f and a driving mechanism 15f. The casing 10f is disposed on the base 13f, and the casing 10f and the base 13f together form an accommodation space for the lens holder 12f to be slidably disposed therein.

The lens system 11f has a plurality of optical lens elements LE, and the lens system 11f has an optical axis OA passing through the optical lens elements LE. The optical lens elements LE includes a plurality of object-side optical lens elements OLE and a plurality of image-side optical lens elements ILE. The object-side optical lens elements OLE are located on the object side of the image-side optical lens elements ILE. In this embodiment, the object-side optical lens elements OLE have a central axis CA, and each of the object-side optical lens elements OLE has an outer peripheral reduction structure ORS reduced in a straight-line direction perpendicular to the central axis CA so as to provide a configuration having better space utilization arrangement, thereby reducing the size of the imaging lens driving module.

The lens holder 12f is for the image-side optical lens elements ILE to be disposed therein. The light-folding element 16f is located on the object side of the lens holder 12f and located on the image side of the object-side optical lens elements OLE for folding an incident optical trace PL towards the image-side optical lens elements ILE, and it is favorable for reducing the size of the imaging lens driving module the imaging lens driving module 1f. In this embodiment, the light-folding element 16f is a prism, and the light-folding element 16f includes a reduction portion LR and an optical effective region OER. The reduction portion LR is reduced from the periphery of the light-folding element 16f towards the center of the light-folding element 16f so as to provide a configuration having better space utilization arrangement, thereby reducing the size of the imaging lens driving module 1f. As shown in FIG. 56, when the incident optical trace PL passes through the optical effective region OER of the light-folding element 16f, the optical effective region OER converges the incident optical trace PL and then folds the incident optical trace PL towards the image-side optical lens elements ILE. Therefore, it is favorable for integrating functions of light folding and refractive power into one light-folding element so as to reduce manufacturing costs; furthermore, the total track length of the imaging lens driving module provided with the light-folding element along the direction parallel to the optical axis can be reduced, thereby achieving compactness.

The base 13f includes a first guiding groove 131f and a second guiding groove 132f. The first guiding groove 131f extends in a direction parallel to the optical axis OA and faces the lens holder 12f, the second guiding groove 132f extends in the direction parallel to the optical axis OA and is disposed opposite to the first guiding groove 131f, and the second guiding groove 132f faces the lens holder 12f.

In this embodiment, the light-folding element 16f has no relative motion with respect to the base 13f, and the object-side optical lens elements OLE have no relative motion with respect to the base 13f, either.

The rollable support assembly 14f is disposed between the lens holder 12f and the base 13f, and the rollable support assembly 14f is in physical contact with the lens holder 12f and the base 13f, such that the lens holder 12f has a degree of freedom of parallel movement with respect to the base 13f. The rollable support assembly 14f includes two principal rollable support elements 141f and two auxiliary rollable support elements 142f. The principal rollable support elements 141f are disposed between the lens holder 12f and the first guiding groove 131f, and the auxiliary rollable support elements 142f are disposed between the lens holder 12f and the second guiding groove 132f.

As shown in FIG. 55, the first guiding groove 131f has two contact points with one principal rollable support element 141f so as to ensure straight movement of the principal rollable support element 141f in the direction parallel to the optical axis. In addition, the second guiding groove 132f has a single contact point with one auxiliary rollable support element 142f so as to compensate for remaining assembly errors and absorb assembly warpage generated during the assembly process, thereby improving yield rate.

The driving mechanism 15f includes a flexible printed circuit board 150f, a plurality of driving magnets 151f and a plurality of driving coils 152f. The flexible printed circuit board 150f is attached to the base 13f, the driving magnets 151f are disposed on two opposite sides of the lens holder 12f, and the driving coils 152f are disposed on the flexible printed circuit board 150f and respectively correspond to the driving magnets 151f. The driving mechanism 15f provides a driving force generated by the driving magnets 151f and the driving coils 152f to drive the lens holder 12f to move, and with the collaboration of the principal rollable support elements 141f of the rollable support assembly 14f, the lens holder 12f is movable along the first guiding groove 131f (i.e., in the direction parallel to the optical axis OA) with respect to the base 13f after being driven by the driving mechanism 15f.

When a diameter of the principal rollable support element 141f in physical contact with the lens holder 12f is ΦD1, and a diameter of the auxiliary rollable support element 142f in physical contact with the lens holder 12f is ΦD2, the following condition is satisfied: ΦD1>ΦD2. Therefore, since the diameters of the principal rollable support element and the auxiliary rollable support element in physical contact with the lens holder are different from each other, it can be a foolproof mechanism during the assembly process of the imaging lens driving module, thereby improving recognition efficiency during the assembly process. In this embodiment, both the diameters of the two principal rollable support elements 141f can be ΦD1, and the two principal rollable support elements 141f are in physical contact with the lens holder 12f; alternatively, due to manufacturing errors, there may be only one of the two principal rollable support elements 141f having a diameter being ΦD1 and in physical contact with the lens holder 12f, while the other principal rollable support element 141f has a diameter smaller than ΦD1 and is not in physical contact with the lens holder 12f. Similarly, both the diameters of the two auxiliary rollable support elements 142f can be ΦD2, and the two auxiliary rollable support elements 142f are in physical contact with the lens holder 12f; alternatively, due to manufacturing errors, there may be only one of the two auxiliary rollable support elements 142f having a diameter being ΦD2 and in physical contact with the lens holder 12f, while the other auxiliary rollable support element 142f has a diameter smaller than ΦD2 and is not in physical contact with the lens holder 12f.

When the number of the principal rollable support elements 141f is N1, and the number of the auxiliary rollable support elements 142f is N2, the following condition is satisfied: N2=N1. Therefore, a proper number arrangement of the principal rollable support elements 141f and the auxiliary rollable support elements 142f is favorable for optimizing the driving efficiency of the imaging lens driving module 1f. In this embodiment, the number (N1) of the principal rollable support elements 141f is two, and also, the number (N2) of the auxiliary rollable support elements 142f is two.

7th Embodiment

Figure 59:
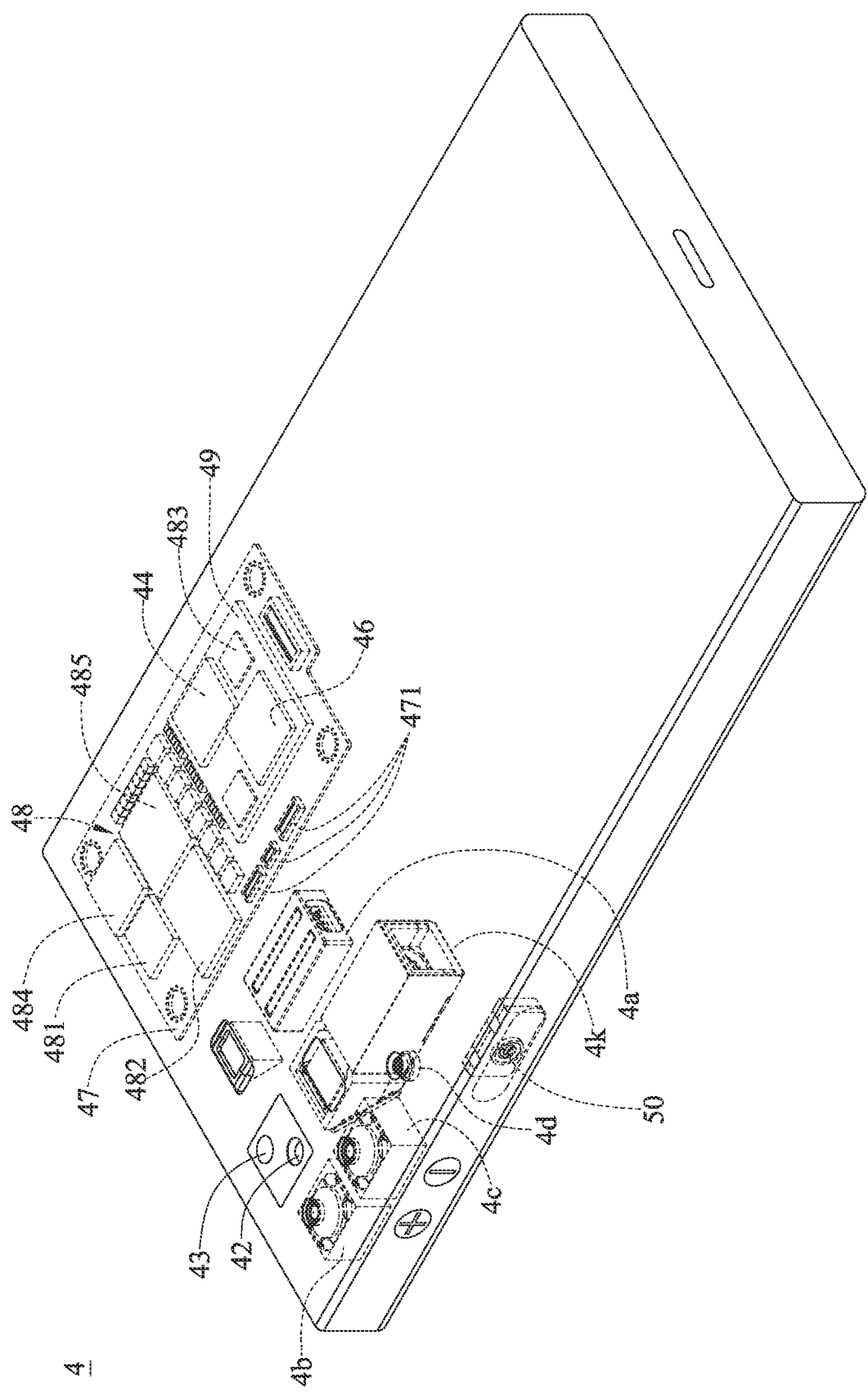
FIG. 59 is one perspective view of an electronic device according to the 7th embodiment of the present disclosure.
Figure 60:
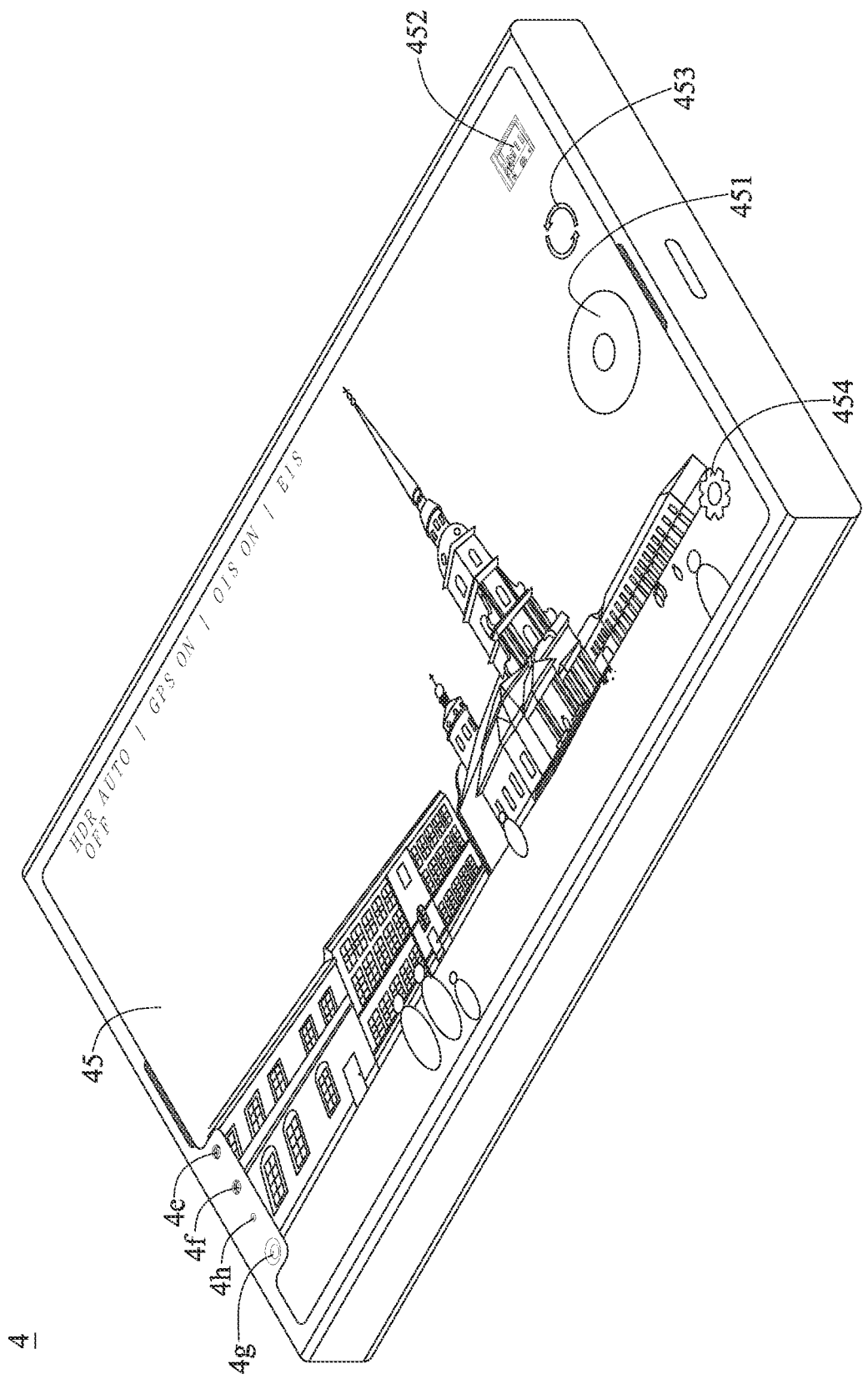
FIG. 60 is another perspective view of the electronic device in FIG. 59.
Figure 61:
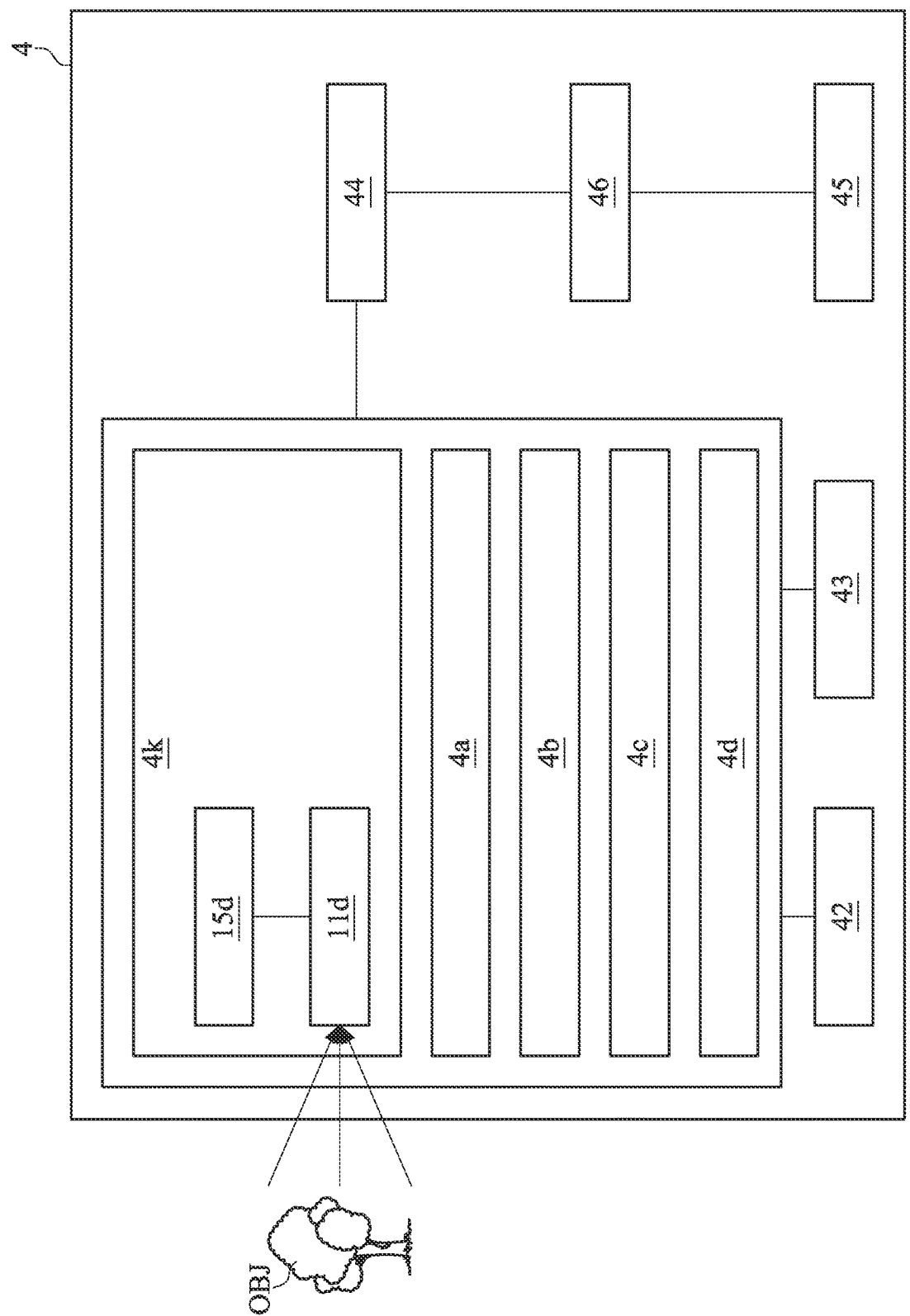
FIG. 61 is a block diagram of the electronic device in FIG. 59.

Please refer to FIG. 59 to FIG. 61. FIG. 59 is one perspective view of an electronic device according to the 7th embodiment of the present disclosure, FIG. 60 is another perspective view of the electronic device in FIG. 59, and FIG. 61 is a block diagram of the electronic device in FIG. 59.

In this embodiment, an electronic device 4 is a mobile device such as a computer, a smartphone, a smart wearable device, a camera drone, a driving recorder and displayer, and the present disclosure is not limited thereto. The electronic device 4 including an image capturing unit 4k, an image capturing unit 4a, an image capturing unit 4b, an image capturing unit 4c, an image capturing unit 4d, an image capturing unit 4e, an image capturing unit 4f, an image capturing unit 4g, a flash module 42, a focus assist module 43, an image signal processor 44, a display module 45, an image software processor 46 and a biometric identification device 50. In addition, the image capturing unit 4k includes the imaging lens driving module 1d disclosed in the 4th embodiment, an image sensor and an image stabilizer, and the image capturing unit 4a includes the imaging lens driving module 1 disclosed in the 1st embodiment, a light-folding element (not shown), an image sensor and an image stabilizer.

The image capturing unit 4k, the image capturing unit 4a, the image capturing unit 4b, the image capturing unit 4c and the image capturing unit 4d are disposed on the same side of the electronic device 4. The image capturing unit 4e, the image capturing unit 4f, the image capturing unit 4g and the display module 45 are disposed on the opposite side of the electronic device 4. The display module 45 can be a user interface, such that the image capturing units 4e, 4f can be front-facing cameras of the electronic device 4 for taking selfies, but the present disclosure is not limited thereto.

Each of the image capturing units 4b, 4c, 4d, 4e, 4f and 4g can include the imaging lens driving module of the present disclosure and can have a configuration similar to that of the image capturing unit 4k or the image capturing unit 4a. In detail, each of the image capturing units 4b, 4c, 4d, 4e, 4f and 4g can include an imaging lens driving module, an image sensor and an image stabilizer.

Figure 62:
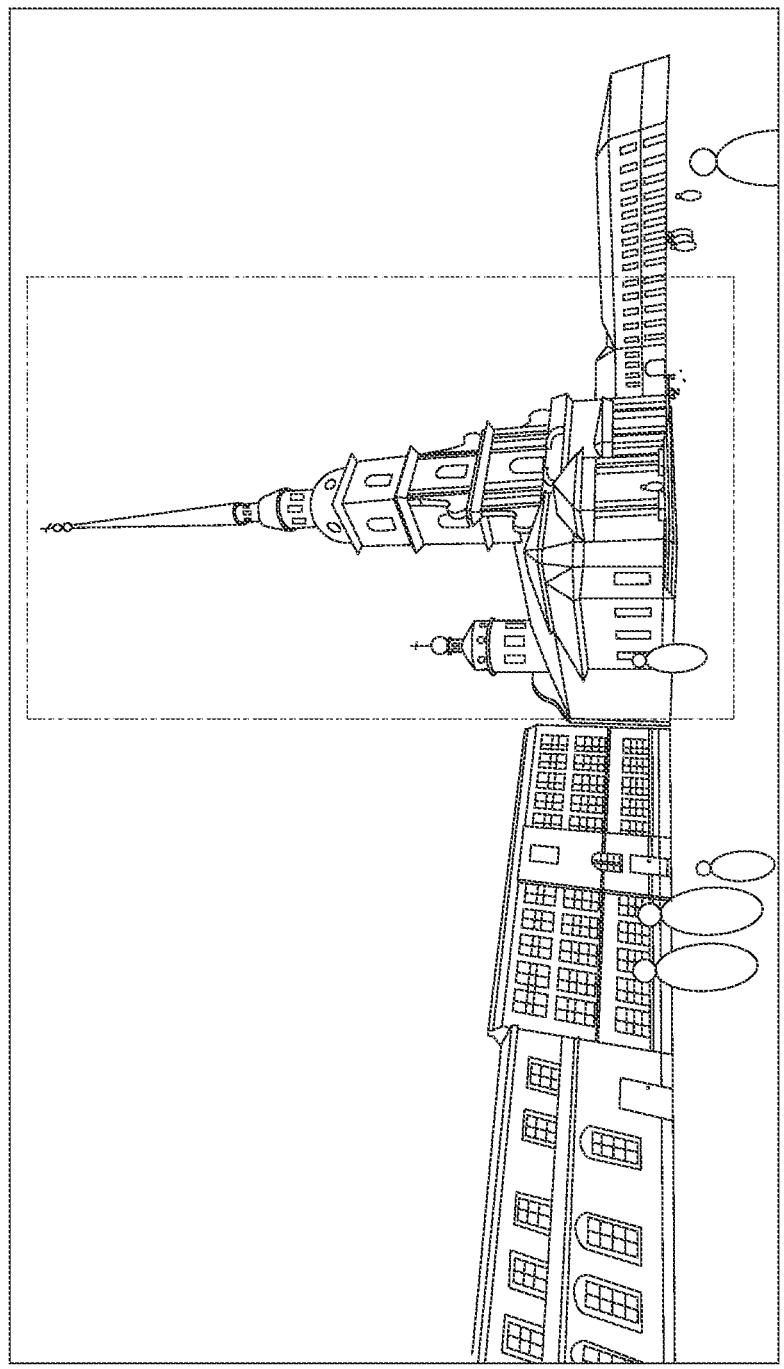
FIG. 62 shows an image captured by the electronic device in FIG. 59 with an equivalent focal length ranging between 11 mm and 14 mm.
Figure 63:
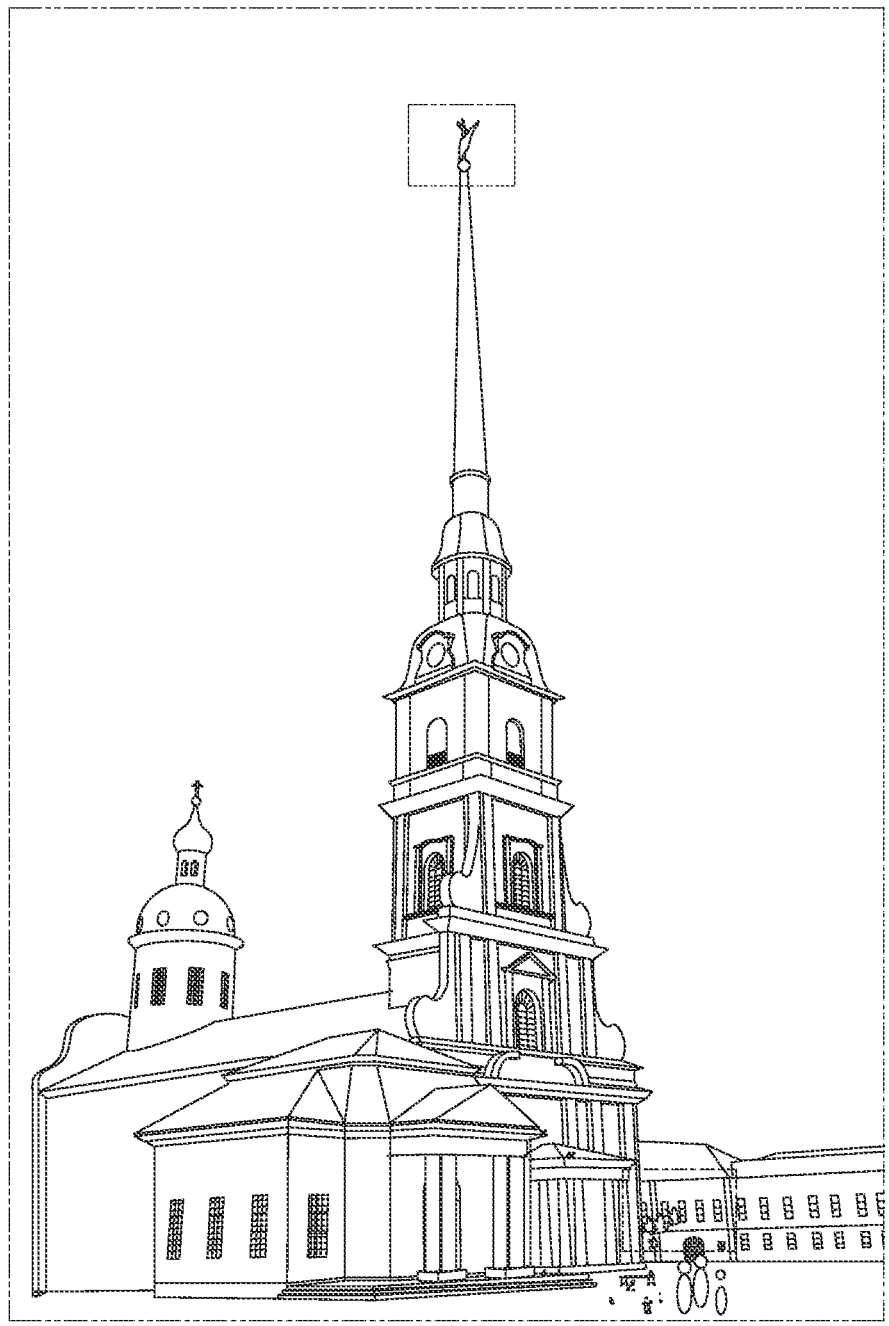
FIG. 63 shows an image captured by the electronic device in FIG. 59 with an equivalent focal length ranging between 22 mm and 30 mm.
Figure 64:
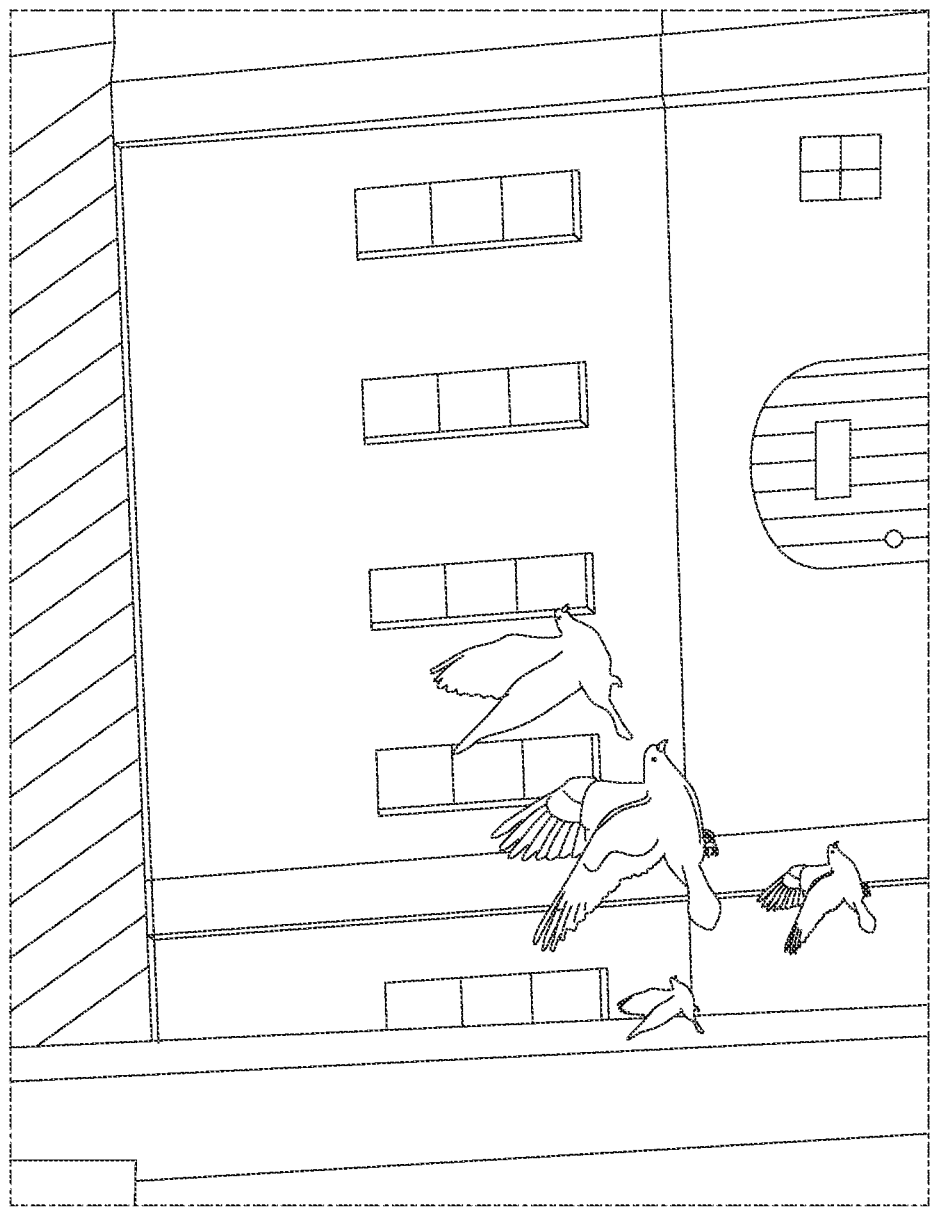
FIG. 64 shows an image captured by the electronic device in FIG. 59 with an equivalent focal length ranging between 60 mm and 300 mm.
Figure 65:
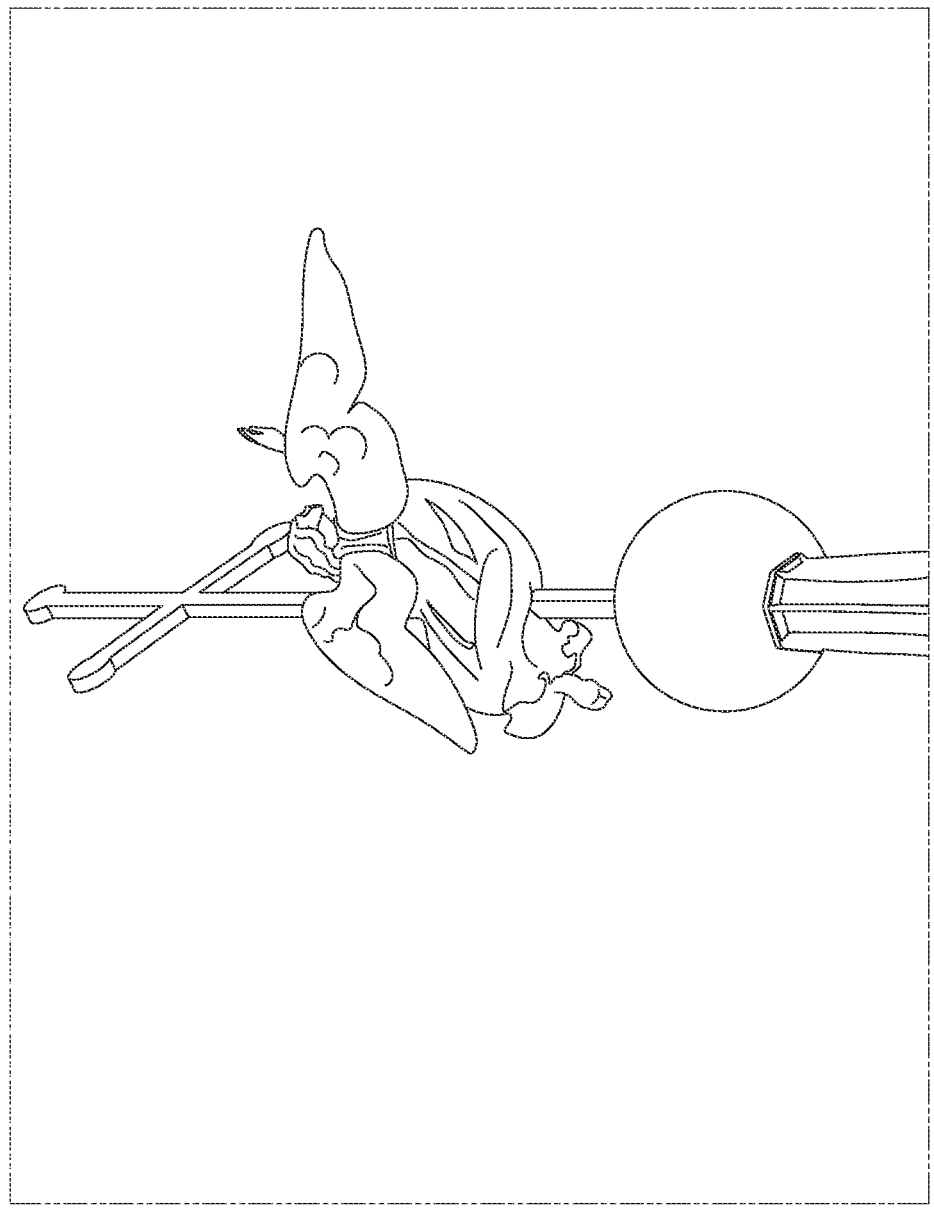
FIG. 65 shows an image captured by the electronic device in FIG. 59 with an equivalent focal length ranging between 400 mm and 600 mm.

The image capturing unit 4k is an ultra-telephoto image capturing unit, the image capturing unit 4a is a zoom-telephoto image capturing unit, the image capturing unit 4b is a wide-angle image capturing unit, the image capturing unit 4c is an ultra-wide-angle image capturing unit, the image capturing unit 4d is a macro-photo image capturing unit, the image capturing unit 4e is an ultra-wide-angle image capturing unit, the image capturing unit 4f is a wide-angle image capturing unit and the image capturing unit 4g is a ToF (time of flight) image capturing unit. In this embodiment, the image capturing units 4k, 4a, 4b, 4c and 4d have different fields of view, such that the electronic device 4 can have various magnification ratios so as to meet the requirement of optical zoom functionality. For example, the ultra-wide-angle image capturing unit 4c or 4e with the maximum field of view ranging between 105 degrees and 125 degrees can achieve an image with an equivalent focal length between 11 mm and 14 mm. In this case, the image captured by the ultra-wide-angle image capturing unit 4c or 4e can refer to FIG. 62, which shows an image captured by the electronic device 4 with an equivalent focal length ranging between 11 mm and 14 mm, and the captured image as shown in FIG. 62 includes the whole cathedral, surrounding buildings and people on the square. The captured image as shown in FIG. 62 has a relatively large field of view and depth of view, but it often has a relatively large degree of distortion. The wide-angle image capturing unit 4b or 4f with the maximum field of view ranging between 70 degrees and 90 degrees can achieve an image with an equivalent focal length between 22 mm and 30 mm. In this case, the image captured by the wide-angle image capturing unit 4b or 4f can refer to FIG. 63, which shows an image captured by the electronic device 4 with an equivalent focal length ranging between 22 mm and 30 mm, and the captured image as shown in FIG. 63 includes the whole cathedral and people in front of the cathedral. The zoom-telephoto image capturing unit 4a with the maximum field of view ranging between 10 degrees and 40 degrees can achieve an image with an equivalent focal length between 60 mm and 300 mm, and the zoom-telephoto image capturing unit 4a can be regarded as able to provide 5× magnification. In this case, the image captured by the zoom-telephoto image capturing unit 4a can refer to FIG. 64, which shows an image captured by the electronic device 4 with an equivalent focal length ranging between 60 mm and 300 mm, and the captured image as shown in FIG. 64 includes the birds flying in front of the cathedral. The captured image as shown in FIG. 64 has a relatively small field of view and depth of view, and the zoom-telephoto image capturing unit 4a can be used for shooting moving targets. For this, the driving mechanism 15d can drive the lens holder assembly 12d and thus move the lens system 11d to quickly and continuously autofocus on the target, such that the captured image of the target would not be blurred due to long focusing distance. When imaging, the zoom-telephoto image capturing unit 4a can further perform optical zoom for imaged objects so as to obtain more clear images. Said magnification ratio of one image capturing unit is defined as a ratio of the maximum focal length to the minimum focal length of the image capturing unit. For instance, the magnification ratio of the zoom-telephoto image capturing unit 4a is 5× magnification. The ultra-telephoto image capturing unit 4k with the maximum field of view ranging between 4 degrees and 8 degrees can achieve an image with an equivalent focal length between 400 mm and 600 mm. In this case, the image captured by the ultra-telephoto image capturing unit 4k can refer to FIG. 65, which shows an image captured by the electronic device 4 with an equivalent focal length ranging between 400 mm and 600 mm, and the captured image as shown in FIG. 65 includes the angel-and-cross-topped spire of the cathedral. The captured image as shown in FIG. 65 has a smaller field of view and depth of view, and the lens system 11d of the ultra-telephoto image capturing unit 4k may be easier to capture an out of focus image due to slight camera shake. For this, the driving mechanism 15d can provide a feedback force to correct the shake so as to achieve optical image stabilization while providing a force to drive the lens system 11d of the ultra-telephoto image capturing unit 4k to focus on a target. In addition, the image capturing unit 4g can determine depth information of the imaged object. In this embodiment, the electronic device 4 includes multiple image capturing units 4k, 4a, 4b, 4c, 4d, 4e, 4f and 4g, but the present disclosure is not limited to the number and arrangement of image capturing units (photographing cameras). The equivalent focal lengths to which the above-mentioned image capturing units correspond are estimated values based on particular conversion functions, and the estimated values may be different from actual focal lengths of the image capturing units due to designs of the lens systems and sizes of the image sensors.

When a user captures images of an object OBJ, light rays converge in the image capturing unit 4k, the image capturing unit 4a, the image capturing unit 4b, the image capturing unit 4c or the image capturing unit 4d to generate images, and the flash module 42 is activated for light supplement. The focus assist module 43 detects the object distance of the imaged object OBJ to achieve fast auto focusing. The image signal processor 44 is configured to optimize the captured image to improve image quality. The light beam emitted from the focus assist module 43 can be either conventional infrared or laser.

In addition, the light rays may converge in the image capturing unit 4e, 4f or 4g to generate images. The electronic device 4 can include a reminder light 4h that can be illuminated to remind the user that the image capturing unit 4e, 4f or 4g of the electronic device 4 is working. The display module 45 can be a touch screen or a physical button 451. The user is able to interact with the display module 45 and the image software processor 46 having multiple functions to capture images and complete image processing. The image processed by the image software processor 46 can be displayed on the display module 45. The user can replay the previously captured image through an image playback button 452 of the display module 45, can choose a suitable image capturing unit for shooting through an image capturing units switching button 453 of the display module 45, and can properly adjust shooting parameters according to current shooting situations through an integrated menu button 454 of the display module 45.

Further, the electronic device 4 further includes a circuit board 47 and a plurality of electronic components 48 disposed on the circuit board 47. The image capturing units 4k, 4a, 4b, 4c, 4d, 4e, 4f and 4g are electrically connected to the electronic components 48 via connectors 471 on the circuit board 47. The electronic components 48 can include a signal emitting module 481 and can transmit image(s) to other electronic device or a cloud storage via the signal emitting module 481. The signal emitting module 481 can be a wireless fidelity (WiFi) module, a Bluetooth module, an infrared module, a network service module or an integrated module for transmitting various signals mentioned above, and the present disclosure is not limited thereto.

The electronic components 48 can also include a storage unit 482, a random access memory 483 for storing image information, a gyroscope 484, and a position locator 485 for facilitating the navigation or positioning of the electronic device 4. In this embodiment, the image signal processor 44, the image software processor 46 and the random access memory 483 are integrated into a single chip system 49, but the present disclosure is not limited thereto. In some other embodiments, the electronic components can also be integrated in the image capturing unit or can also be disposed on one of the circuit boards. In addition, the user can use the biometric identification device 50 to turn on and unlock the electronic device 4.

The smartphone in this embodiment is only exemplary for showing the imaging lens driving module of the present disclosure installed in an electronic device, and the present disclosure is not limited thereto. The imaging lens driving module can be optionally applied to optical systems with a movable focus. Furthermore, the imaging lens driving module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens driving module, comprising:
   an lens system, having a plurality of optical lens elements, and the lens system having an optical axis passing through the plurality of optical lens elements;
   a lens holder assembly, comprising:
      a first lens holder, for at least one of the plurality of optical lens elements to be disposed therein; and
      a second lens holder, for at least another of the plurality of optical lens elements to be disposed therein;
   a base, comprising a guiding groove assembly, and the guiding groove assembly comprising:
      a first guiding groove, extending in a direction parallel to the optical axis and facing the first lens holder and the second lens holder; and
      a second guiding groove, extending in the direction parallel to the optical axis, wherein the second guiding groove and the first guiding groove are disposed opposite to each other, and the second guiding groove faces the first lens holder and the second lens holder;
   a rollable support assembly, disposed between the lens holder assembly and the base, such that the lens holder assembly has a degree of freedom of parallel movement with respect to the base, and the rollable support assembly comprising:
      at least one principal rollable support element, disposed between the lens holder assembly and the first guiding groove; and
      at least one auxiliary rollable support element, disposed between the lens holder assembly and the second guiding groove; and
   a driving mechanism, configured to drive the lens holder assembly to move in the direction parallel to the optical axis;
   wherein the rollable support assembly is in physical contact with the lens holder assembly, and the rollable support assembly is in physical contact with the base;
   wherein the at least one principal rollable support element of the rollable support assembly allows the lens holder assembly to move along the first guiding groove with respect to the base after the lens holder assembly is driven by the driving mechanism;
   wherein a diameter of the at least one principal rollable support element in physical contact with the first lens holder is $\Phi D1$, a diameter of the at least one auxiliary rollable support element in physical contact with the first lens holder is $\Phi D2$, and the following condition is satisfied:

$$\Phi D1/\Phi D2;$$

wherein the diameter of the at least one principal rollable support element in physical contact with the first lens holder corresponds to a specific size of the first guiding groove, the diameter of the at least one auxiliary rollable support element in physical contact with the first lens holder corresponds to a specific size of the second guiding groove, the specific size of the first guiding groove differs from the specific size of the second guiding groove, so that the at least one principal rollable support element is unable to be disposed in the second guiding groove or the at least one auxiliary rollable support element is unable to be disposed in the first guiding groove.

2. The imaging lens driving module of claim 1, wherein a number of the at least one principal rollable support element is plural, at least two of the principal rollable support elements face the first lens holder, and a first buffering support element is disposed between the at least two principal rollable support elements.

3. The imaging lens driving module of claim 2, wherein a number of the at least one auxiliary rollable support element is plural, at least two of the auxiliary rollable support elements face the first lens holder, a second buffering support element is disposed between the at least two auxiliary rollable support elements, the diameter of the at least one principal rollable support element in physical contact with the first lens holder is $\Phi D1$, the diameter of the at least one auxiliary rollable support element in physical contact with the first lens holder is $\Phi D2$, a diameter of the first buffering support element is $\Phi D3$, a diameter of the second buffering support element is $\Phi D4$, and the following conditions are satisfied:

$$\Phi D3 < \Phi D1; \text{ and}$$

$$\Phi D4 < \Phi D2.$$

4. The imaging lens driving module of claim 1, wherein a number of the at least one principal rollable support element is N1, a number of the at least one auxiliary rollable support element is N2, and the following condition is satisfied:

$N2 \leq N1$.

5. The imaging lens driving module of claim 1, further comprising a light-folding element, wherein the light-folding element is configured to fold an incident optical trace towards at least one of the plurality of optical lens elements.

6. An imaging lens driving module, comprising:
an lens system, having a plurality of optical lens elements, and the lens system having an optical axis passing through the plurality of optical lens elements;
a lens holder assembly, comprising:
  a first lens holder, for at least one of the plurality of optical lens elements to be disposed therein; and
  a second lens holder, for at least another of the plurality of optical lens elements to be disposed therein;
a base, comprising a guiding groove assembly, and the guiding groove assembly comprising:
  a first guiding groove, extending in a direction parallel to the optical axis and facing the first lens holder and the second lens holder;
  a second guiding groove, extending in the direction parallel to the optical axis, wherein the second guiding groove faces the first lens holder, and the second guiding groove does not face the second lens holder; and
  a third guiding groove, extending in the direction parallel to the optical axis, wherein the third guiding groove faces the second lens holder, and the third guiding groove does not face the first lens holder;
a rollable support assembly, disposed between the lens holder assembly and the base, such that the lens holder assembly has a degree of freedom of parallel movement with respect to the base, and the rollable support assembly comprising:
  at least one principal rollable support element, disposed between the lens holder assembly and the first guiding groove; and
  at least one auxiliary rollable support element, disposed between the lens holder assembly and other guiding groove other than the first guiding groove; and
a driving mechanism, configured to drive the lens holder assembly to move in the direction parallel to the optical axis;
wherein the rollable support assembly is in physical contact with the lens holder assembly, and the rollable support assembly is in physical contact with the base;
wherein the at least one principal rollable support element of the rollable support assembly allows the lens holder assembly to move along the first guiding groove with respect to the base after the lens holder assembly is driven by the driving mechanism;
wherein a diameter of the at least one principal rollable support element in physical contact with the first lens holder is $\Phi D1$, a diameter of the at least one auxiliary rollable support element in physical contact with the first lens holder is $\Phi D2$, and the following condition is satisfied:

$\Phi D1 / \Phi D2$;

wherein the diameter of the at least one principal rollable support element in physical contact with the first lens holder corresponds to a specific size of the first guiding groove, the diameter of the at least one auxiliary rollable support element in physical contact with the first lens holder corresponds to a specific size of the second guiding groove, the specific size of the first guiding groove differs from the specific size of the second guiding groove, so that the at least one principal rollable support element is unable to be disposed in the second guiding groove or the at least one auxiliary rollable support element is unable to be disposed in the first guiding groove.

7. The imaging lens driving module of claim 6, wherein the first guiding groove has same cross-sectional areas in the direction parallel to the optical axis.

8. The imaging lens driving module of claim 6, wherein the first guiding groove has different cross-sectional areas in the direction parallel to the optical axis.

9. The imaging lens driving module of claim 8, wherein the first guiding groove has a gradually expanding surface.

10. The imaging lens driving module of claim 9, wherein a number of the at least one principal rollable support element is plural, a minimum width of the gradually expanding surface is W, a maximum diameter among the principal rollable support elements is $\Phi D5$, and the following condition is satisfied:

$W < \Phi D5$.

11. An imaging lens driving module, comprising:
a lens system, having a plurality of optical lens elements, and the lens system having an optical axis passing through the plurality of optical lens elements;
a lens holder assembly, comprising:
  a first lens holder, for at least one of the plurality of optical lens elements to be disposed therein; and
  a second lens holder, for at least another of the plurality of optical lens elements to be disposed therein;
a base, comprising at least two guiding groove assemblies, and the at least two guiding groove assemblies comprising:
  a first guiding groove assembly, facing the first lens holder, wherein the first guiding groove assembly comprises a first guiding groove and a second guiding groove, the first guiding groove and the second guiding groove extend in a direction parallel to the optical axis, and the second guiding groove and the first guiding groove are disposed opposite to each other; and
  a second guiding groove assembly, facing the second lens holder, wherein the second guiding groove assembly comprises a third guiding groove and a fourth guiding groove, the third guiding groove and the fourth guiding groove extend in the direction parallel to the optical axis, and the fourth guiding groove and the third guiding groove are disposed opposite to each other;
at least two rollable support assemblies, disposed between the lens holder assembly and the base, such that the lens holder assembly has a degree of freedom of parallel movement with respect to the base, and the at least two rollable support assemblies comprising:
  a first rollable support assembly, comprising at least one first principal rollable support element and at least one first auxiliary rollable support element, wherein the at least one first principal rollable support element is disposed between the first lens holder and the first guiding groove, and the at least one first auxiliary rollable support element is disposed between the first lens holder and the second guiding groove; and a second rollable support assembly, comprising at least one second principal rollable support element and at least one second auxiliary rollable support element, wherein the at least one second principal rollable support element is disposed between the second lens holder and the third guiding groove, and the at least one second auxiliary rollable support element is disposed between the second lens holder and the fourth guiding groove; and a driving mechanism, configured to drive the lens holder assembly to move in the direction parallel to the optical axis;

wherein the at least two rollable support assemblies are in physical contact with the lens holder assembly, and the at least two rollable support assemblies are in physical contact with the base;

wherein the at least one first principal rollable support element allows the first lens holder to move along the first guiding groove with respect to the base after the first lens holder is driven by the driving mechanism, the at least one second principal rollable support element allows the second lens holder to move along the third guiding groove with respect to the base after the second lens holder is driven by the driving mechanism;

wherein a diameter of the at least one first principal rollable support element in physical contact with the first lens holder is ΦD1, a diameter of the at least one first auxiliary rollable support element in physical contact with the first lens holder is ΦD2, and the following condition is satisfied:

ΦD1/ΦD2;

wherein the diameter of the at least one first principal rollable support element in physical contact with the first lens holder corresponds to a specific size of the first guiding groove, the diameter of the at least one first auxiliary rollable support element in physical contact with the first lens holder corresponds to a specific size of the second guiding groove, the specific size of the first guiding groove differs from the specific size of the second guiding groove, so that the at least one first principal rollable support element is unable to be disposed in the second guiding groove or the at least one first auxiliary rollable support element is unable to be disposed in the first guiding groove.

12. The imaging lens driving module of claim 11, wherein the first guiding groove assembly and the second guiding groove assembly overlap each other in a direction perpendicular to the optical axis.

13. The imaging lens driving module of claim 11, wherein the first guiding groove assembly and the second guiding groove assembly do not overlap each other in the direction parallel to the optical axis.

14. The imaging lens driving module of claim 11, wherein the first guiding groove assembly and the second guiding groove assembly do not overlap each other in a direction perpendicular to the optical axis.

15. The imaging lens driving module of claim 11, wherein the first guiding groove assembly and the second guiding groove assembly overlap with each other in the direction parallel to the optical axis.

16. An imaging lens driving module, comprising:
a lens system, having a plurality of optical lens elements, and the lens system having an optical axis passing through the plurality of optical lens elements;
a lens holder, for at least one of the plurality of optical lens elements to be disposed therein;
a light-folding element, configured to fold an incident optical trace towards at least one of the plurality of optical lens elements;
a base, comprising:
  a first guiding groove, extending in a direction parallel to the optical axis and facing the lens holder; and
  a second guiding groove, extending in the direction parallel to the optical axis, wherein the second guiding groove and the first guiding groove are disposed opposite to each other, and the second guiding groove faces the lens holder;
a rollable support assembly, disposed between the lens holder and the base, such that the lens holder has a degree of freedom of parallel movement with respect to the base, and the rollable support assembly comprising:
  at least one principal rollable support element, disposed between the lens holder and the first guiding groove; and
  at least one auxiliary rollable support element, disposed between the lens holder and the second guiding groove; and
a driving mechanism, configured to drive the lens holder to move in the direction parallel to the optical axis;
wherein the rollable support assembly is in physical contact with the lens holder, and the rollable support assembly is in physical contact with the base;
wherein the at least one principal rollable support element of the rollable support assembly allows the lens holder to move along the first guiding groove with respect to the base after the lens holder is driven by the driving mechanism;
wherein the plurality of optical lens elements comprise at least one object-side optical lens element, and the at least one object-side optical lens element is located on an object side of the light-folding element;
wherein the light-folding element has no relative motion with respect to the base, and the at least one object-side optical lens element has no relative motion with respect to the base;
wherein a diameter of the at least one principal rollable support element in physical contact with the lens holder is ΦD1, and a diameter of the at least one auxiliary rollable support element in physical contact with the lens holder ΦD2, and the following condition is satisfied:

ΦD1≠ΦD2;

wherein the diameter of the at least one principal rollable support element in physical contact with the lens holder corresponds to a specific size of the first guiding groove, the diameter of the at least one auxiliary rollable support element in physical contact with the lens holder corresponds to a specific size of the second guiding groove, the specific size of the first guiding groove differs from the specific size of the second guiding groove, so that the at least one principal rollable support element is unable to be disposed in the second guiding groove or the at least one auxiliary rollable support element is unable to be disposed in the first guiding groove.

17. The imaging lens driving module of claim 16, wherein the base further comprises a lens holder structure for at least another of the plurality of optical lens elements to be disposed therein.

18. The imaging lens driving module of claim 17, wherein the at least another of the plurality of optical lens elements disposed in the lens holder structure has no relative motion with respect to the base.

19. The imaging lens driving module of claim 16, wherein the light-folding element comprises an optical effective region, and the incident optical trace passes through the optical effective region.

20. The imaging lens driving module of claim 19, wherein after the light-folding element converges the incident optical trace via the optical effective region, the light-folding element folds the incident optical trace towards at least one of the plurality of optical lens elements.

21. The imaging lens driving module of claim 16, wherein the light-folding element comprises a reduction portion, and the reduction portion is reduced from a periphery of the light-folding element towards a center of the light-folding element.

22. The imaging lens driving module of claim 16, wherein the at least one object-side optical lens element has a central axis, and the at least one object-side optical lens element has an outer peripheral reduction structure reduced in a straight-line direction perpendicular to the central axis.

23. An electronic device, comprising:
the imaging lens driving module of claim 16.

* * * * *